(12) United States Patent
Verheyden et al.

(10) Patent No.: US 11,650,374 B2
(45) Date of Patent: May 16, 2023

(54) OPTICAL FIBER ALIGNMENT DEVICES AND SYSTEMS

(71) Applicant: COMMSCOPE TECHNOLOGIES LLC, Hickory, NC (US)

(72) Inventors: Danny Willy August Verheyden, Gelrode (BE); Debora Dockx, Duffel (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 17/272,210

(22) PCT Filed: Aug. 29, 2019

(86) PCT No.: PCT/US2019/048867
§ 371 (c)(1),
(2) Date: Feb. 26, 2021

(87) PCT Pub. No.: WO2020/047291
PCT Pub. Date: Mar. 5, 2020

(65) Prior Publication Data
US 2021/0318496 A1    Oct. 14, 2021

Related U.S. Application Data

(60) Provisional application No. 62/892,046, filed on Aug. 27, 2019, provisional application No. 62/794,033, (Continued)

(51) Int. Cl.
*G02B 6/38* (2006.01)

(52) U.S. Cl.
CPC ......... *G02B 6/3806* (2013.01); *G02B 6/3803* (2013.01); *G02B 6/3889* (2013.01)

(58) Field of Classification Search
CPC ... G02B 6/3806; G02B 6/3803; G02B 6/3889
See application file for complete search history.

(56) References Cited

U.S. PATENT DOCUMENTS 7,454,117 B2 * 11/2008 Carpenter ............ G02B 6/3806
385/136
7,537,398 B2    5/2009 Watte et al.
(Continued)

FOREIGN PATENT DOCUMENTS

EP    0 178 179 A2    4/1986
EP    0 338 758 A2    10/1989
(Continued)

OTHER PUBLICATIONS

International Search Report and Written Opinion of the International Searching Authority for International Patent Application No. PCT/US2019/048867 dated Dec. 16, 2019, 12 pages.
(Continued)

*Primary Examiner* — Sung H Pak
*Assistant Examiner* — Hoang Q Tran
(74) *Attorney, Agent, or Firm* — Merchant & Gould P.C.

(57) ABSTRACT

The present disclosure relates to optical fiber alignment devices and systems for use in implementing optical splices between optical fibers. In certain examples, the optical fiber alignment devices and systems can include fiber alignment structures capable of clamping optical fibers in a co-axially aligned orientation.

19 Claims, 58 Drawing Sheets

Related U.S. Application Data filed on Jan. 18, 2019, provisional application No. 62/724,343, filed on Aug. 29, 2018.

(56) References Cited

U.S. PATENT DOCUMENTS

| | | |
|---|---|---|
| 7,862,245 B2 | 1/2011 | Watte et al. |
| 8,985,864 B2 | 3/2015 | Ott |
| 9,575,263 B2 | 2/2017 | Gurreri et al. |
| 9,575,272 B2 | 2/2017 | Ott |
| 9,829,665 B1 | 11/2017 | Dobbins et al. |
| 9,933,578 B1 | 4/2018 | Chen |
| 2003/0113090 A1 | 6/2003 | Lee et al. |
| 2004/0037511 A1* | 2/2004 | Chao .............. G02B 6/245 385/80 |
| 2004/0042730 A1 | 3/2004 | Freund et al. |
| 2006/0067636 A1 | 3/2006 | Bludau et al. |
| 2007/0258680 A1 | 11/2007 | Nadeau et al. |
| 2010/0303418 A1* | 12/2010 | Wang .............. G02B 6/3806 385/98 |
| 2018/0067262 A1* | 3/2018 | Larson .............. G02B 6/2558 |
| 2018/0157002 A1* | 6/2018 | Bishop .............. G02B 6/4441 |

FOREIGN PATENT DOCUMENTS

| | | |
|---|---|---|
| JP | 2013/007826 A | 1/2013 |
| WO | 2013/117598 A2 | 8/2013 |
| WO | 2016/043922 A1 | 3/2016 |
| WO | 2017/192461 A2 | 11/2017 |
| WO | 2018/020022 A1 | 2/2018 |
| WO | 2018/037078 A1 | 3/2018 |
| WO | 2018/144128 A2 | 8/2018 |

OTHER PUBLICATIONS

Extended European Search Report for Application No. 19856134.2 dated Mar. 28, 2022.

* cited by examiner

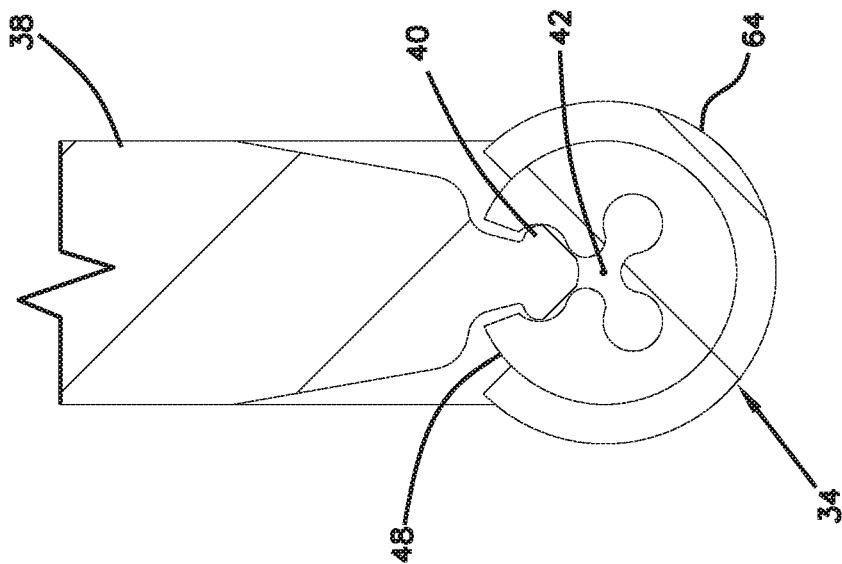
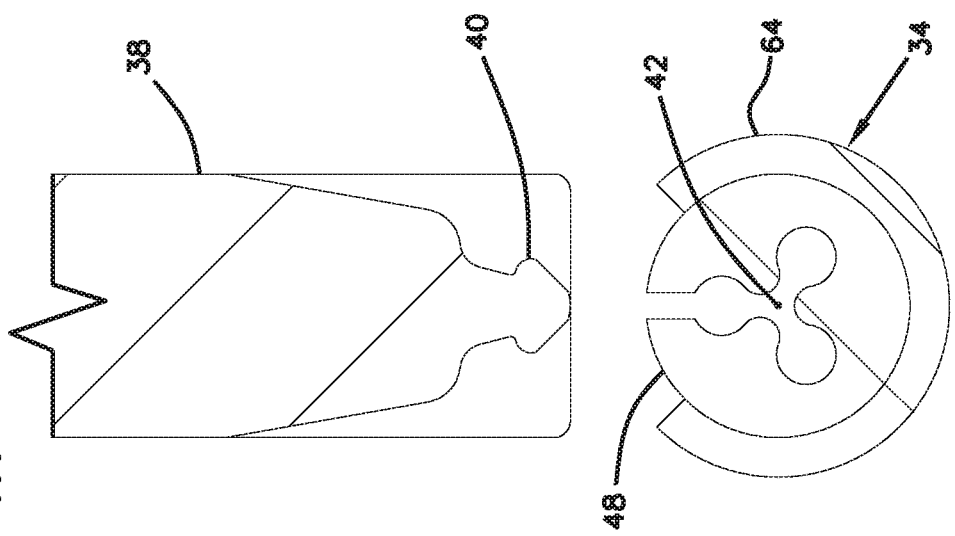

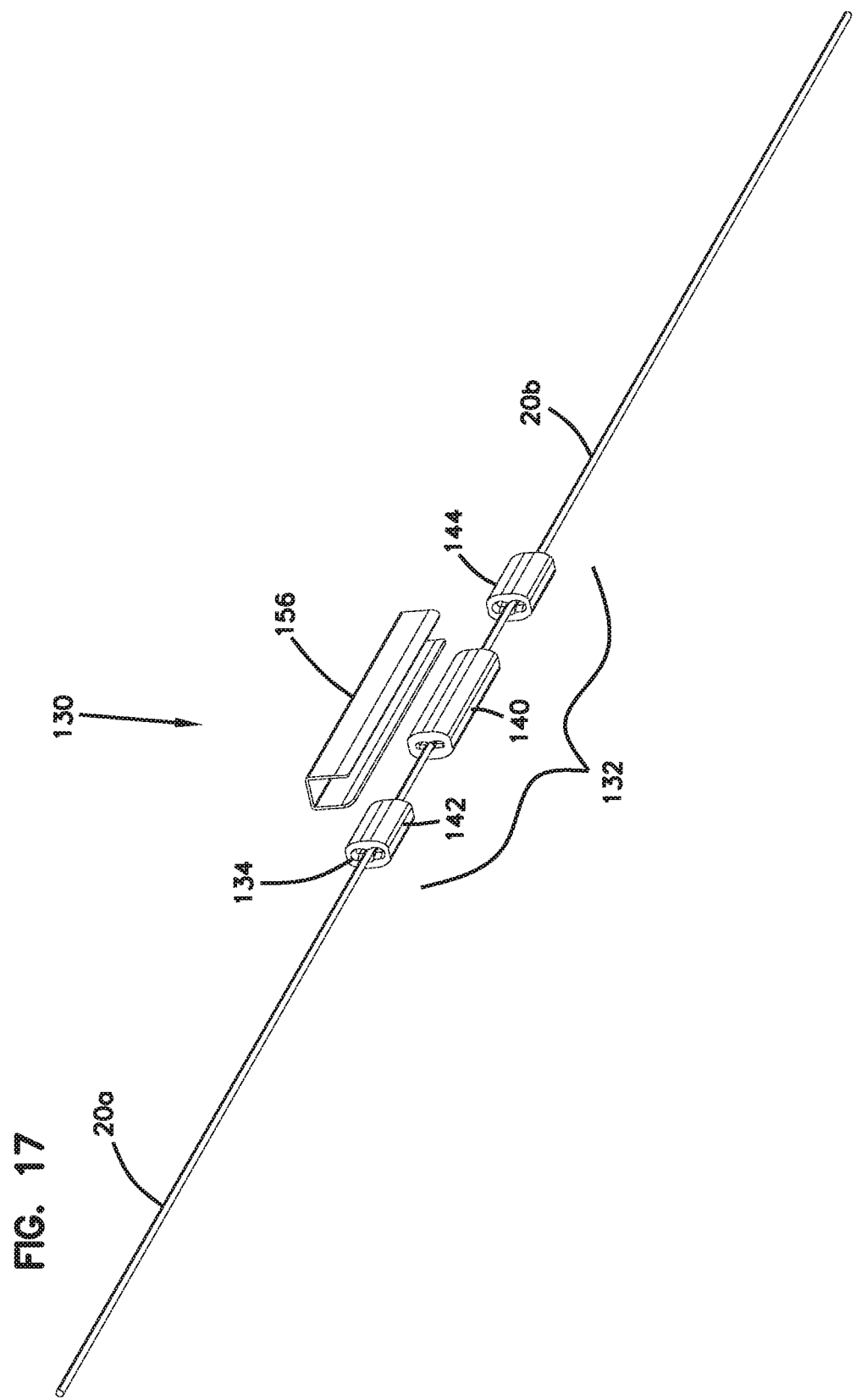

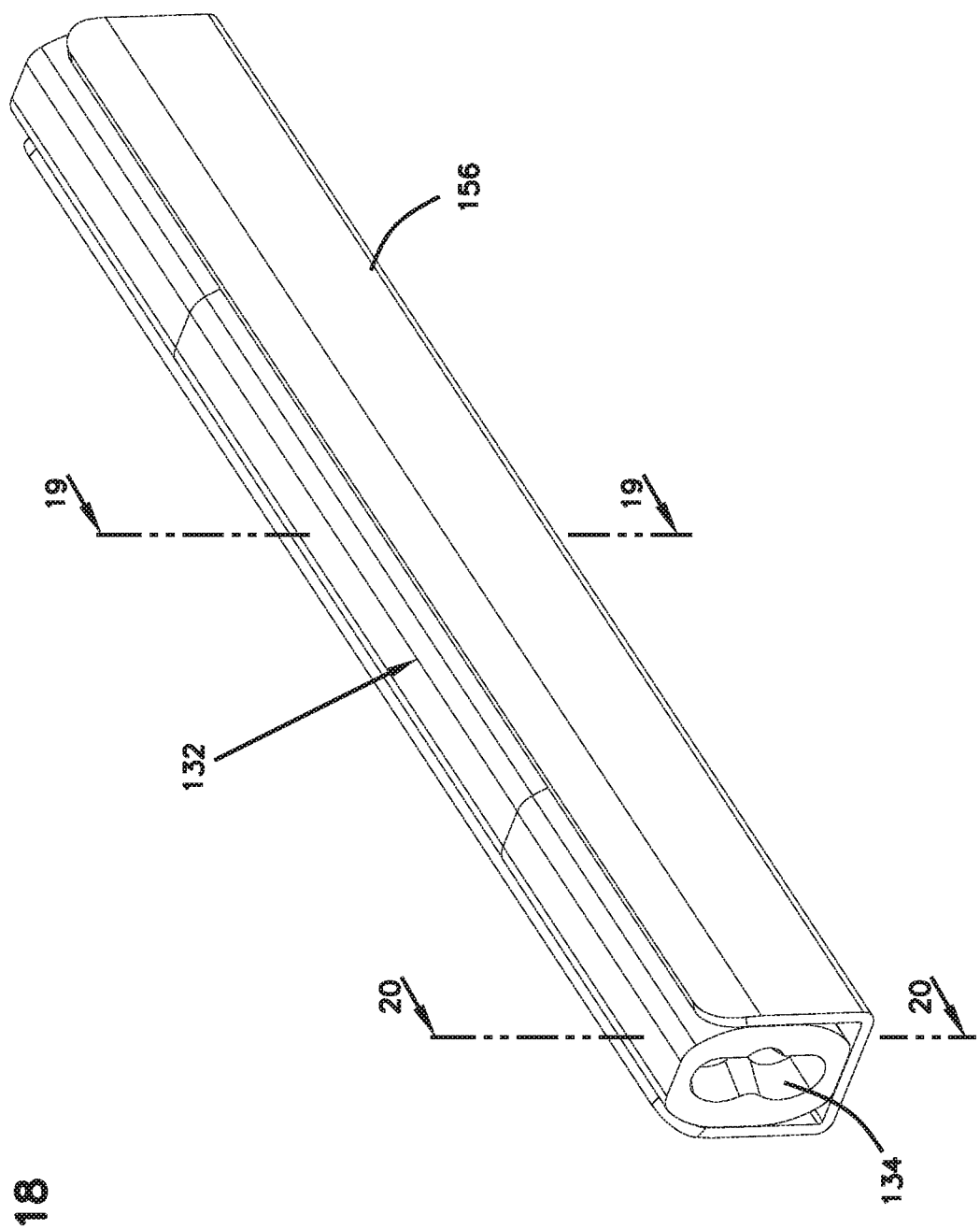

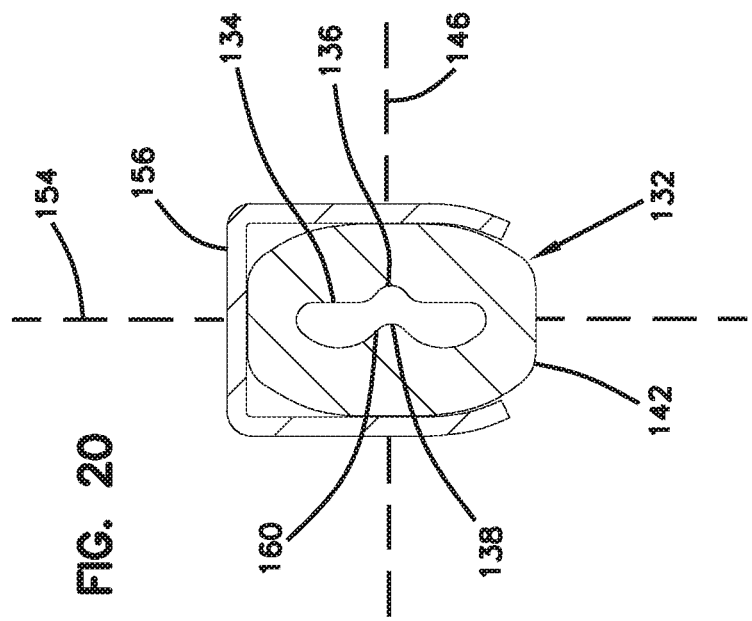
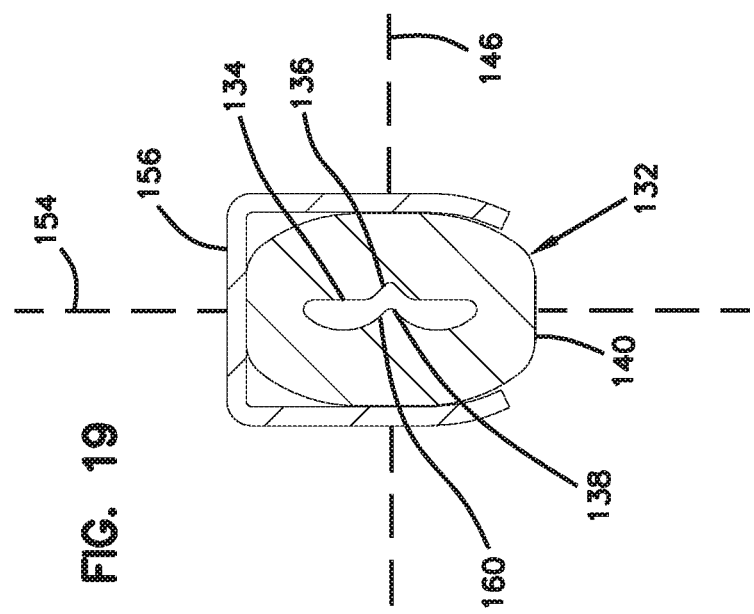

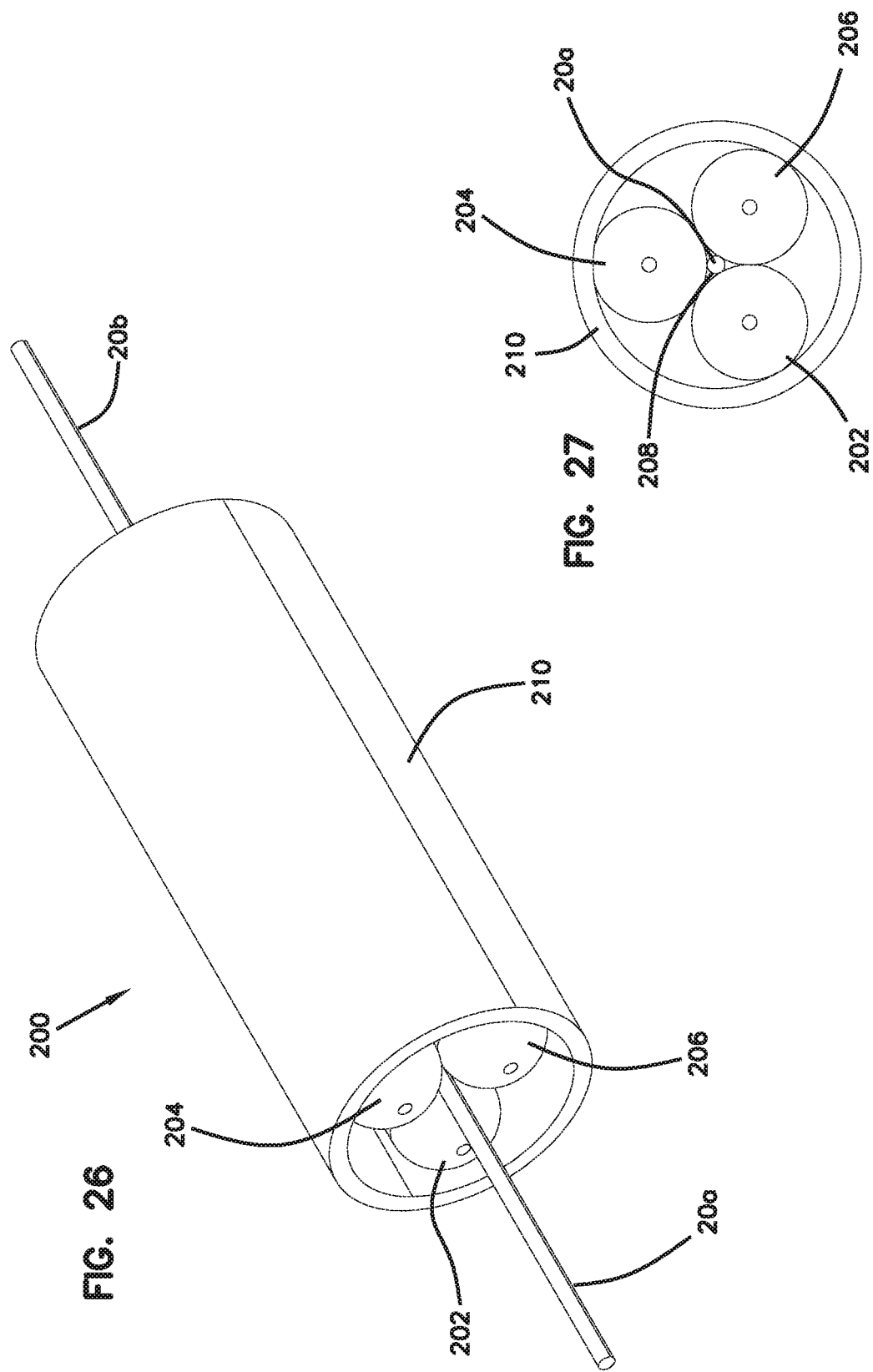

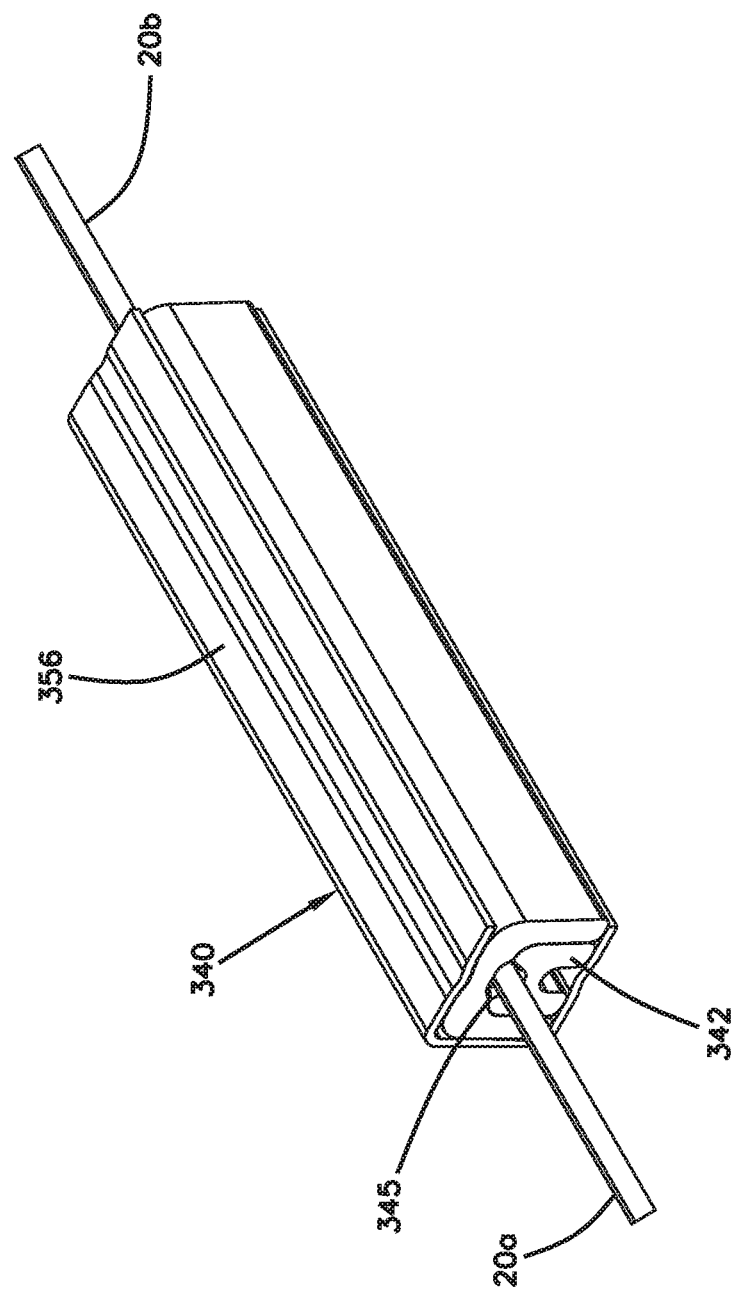

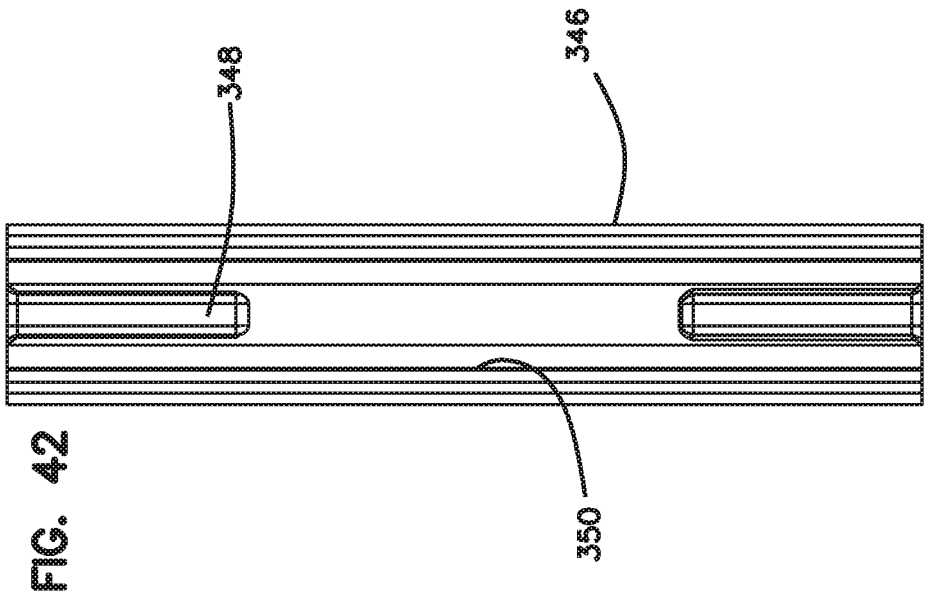
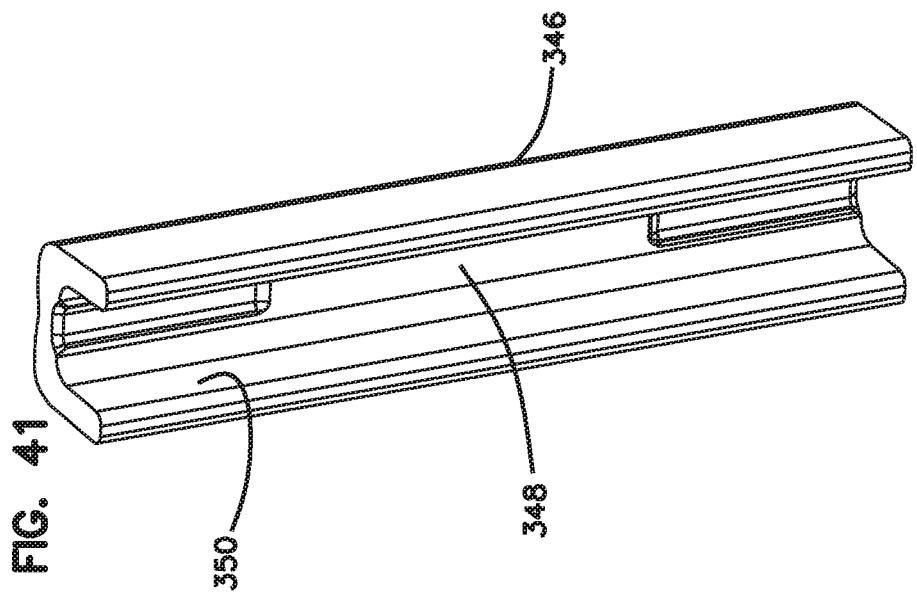

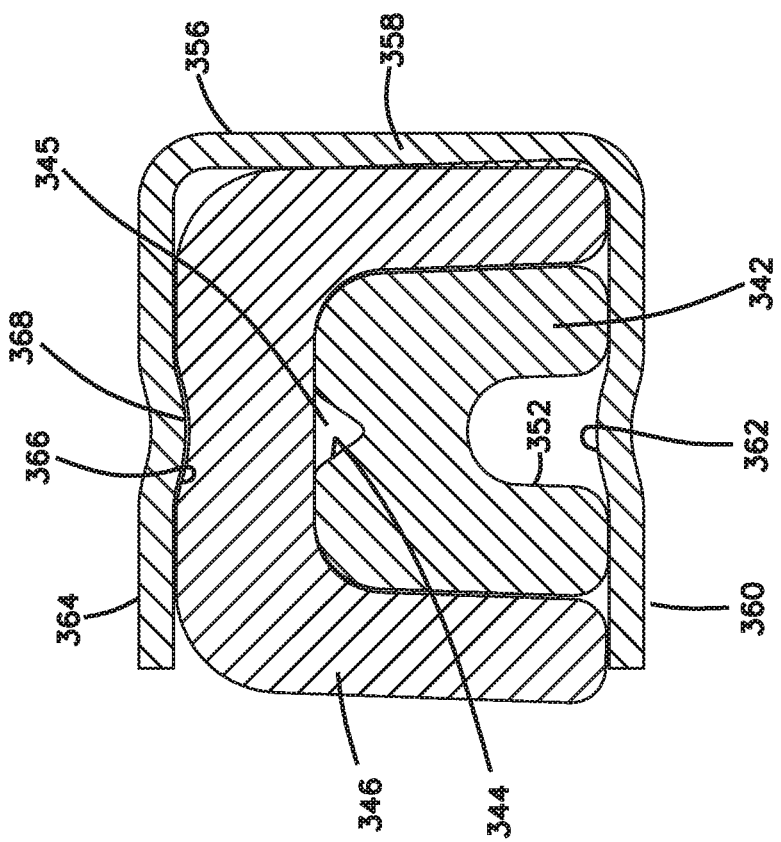
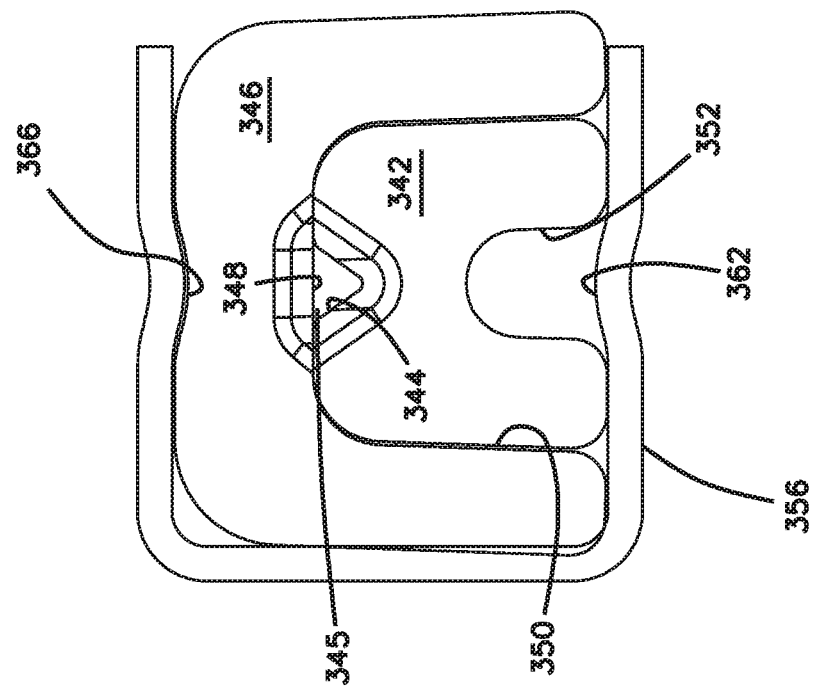

OPTICAL FIBER ALIGNMENT DEVICES AND SYSTEMS

CROSS-REFERENCE TO RELATED APPLICATIONS

This application is a National Stage Application of PCT/2019/048867, filed on Aug. 29, 2019, which claims the benefit of U.S. Patent Application Ser. No. 62/724,343, filed on Aug. 29, 2018, and claims the benefit of U.S. Patent Application Ser. No. 62/794,033, filed on Jan. 18, 2019, and claims the benefit of U.S. Patent Application Ser. No. 62/892,046, filed on Aug. 27, 2019, the disclosures of which are incorporated herein by reference in their entireties. To the extent appropriate, a claim of priority is made to each of the above referenced applications.

TECHNICAL FIELD

The present disclosure relates generally to fiber optic components. More particularly, the present disclosure relates to fiber optic components for use in making optical splices.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber splices are an important part of most fiber optic communication systems. Optical fiber splices are typically used to provide a permanent or near permanent optical connection between optical fibers. Optical splices can include single fiber splices and multi-fiber splices (e.g., mass fusion splices). In a common splicing operation, two optical fibers or two sets of optical fibers are first co-axially aligned. Often opto-electronic equipment is used to provide active alignment of the cores of the optical fibers. Once the optical fibers have been aligned, the ends of the optical fibers can be fusion spliced together usually by an electric arc. After splicing, the splice location is typically reinforced with a fiber optic fusion splice protector. A common type of fiber optic fusion splice protector is a SMOUV fiber optic fusion splice protector sold by CommScope Inc. of Hickory, N.C., USA. This type of fusion splice protector includes an outer shrink-fit tube, a low temperature hot melt adhesive and a stainless steel or ceramic rod which functions to add rigidity to the protector and to reinforce the splice location.

Traditional fusion splice protectors are relatively long, bulky and heavy. By way of example, traditional fusion splice protectors are equal to or greater than 20 millimeters in length (most typically 30-61 mm in length) and are significantly heavier than the weight which is capable of being supported by the inherent elasticity of the optical fibers being optically spliced. Smaller and lighter devices for making optical splices are disclosed by PCT International Publication No. WO 2018/037078.

SUMMARY

Aspects of the present disclosure relate to devices and systems for efficiently implementing compact optical splices between optical fibers.

Another aspect of the present disclosure relates to a system for implementing a fiber optic splice between first and second optical fibers. The system includes a sleeve structure defining a fiber alignment passage for receiving end portions of the first and second optical fibers desired to be spliced together. The sleeve structure is moveable between an expanded position and a clamping position. The sleeve structure is resiliently biased toward the clamping position. The system also includes a handling tool including an expansion portion that fits into the sleeve structure to retain the sleeve structure in the expanded position. A fiber optic splice is implemented by inserting the first and second optical fibers into the fiber alignment passage sleeve structure while the sleeve structure is held in the expanded position by the expansion portion of the handling tool. The expansion portion is removed from the sleeve structure once the first and second fibers have been inserted into the fiber alignment passage such that the sleeve structure moves to the clamping position and clamps the first and second optical fibers within the fiber alignment passage.

Another aspect of the present disclosure relates to a device for implementing a fiber optic splice between first and second optical fibers. The device includes a first piece defining a fiber alignment groove for receiving end portions of the first and second optical fibers desired to be spliced together. The device also includes a second piece that snaps onto the first piece such that the ends portions of the first and second optical fibers are clamped in the fiber alignment groove between the first and second pieces. The second piece includes a fiber clamping portion adapted to cover an open side of the fiber alignment groove when the second piece is snapped onto the first piece.

A further aspect of the present disclosure relates to a further device for implementing a fiber optic splice between first and second optical fibers. The device includes a first piece defining a fiber alignment groove for receiving end portions of the first and second optical fibers desired to be spliced together. The device also includes a second piece that mounts adjacent to the first piece such that the ends portions of the first and second optical fibers are held in the fiber alignment groove between the first and second pieces. The second piece includes a fiber clamping portion adapted to cover an open side of the fiber alignment groove when the second piece is mounted adjacent to the first piece. The device further includes a third piece that mounts over the first and second pieces to force the first and second pieces together such that the first and second optical fibers are clamped in the fiber alignment groove. The third piece is either a shape-memory sleeve or a clip member that snaps over the first and second pieces.

Still another aspect of the present disclosure relates to a further device for implementing a fiber optic splice between first and second optical fibers. The device includes a fiber alignment sleeve defining a fiber alignment passage extending axially through the fiber alignment sleeve. The fiber alignment passage includes a fiber positioning groove. The fiber alignment sleeve includes a clamping surface within the fiber alignment passage that opposes the fiber positioning groove. The clamping surface and the fiber positioning groove are moveable relative to one another along a first axis when the fiber alignment sleeve is moved between a relaxed state and an expanded state. The clamping surface is positioned further from the fiber positioning groove when the fiber alignment sleeve is in the expanded state as compared to when the fiber alignment sleeve is in the relaxed state. The first and second optical fibers are capable of being inserted in the fiber alignment passage when the fiber alignment sleeve is in the expanded state. The fiber alignment sleeve has a construction that biases the fiber alignment sleeve toward the relaxed state. The fiber alignment sleeve is moveable from the relaxed state toward the expanded state by compressing the fiber alignment sleeve along a second axis perpendicular with respect to the first axis.

Still another aspect of the present disclosure relates to a further device for implementing a fiber optic splice between first and second optical fibers. The device includes first, second and third rods that cooperate to define a fiber alignment passage. The device also includes a shape memory sleeve that mounts over the first, second and third rods.

A further aspect of the present disclosure relates to still another device for implementing a fiber optic splice between first and second optical fibers. The device includes a fiber alignment sleeve defining a fiber alignment passage extending axially through the fiber alignment sleeve. The fiber alignment sleeve defines an axial slot having a length that extends axially along the fiber alignment sleeve and a depth that extends radially through the fiber alignment sleeve from an outer surface of the fiber alignment sleeve to the fiber alignment passage. The fiber alignment sleeve is moveable between a relaxed state and an expanded state, and has a construction that biases the fiber alignment sleeve toward the relaxed state. The fiber alignment sleeve is configured to flex at a location opposite the axial slot when the fiber alignment sleeve is moved from the relaxed state toward the expanded state. The fiber alignment sleeve can be moved from the relaxed state to the expanded state by a tool or by inserting optical fibers within the fiber alignment passage. The fiber alignment passage is sized to be capable of clamping a fiber having a diameter as small as 125 microns.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

FIG. 7A is a cross-sectional view taken along section line 7-7 of FIG. 6 prior to insertion of the handling tool within the fiber alignment device;

FIG. 7B is a cross-sectional view taken along section line 7-7 of FIG. 6 after insertion of the handling tool within the fiber alignment device;

FIG. 17 is an exploded view of a further fiber alignment device in accordance with the principles of the present disclosure;

FIG. 18 is an assembled perspective view of the fiber alignment device of FIG. 17;

FIG. 19 is a cross-sectional view taken along section 19-19 of FIG. 18;

FIG. 20 is a cross-sectional view taken along section 20-20 of FIG. 18;

FIG. 26 is a perspective view of a further fiber alignment device in accordance with the principles of the present disclosure, the fiber alignment device is shown assembled with optical fibers inserted in the alignment device;

FIG. 27 is an end view of the fiber alignment device of FIG. 26;

FIG. 36 is a perspective view of another fiber alignment device surrounding a splice between two optical fibers in accordance with the principles of the present disclosure, the fiber alignment device including a first piece, a second piece, and a clamping device;

FIG. 41 is a perspective view of an example second piece of the fiber alignment device, the second piece including fiber clamping portions;

FIG. 42 is a bottom plan view of the second piece of FIG. 41;

FIG. 43 is an end view of the fiber alignment device of FIG. 36 with the fibers removed for ease in viewing;

FIG. 44 is a transverse cross-sectional view of the fiber alignment device of FIG. 36 with the fibers removed for ease in viewing;

DETAILED DESCRIPTION

Aspects of the present disclosure relate to systems and devices for co-axially aligning optical fibers and for fixing the optical fibers in co-axial alignment with each other so as to provide optical connections (e.g., splices) between the optical fibers. Some aspects of the present disclosure relate to alignment devices having elastic configurations configured for aligning and clamping optical fibers in co-axially aligned orientations relative to one another. Other aspects of the present disclosure related to fiber alignment devices which utilize shape-memory sleeves (e.g., heat-shrink sleeves) to apply clamping forces to maintain co-axial alignment between optical fibers. In certain examples, the alignment devices clamp the optical fiber to prevent axial movement relative to the optical fibers such that the fibers can remain in end-to-end contact with one another. It will be appreciated that fiber optic alignment devices in accordance with the principles of the present disclosure optionally can include the use of bonding material (e.g., an adhesive such as epoxy) to facilitate holding the optical fiber in place and also optionally can utilize index matching gel to enhance optical connections between optical fibers.

The present disclosure describes numerous fiber alignment devices having various components for (e.g., parts defining alignment channels, parts defining alignment grooves, parts defining clamping surfaces and other parts) for facilitating co-axially aligning optical fibers desired to be spliced together, and for clamping the fibers in co-axially aligned orientations. It will be appreciated that processes such as molding (e.g., micro molding), extruding and etching (selective laser induced etching) can be used to manufacture the various parts. In certain examples, the parts can be made of a material having a composition that includes plastic. Example plastics can include polyetherimide (PEI), polyether ether ketone (PEEK), thermoplastic polyimide (TPI) or other plastic materials. In certain examples, parts can also be manufactured using other types of material such as ceramic (zirconium dioxide) or glass.

In certain implementations, the fiber alignment devices include a polymeric or ceramic structure in which the fibers are aligned and a resilient structure (e.g., a metal spring) to provide a clamping force at the splice between the fibers. Certain example fiber alignment devices (e.g., fiber alignment devices 100, 340, 380 discussed in detail below) include two ceramic or polymeric pieces that hold the aligned fibers and the splice therebetween. A resilient structure (e.g., a metal spring) presses the two polymeric/ceramic pieces together to clamp the fibers thereinbetween. In examples, one of the two ceramic/polymeric pieces defines a fiber alignment groove (e.g., a v-groove) and the other defines a clamping feature.

Figure 1:
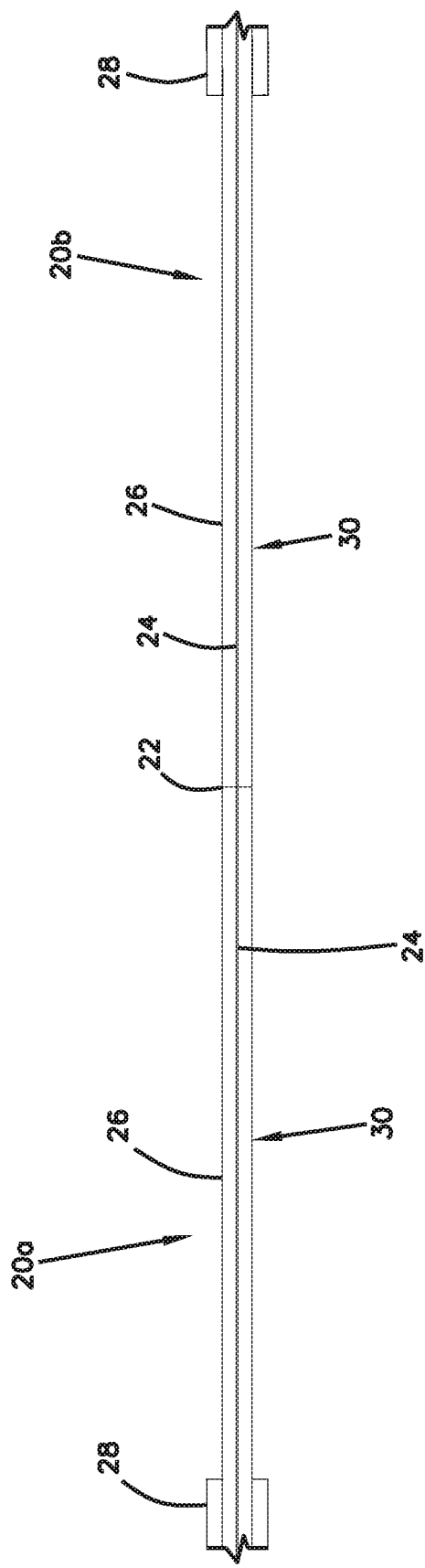
FIG. 1 depicts first and second optical fibers co-axially aligned with one another.
Figure 2:
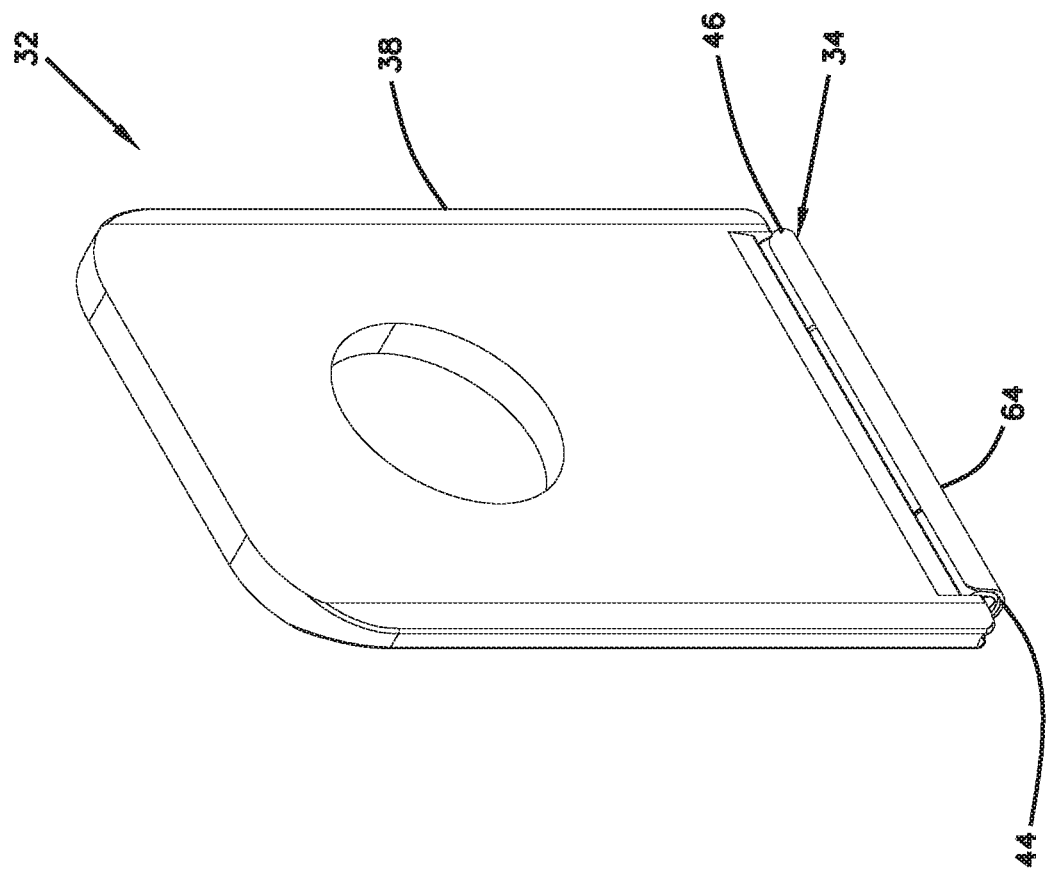
FIG. 2 illustrates a fiber optic alignment system in accordance with the principles of the present disclosure, the optical fiber alignment system includes a fiber alignment device mounted on a handling tool.

FIG. 1 depicts two optical fibers 20a, 20b which have been prepared for splicing and which are shown co-axially aligned with one another. As depicted at FIG. 1, end faces of the optical fibers 20a, 20b are in abutment with one another at a splice location 22. Each of the optical fibers 20a, 20b includes a core 24 surrounded by a cladding layer 26. The optical fibers 20a, 20b also can include coating layers 28 surrounding the cladding layers 26. In the case of single mode optical fibers, the core 24 is generally about 10 microns in diameter, the cladding is generally about 125 microns in diameter, and the coating layer is typically about 250 microns in diameter. It will be appreciated that the coating layers can also be smaller than 250 microns in diameter. For example, certain single mode optical fibers have coating layers of about 200 microns in diameter. As shown at FIG. 1, the optical fibers 20a, 20b have been prepared for splicing by stripping away the coating layers 28 adjacent the ends of the optical fibers 20a, 20b desired to be spliced together. Thus, the end portions of the optical fibers 20a, 20b include bare fiber portions 30 where the coating layer 28 has been removed. It will be appreciated that the various fiber alignment devices and systems disclosed herein can be used to facilitate or to implement optical splices between optical fibers of the type described above. Of course, the various aspects are applicable to other types of optical fibers such as multi-mode optical fibers or other optical fibers which may have dimensions other than the dimensions described above.

FIGS. 2-7 illustrate an example system 32 for implementing an optical splice between optical fibers such as the optical fibers 20a, 20b. For example, the system 32 is configured to co-axially align two optical fibers in end-to-end relation to each other, and then clamp the aligned optical fibers in place relative to one another. By co-axially aligning the optical fibers in end-to-end relationship with respect to each other, an optical connection is made between the optical fibers. The system 32 includes a sleeve structure 34 defining a fiber alignment passage 36 (see FIGS. 4 and 5) for receiving end portions of optical fibers desired to be optically connected together. It will be appreciated that the fiber alignment passage 36 functions to co-axially align the optical fibers desired to be optically connected (i.e., spliced) together. Additionally, the sleeve structure 34 is moveable between an expanded position and a clamping position. When the sleeve structure is in the expanded position, the fiber alignment passage 36 is large enough so that the optical fibers desired to be spliced together can be inserted axially therein. In contrast, when the sleeve structure 34 is in the clamping position, the fiber alignment passage 36 is sized such that the sleeve structure 34 clamps upon the optical fibers to resist axial movement between the optical fibers. It will be appreciated that the sleeve structure 34 can have a construction adapted to resiliently bias the sleeve structure 34 toward the clamping position. The system also includes a handling tool 38 including an expansion portion 40 (see FIGS. 7A and 7B) that fits into the sleeve structure 34 to retain the sleeve structure 34 in the expanded position (see FIG. 7B). It will be appreciated that an optical splice can be implemented by inserting optical fibers into the fiber alignment passage 36 while the sleeve structure 34 is held in the expanded position by the expansion portion 40 of the handling tool 38. Once the fibers have been fully inserted into the fiber alignment passage 36, the expansion portion 40 is removed from the sleeve structure 34 thereby allowing the sleeve structure 34 to move by its inherent elasticity to the clamping position causing the optical fibers to be clamped within the alignment passage 36.

It will be appreciated that the expansion portion 40 of the handling tool 38 can be factory installed within the sleeve structure 34. In addition to holding the sleeve structure 34 in the expanded position, the handling tool 38 assists in handling the sleeve structure 34 during fiber insertion. It will be appreciated that the expansion portion 40 functions as a wedge that fits within the fiber alignment passage 36 and forces the fiber alignment passage to the expanded position. In certain examples, the expansion portion 40 can have an enlarged knob or other enlargement at the end for facilitating retaining the expansion portion 40 within the fiber alignment passage 36.

Figure 3:
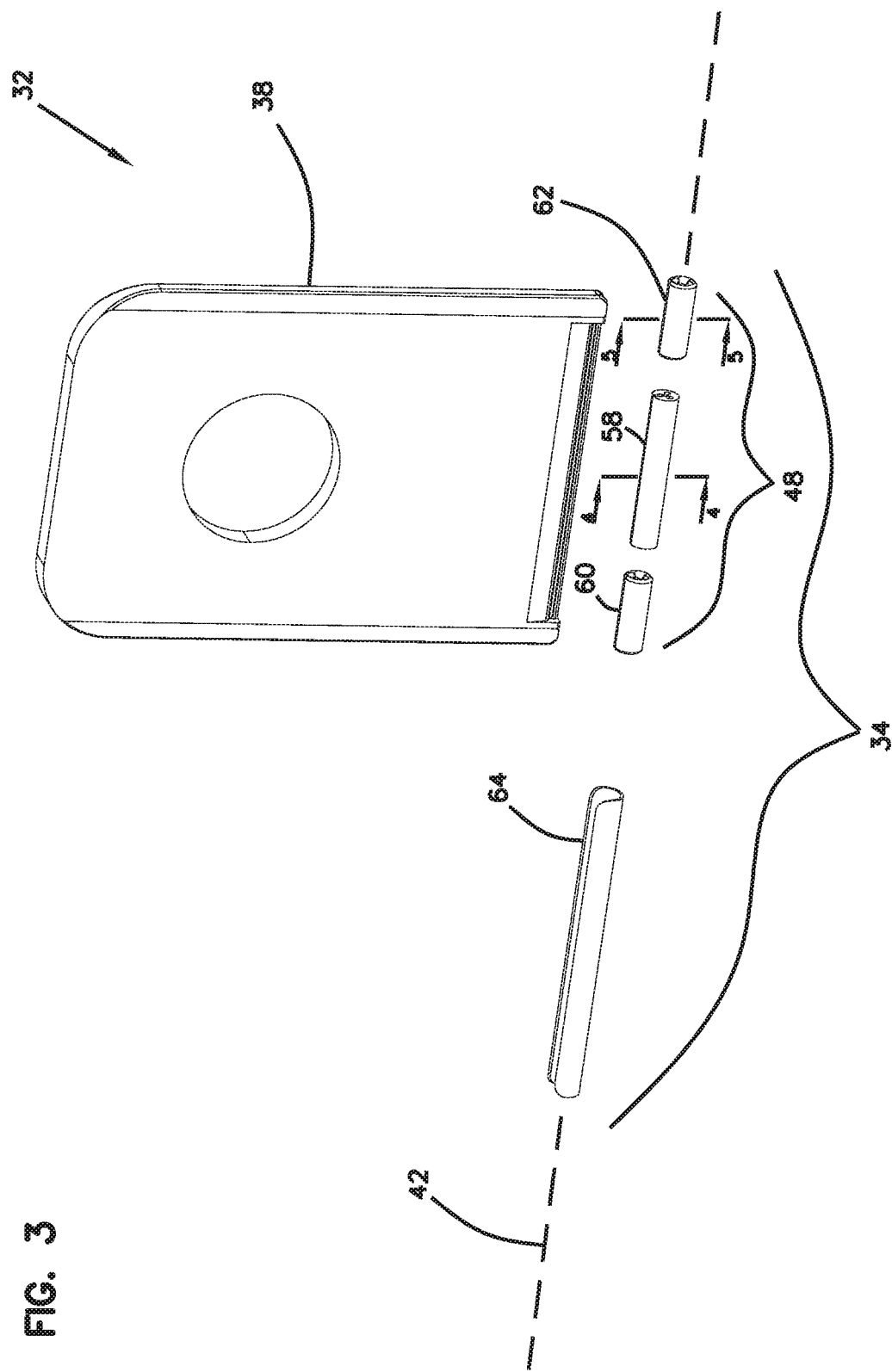
FIG. 3 shows the fiber alignment system of FIG. 2 with the fiber alignment device separated from the handling tool and arranged in an exploded configuration.
Figure 4:
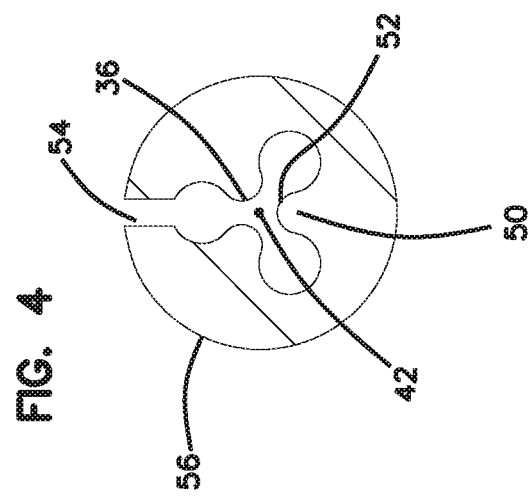
FIG. 4 is a cross-sectional view taken along section line 4-4 of FIG. 3.
Figure 5:
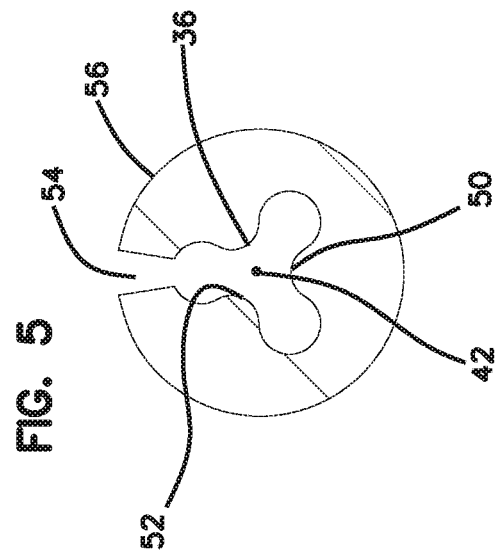
FIG. 5 is a cross-sectional view taken along section line 5-5 of FIG. 3.

It will be appreciated that the fiber alignment passage 36 extends along a central axis 42 of the sleeve structure 34 between first and second ends 44, 46 of the sleeve structure 34. Referring to FIGS. 3, 4 and 5, the sleeve structure 34 can include a sleeve body 48 and a plurality of radial projections 50 (e.g., three radial projections) that project inwardly from the sleeve body 48 toward the central axis 42 of the sleeve member 34. The radial projections 50 can include inner tips 52 that cooperate to define the fiber alignment passage 36 and also function to provide clamping of the optical fibers when the sleeve structure 34 is in the clamping position. The radial projections 50 also include lengths that extend axially along the central axis 42 of the sleeve structure 34 between the first and second ends 44, 46 of the sleeve structure 34. In a preferred example, the sleeve body 48 is a split sleeve body having at least one slot 54 having a depth that extends radially from an outer surface 56 of the sleeve body into the fiber alignment passage 36. The slot 54 also has a length that extends axially along the central axis of the sleeve structure 34 between the first and second ends 44, 46. In the depicted example, the outer surface of the sleeve structure 34 is generally cylindrical.

Referring to FIG. 3, the sleeve body 48 includes a central section 58 positioned axially between first and second end sections 60, 62 of the sleeve body 48. The fiber alignment passage 36 has a smaller cross-dimension at the central section 58 of the sleeve body 48 as compared at the first and second end sections 60, 62 of the sleeve body 48. FIG. 4 is representative of the transverse cross-sectional shape of the fiber alignment passage 36 at the central section 58 and FIG. 5 is representative of the transverse cross-sectional shape of the fiber alignment passage 36 at the first and second end sections 60, 62. It will be appreciated that the central section 58 is configured for clamping bare fiber portions of the optical fibers desired to be spliced and the first and second end sections 60, 62 are configured for clamping coated portions of the optical fibers desired to be spliced. In certain examples, the central section 58, the first end section 60 and the second end section 62 are all separate pieces. In certain examples, the various sections of the sleeve body 48 can be manufactured by an extrusion process.

Figure 6:
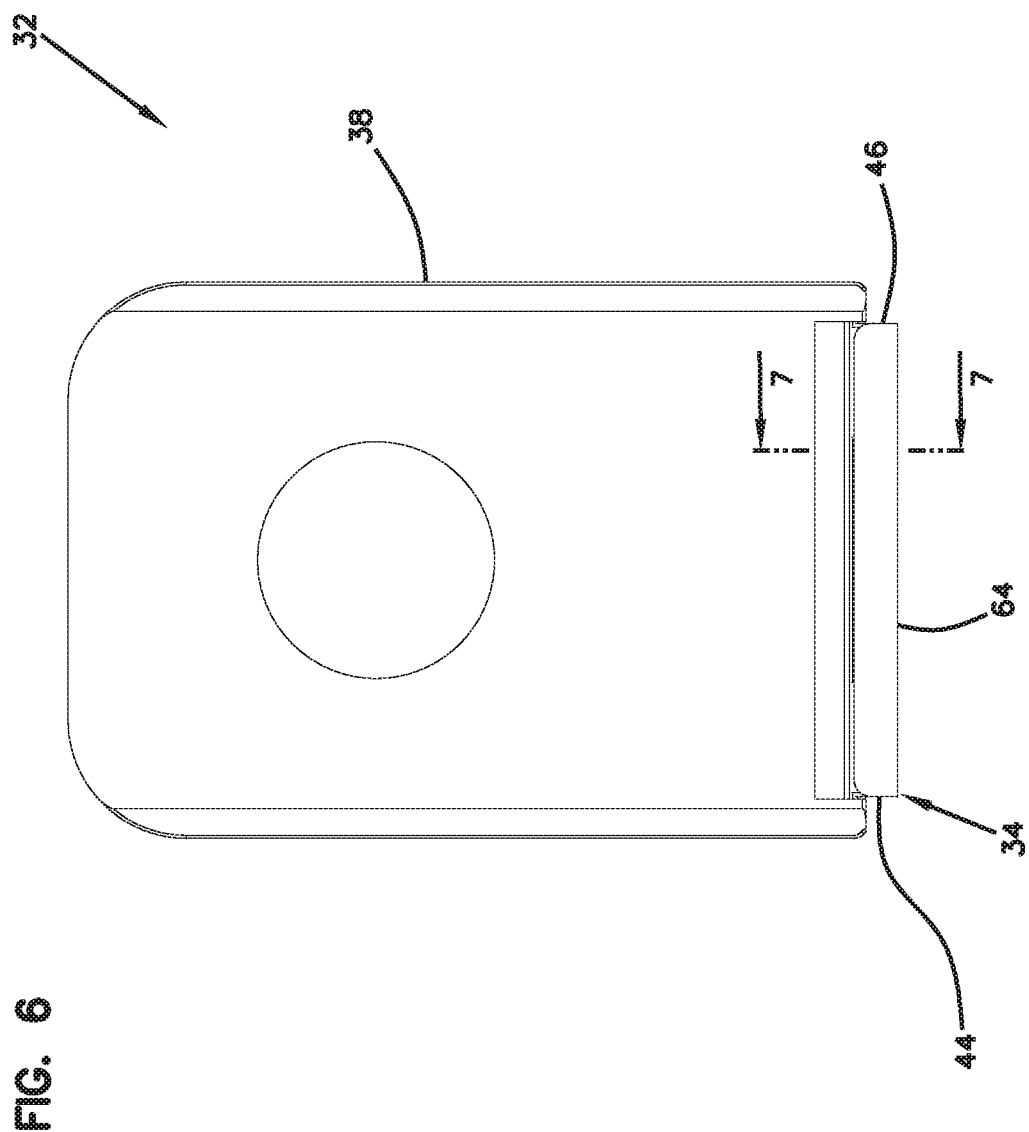
FIG. 6 is a side view of the fiber alignment system of FIG. 2.
Figure 8:
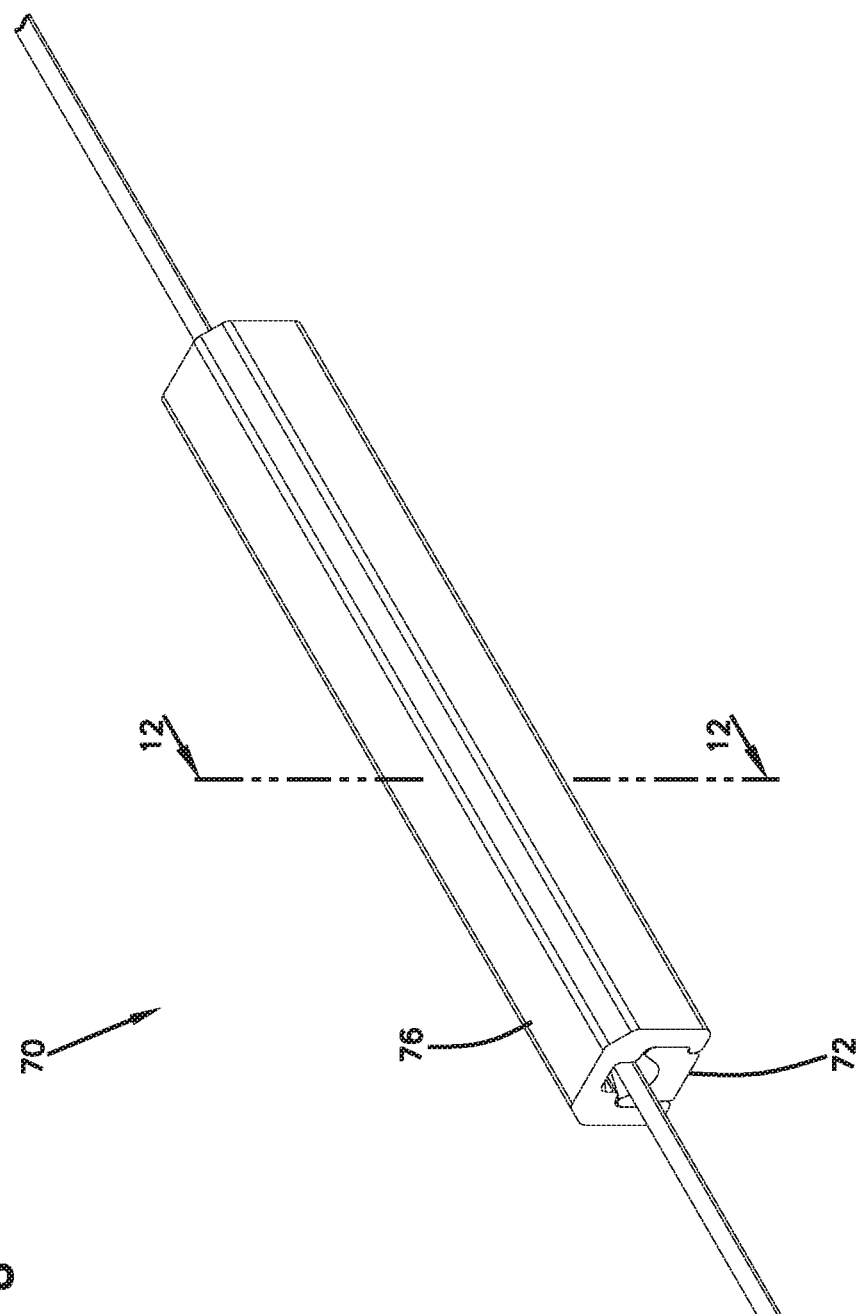
FIG. 8 depicts another fiber alignment device in accordance with the principles of the present disclosure, optical fibers are shown clamped within the device.

Referring to FIGS. 3, 6 and 7, the sleeve structure 34 can also include a spring sleeve 64 that mounts over the sleeve body 48 and functions to bias the sleeve body 48 toward the clamped position. The spring sleeve 64 preferably has a metal construction, but could also be plastic. It will be appreciated that the handling tool 38 can have a plastic construction.

FIGS. 8-12 depict another fiber alignment and clamping device 70 in accordance with the principles of the present disclosure. It will be appreciated that the device 70 is adapted for co-axially aligning the optical fibers desired to be spliced together and for clamping the optical fibers in an aligned configuration in which optical fibers are optically connected with one another. The device 70 includes a first piece 72 defining a fiber alignment groove 74 for receiving end portions of two optical fibers desired to be spliced together. The device 70 also includes a second piece 76 that snaps onto the first piece 72 to clamp the optical fibers in place within the fiber alignment groove 74. The second piece 76 includes a fiber clamping portion 78 depicted as a flat surface which is adapted to cover an open side of the fiber alignment groove 74 when the second piece 76 has been snapped on to the first piece 72. When optical fibers are within the fiber alignment groove 74 and the second piece 76 is snapped onto the first piece 72, the fibers are clamped within the fiber alignment groove 74 by the fiber clamping portion 78. In a preferred example, the fiber alignment groove 74 is a v-groove that extends along a length of the first piece 72 between first and second ends 80, 82 of the first piece 72.

Figure 9:
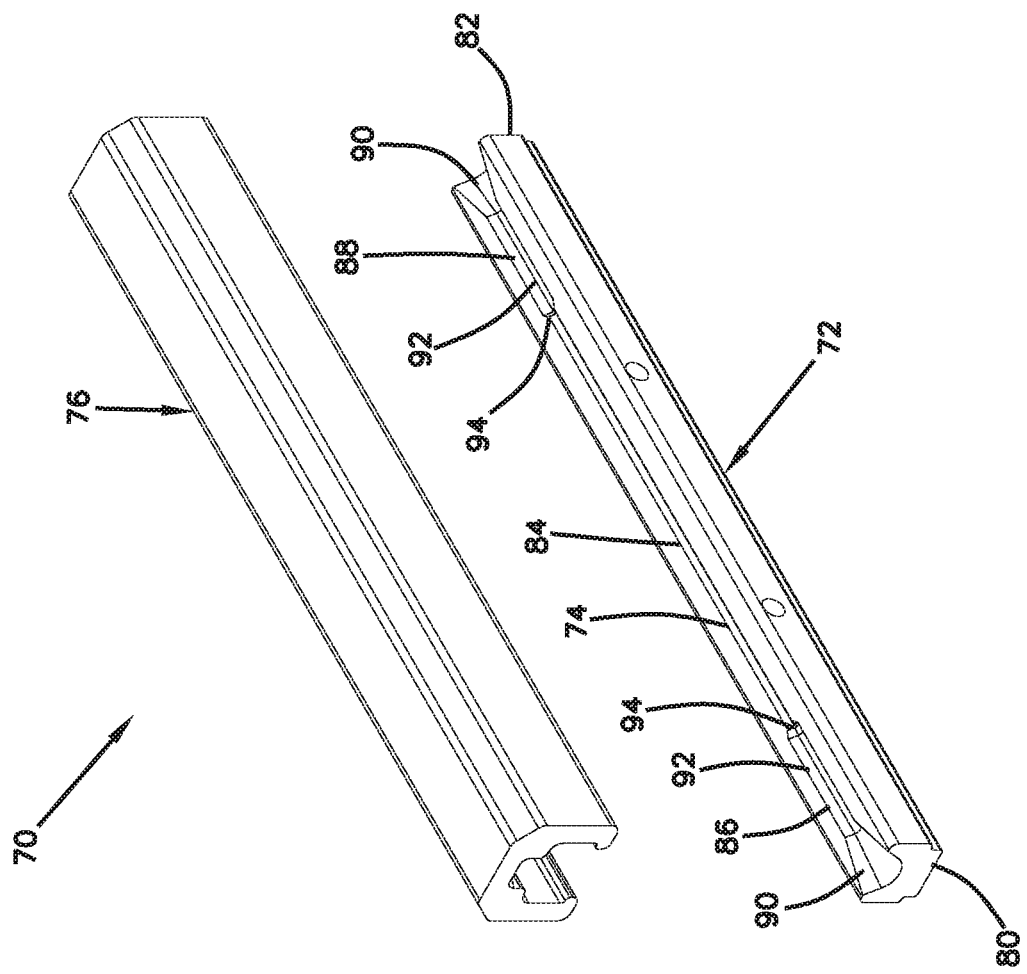
FIG. 9 is an exploded view of the fiber alignment device of FIG. 8.
Figure 10:
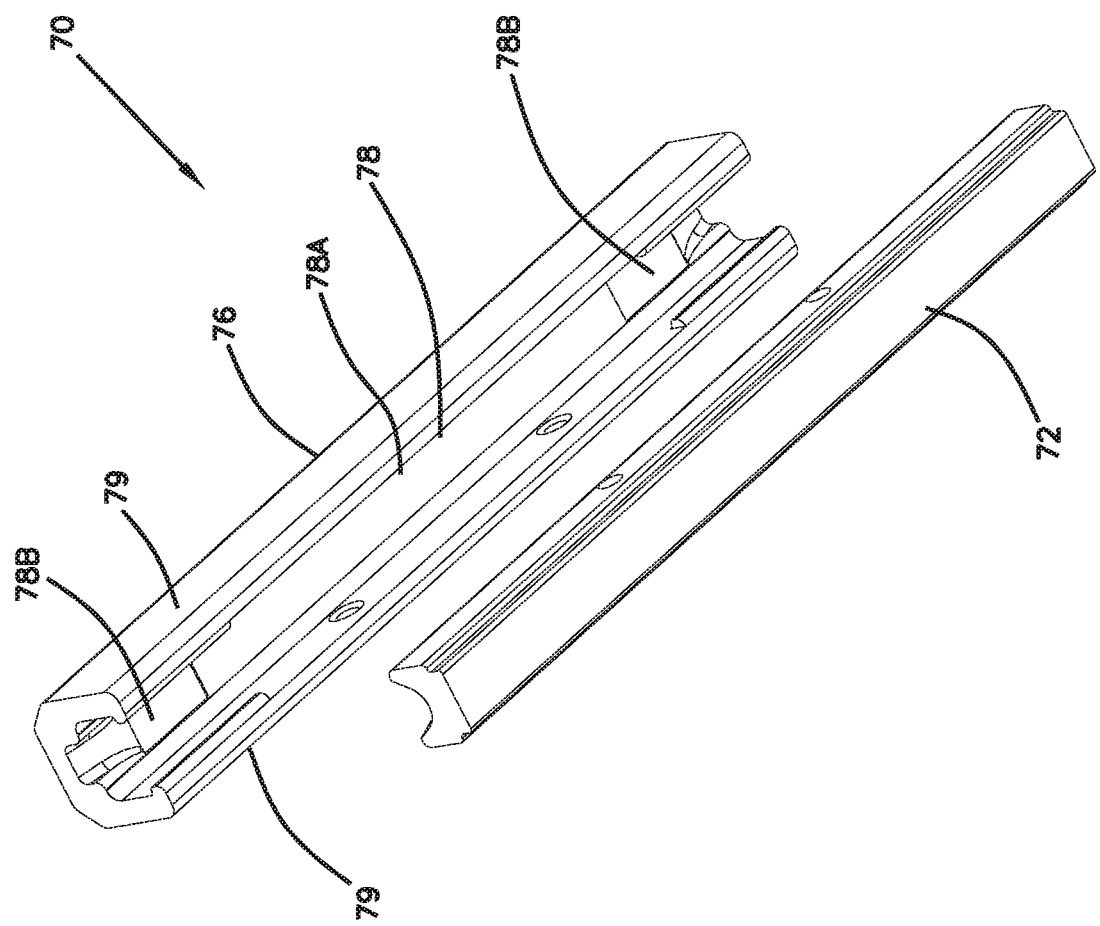
FIG. 10 is another exploded view of the fiber alignment of FIG. 8.
Figure 11:
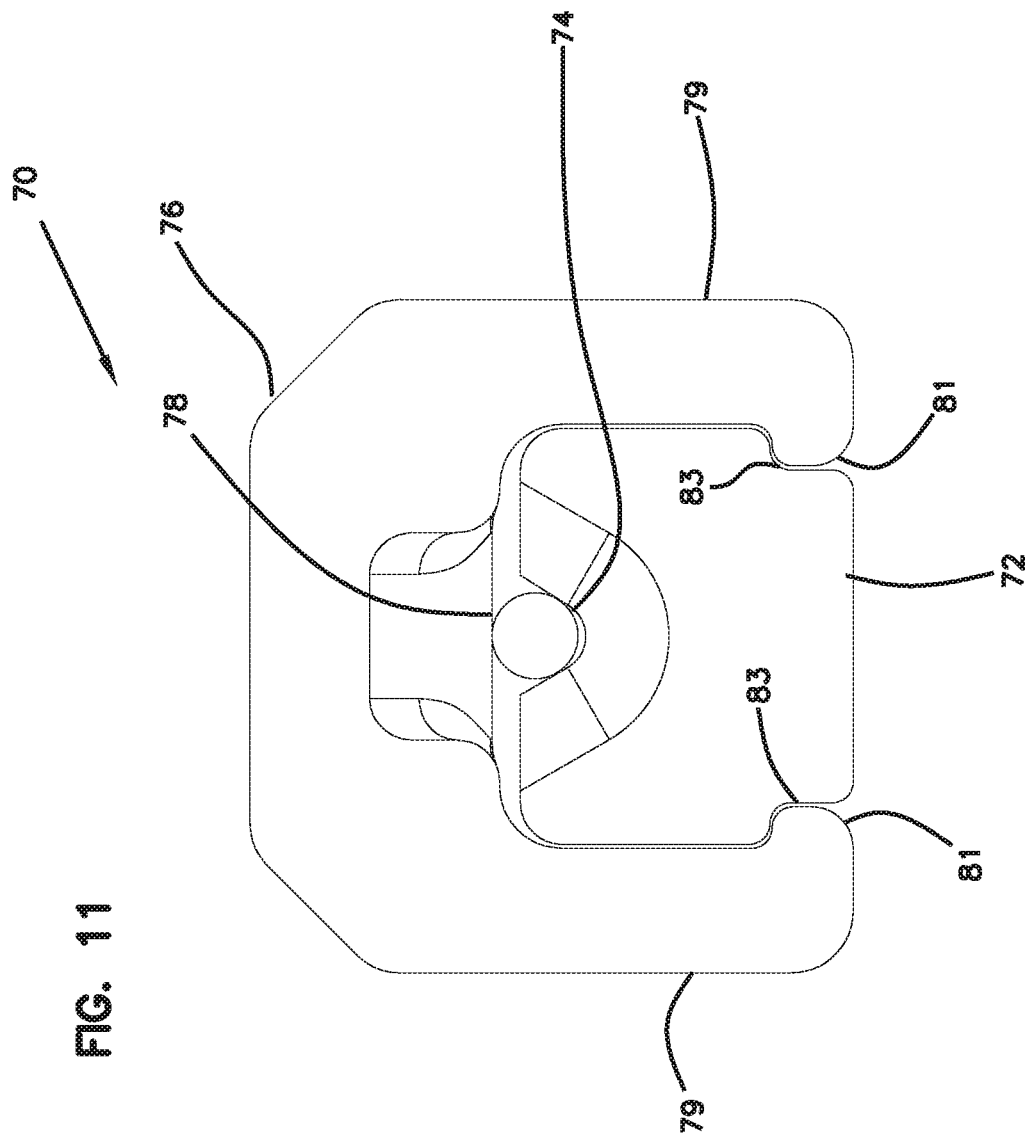
FIG. 11 is an end view of the fiber alignment device of FIG. 8.
Figure 12:
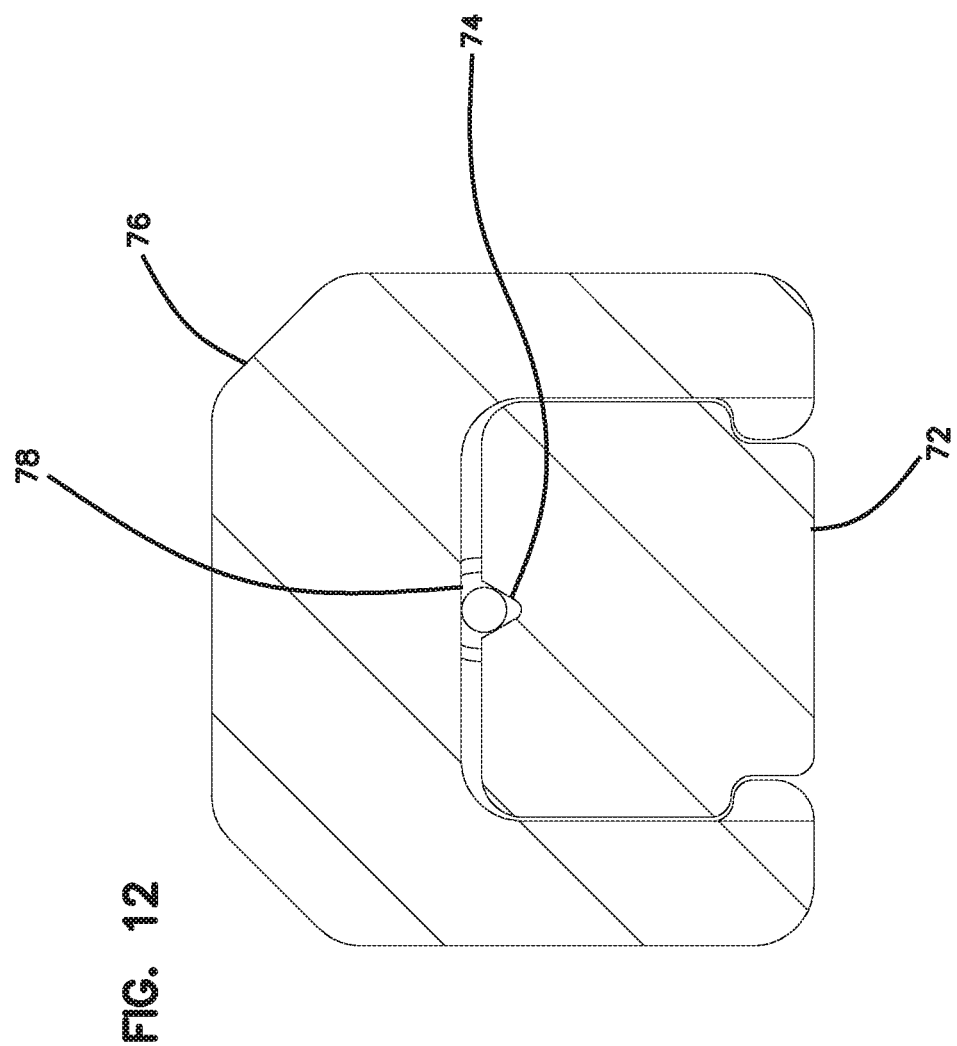
FIG. 12 is a cross-sectional view taken along section line 12-12 of FIG. 8.
Figure 13:
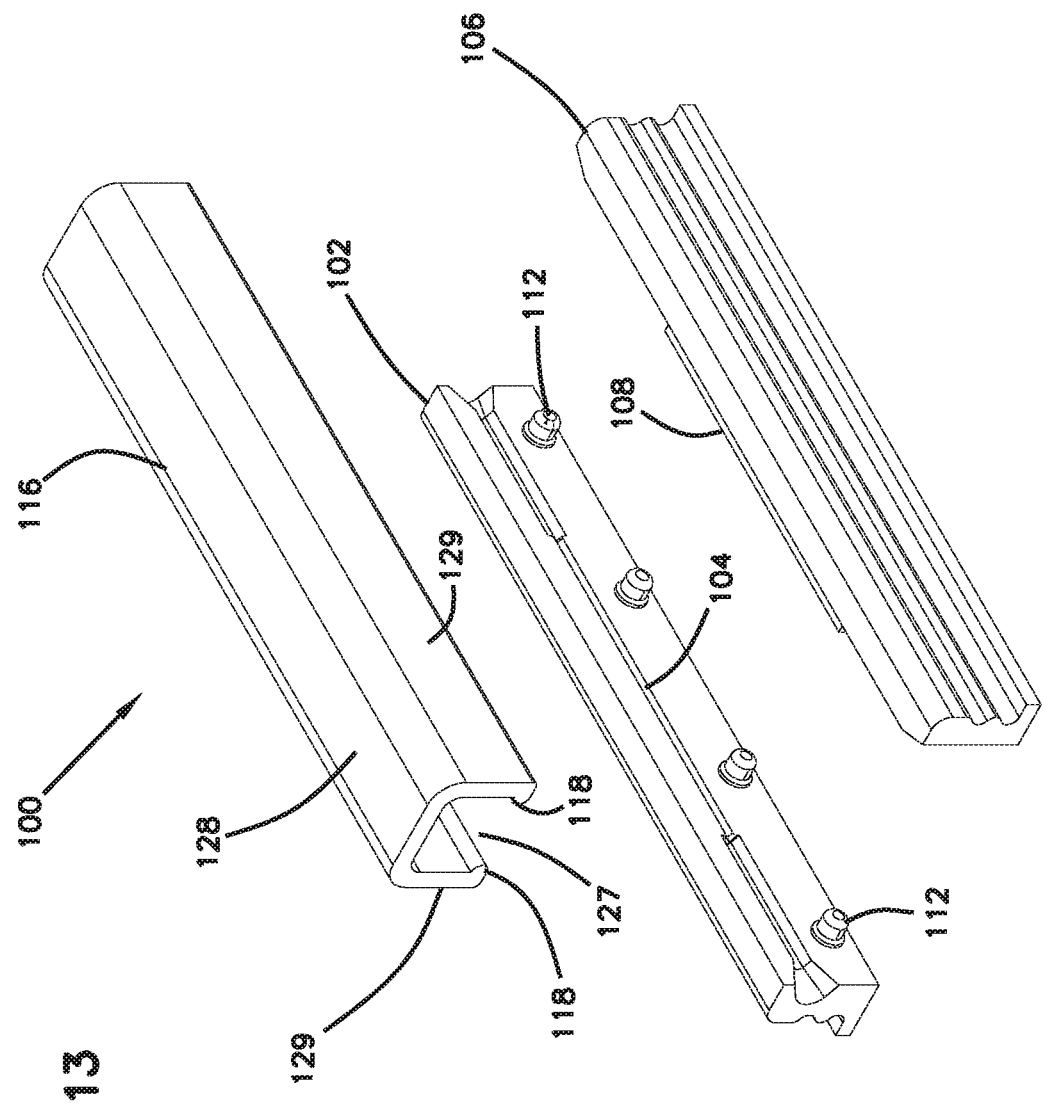
FIG. 13 is a perspective view of another fiber alignment device in accordance with the principles of the present disclosure.
Figure 14:
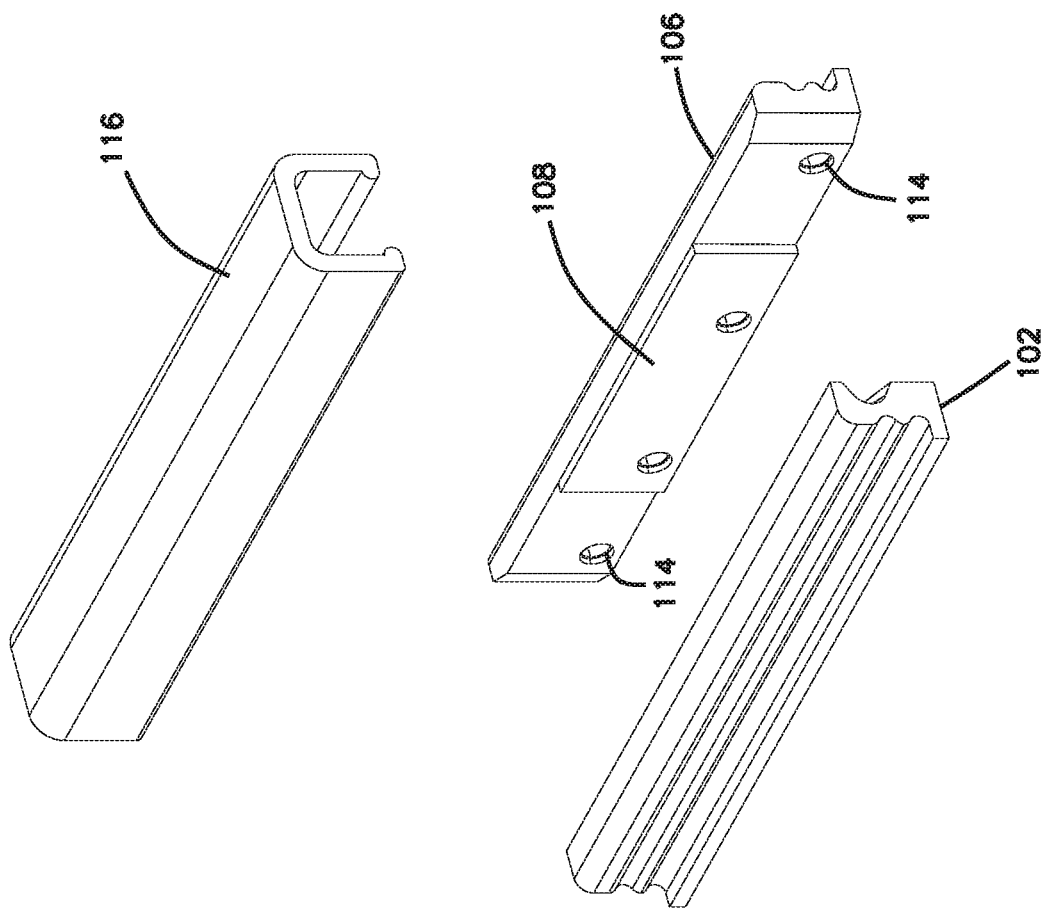
FIG. 14 is another perspective view of the fiber alignment device of FIG. 13.

Referring to FIG. 9, the fiber alignment groove 74 has a central portion 84 positioned axially between first and second end portions 86, 88. The central portion 84 of the fiber alignment groove 74 has a shorter depth and a smaller transverse-sectional profile than the first and second end portions 86, 88 of the fiber alignment groove 74. It will be appreciated that the central portion 84 is configured for receiving bare fiber portions of the optical fibers desired to be spliced together while the first and second end portions 86, 88 are configured for receiving coated portions of the optical fibers desired to be spliced together. The first and second end portions 86, 88 of the fiber alignment groove 74 have tapered lead-end sections 90 respectively at the first and second ends 80, 82 of the first piece 72. The first and second end portions 86, 88 also include non-tapered sections 92 positioned between the tapered lead-end sections 90 and the central portion 84 of the fiber alignment groove 74. The non-tapered sections 92 have larger transverse cross sectional profiles as compared to the transverse cross sectional profile of the fiber alignment groove 74 at the central portion 84. Steps 94 are provided at transitions between the non-tapered sections 92 and the central portion 84 of the fiber alignment groove 74.

In certain examples, the first and second pieces 72, 76 can be micro-molded pieces. In other examples, an alternative manufacturing process such as an etching processes (e.g., selective laser induced etching) can be used to manufacture the pieces 72, 76. In certain examples, a pressing tool can be used to move the second piece 76 from an unsnapped orientation to a snapped orientation over the first piece 72. In certain examples, the unsnapped configuration can be referred to as an open configuration and the snapped configuration can be referred to as a closed or clamped configuration. In certain examples, the first and second pieces 72, 76 can each have a non-round or non-circular outer transverse cross sectional profile. In certain examples, the first piece 72 and/or the second piece 76 can have one or more flat sides. In one example, the second piece 76 can have a generally u-shaped transverse cross-sectional profile defining a channel 77 for receiving the first piece 72. The second piece 76 can include legs 79 which define the channel 77 and include locking tabs or ribs 81 that snap within corresponding receptacles 83 defined by the outer sides of the first piece 72. It will be appreciated that the fiber clamping portion 78 can include a central stepped-down portion 78A which aligns with the central portion 84 of the fiber alignment groove 74 and stepped-up portions 78B that align with the first and second end portions 86, 88 of the fiber alignment groove 74.

FIGS. 13-16 illustrate another fiber alignment device 100 in accordance with the principles of the present disclosure which is adapted for facilitating implementing a splice between two optical fibers by a co-axially aligning the optical fibers and by clamping the optical fibers in a co-axially aligned position. The fiber alignment device 100 includes a first piece 102 defining a fiber alignment groove 104 that extends axially along the first piece 102 between first and second opposite ends of the first piece 102. It will be appreciated that the fiber alignment groove 104 can have the same basic configuration as the fiber alignment groove 74 previously described herein. The fiber alignment device 100 also includes a second piece 106 that mounts adjacent to the first piece 102. The second piece 106 includes a fiber clamping portion 108 that opposes the side of the first piece 102 defining the fiber alignment groove 104 when the first and second pieces 102, 106 are positioned adjacent to one another. It will be appreciated that the fiber clamping portion 108 is adapted to cover an open side of the fiber alignment groove 104 when the second piece 106 is positioned adjacent the first piece 102. It will be appreciated that the fiber alignment groove 104 can have regions with different cross sectional profiles to facilitate accommodating bare fiber portions and the coated portions of the optical fibers being aligned by the fiber alignment device 100, and the fiber clamping portion 108 can be stepped to accommodate the bare fiber portions and the coated portions of the optical fibers being aligned.

In a preferred example, the first and second pieces 102, 106 include mating features that mate to ensure registry between the first and second pieces 102, 106 while allowing the first and second pieces 102, 106 to be moved toward and away from one another while maintaining registry between the first and second pieces 102, 106. As depicted, example mating structures can include pins or posts 112 provided on the first piece 102 that fit within corresponding receptacles such as openings 114 defined by the second piece 106. The fiber alignment device 100, further includes a third piece 116 that mounts over the first and second pieces 102, 106 to force the first and second pieces together for clamping the fibers desired to be spliced within the fiber alignment groove 104. In a preferred example, the third piece 116 is a clip member that snaps over the first and second pieces 102, 106. In the depicted example, the third piece 116 has a generally u-shaped transverse cross-sectional shape or profile.

Figure 15A:
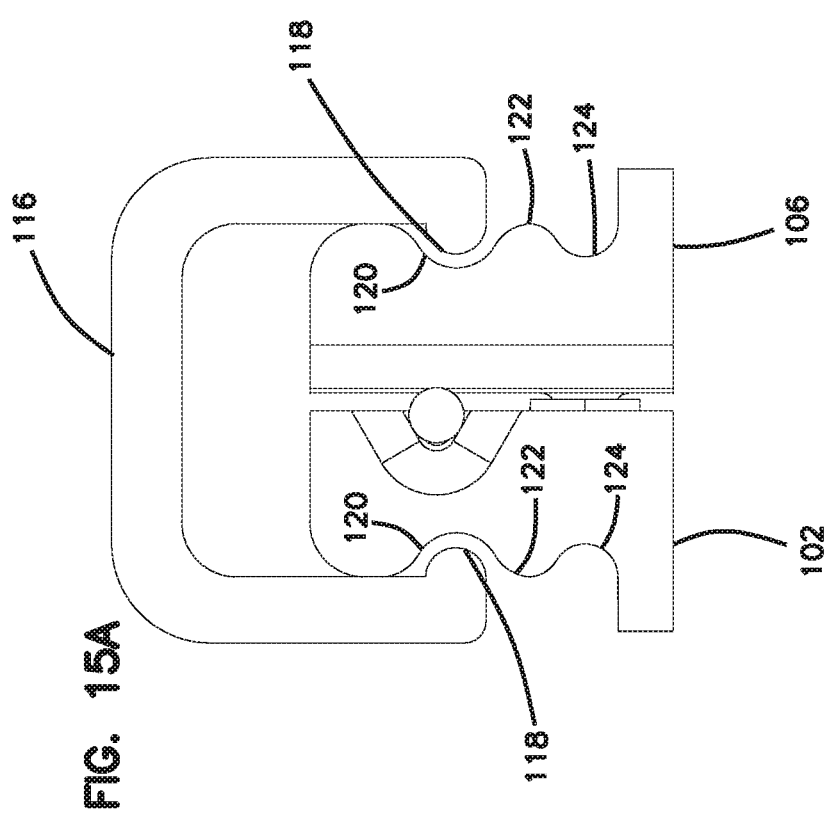
FIG. 15A is an end view of the fiber alignment device of FIGS. 13 and 14 with the fiber alignment device assembled in a staged, pre-clamping configuration and with an optical fiber in the alignment device.
Figure 15B:
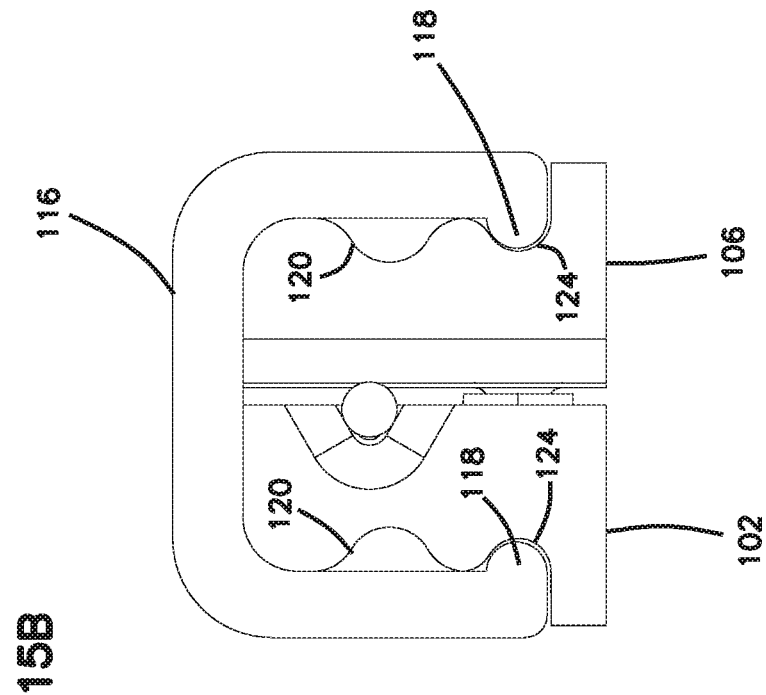
FIG. 15B is an end view of the fiber alignment device of FIGS. 13 and 14 with the fiber alignment device assembled in a clamping configuration and with an optical fiber in the alignment device.
Figure 16:
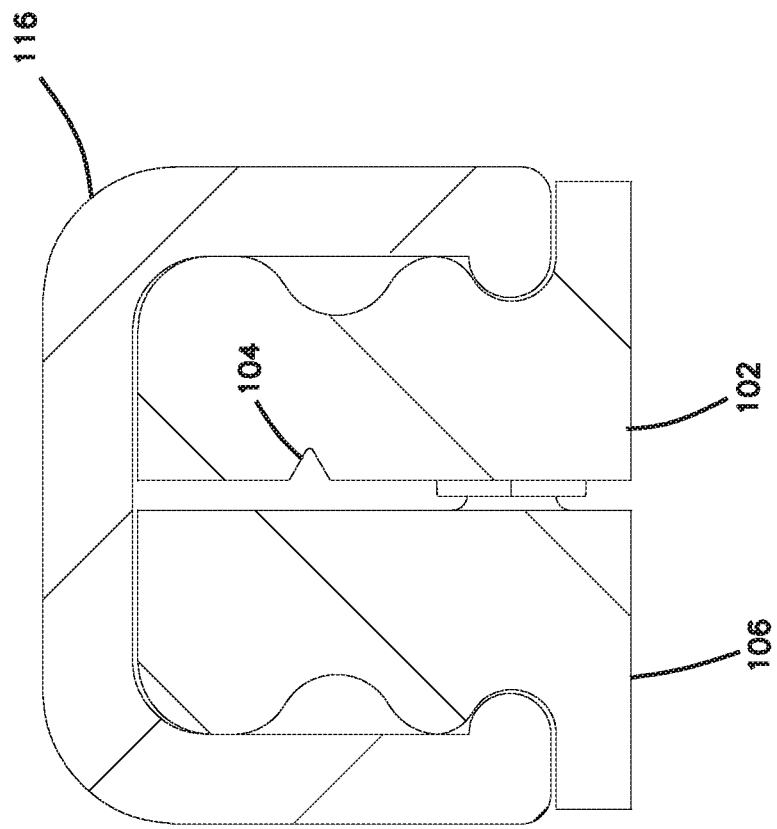
FIG. 16 is a cross-sectional view through a central region of the assembled fiber alignment device of FIGS. 13 and 14 while the fiber alignment device is in the clamping configuration.
Figure 22:
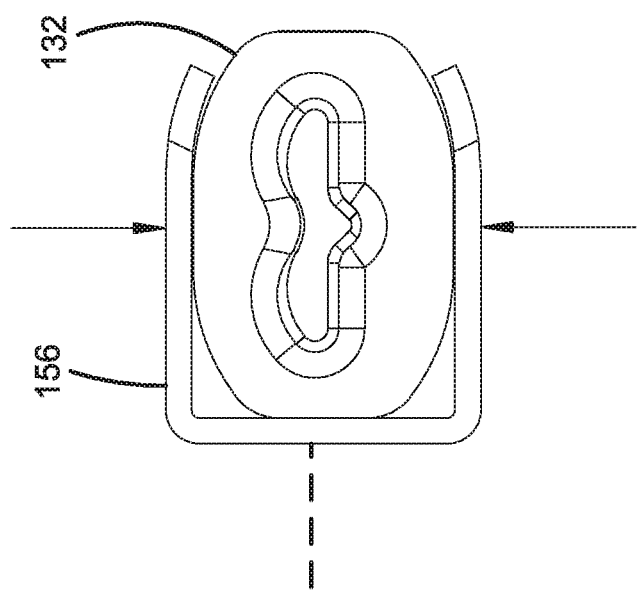
FIG. 22 shows the fiber alignment device of FIG. 21 of the fiber clamping state.
Figure 21:
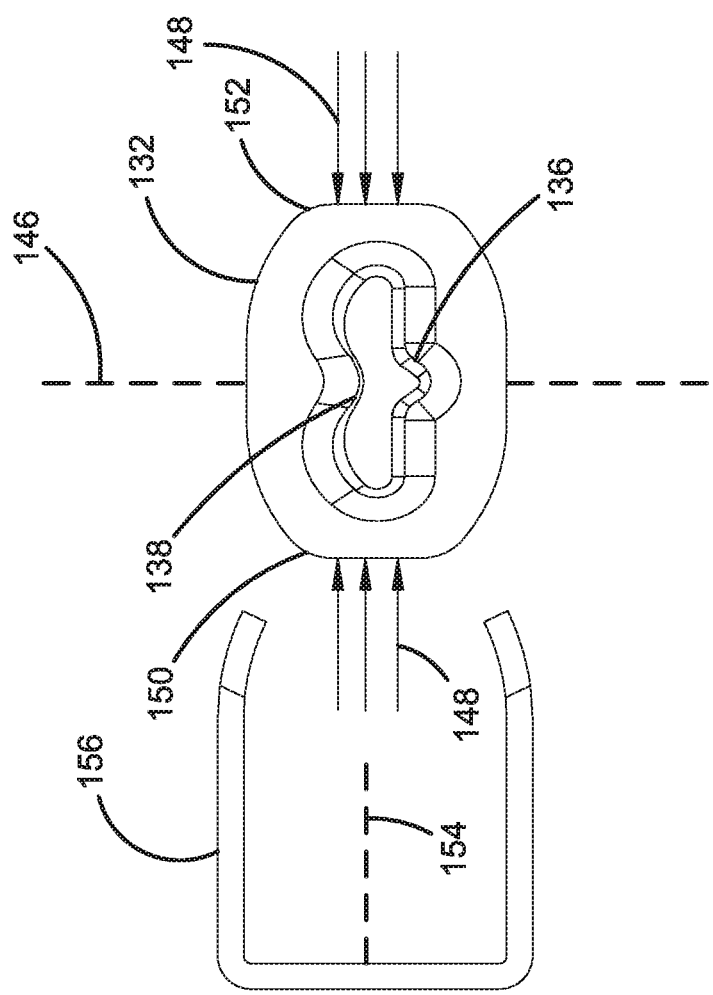
FIG. 21 shows the fiber alignment device of FIG. 17 being compressed to move the fiber alignment device to an expanded state.

It will be appreciated that the third piece 116 can be disposed in two positions relative to the first and second pieces 102, 106. For example, FIG. 15A shows the third piece 116 in a first, staged position where retainers 118 are snapped within staging notches 120 defined by the first and second pieces 102, 106. The staging notches 120 are sized relative to the retainers 118 such that the first and second pieces 102, 104 are held together but not tightly clamped together. Preferably, when the third piece 116 is in the staging position, the first and second pieces 102, 106 are held together relatively loosely such that the optical fibers can be readily axially inserted into the fiber alignment groove 104 from opposite ends of the fiber alignment device 100. It will be appreciated that the third piece 116 can be mounted at the staging position at the factory. Once the optical fibers have been fully inserted into the fiber alignment device 100 and are in an abutting relation relative one another within the fiber alignment groove 104, the third piece 116 can be moved from the first, staging position of FIG. 15A to a second, clamping position of FIG. 15B. As the third piece 116 is moved from the staging position to the clamping position, the third piece flexes past intermediate projections 122 on the first and second pieces 102, 106 and the retainers 118 snap into clamping notches 124 defined by the first and second pieces 102, 106. The clamping notches 124 are sized relative to the retainers 118 and the remainder of the third piece 116 such that the third piece 116 is configured to clamp together the first and second pieces 102, 106. When the third piece 116 has been moved to the clamping position, optical fibers within the fiber alignment groove 104 are securely clamped in place to prevent axial movement relative to one another within the fiber alignment groove 104.

As indicated above, the third piece 116 can be a clip-member having a u-shaped transverse cross-section. The clip member includes a central portion 128 and legs 129 that project from the central portion. The leg 129 and the central portion 128 cooperate to define a channel 127 for receiving the first and second pieces 102, 106 therein. The retainers 118 can include projections located at free ends of the legs 129.

FIGS. 17-22 depict still another fiber alignment device 130 for facilitating making an optical splice between two optical fibers by co-axially aligning the optical fibers and by clamping the aligned optical fibers in place. The fiber alignment device 130 includes a fiber alignment sleeve 132 defining a fiber alignment passage 134 which extends axially through the fiber alignment sleeve 132. In the depicted example, the fiber alignment sleeve 132 has a transverse cross-sectional shape that fully surrounds the fiber alignment passage 134 without any interruptions or breaks (e.g., there are no grooves or slots that extend completely through the wall of the fiber alignment sleeve 132 from the outer surface of the alignment sleeve to the fiber alignment passage 134). In certain examples, the fiber alignment sleeve 132 is manufactured using an extrusion process. In certain examples, the fiber alignment sleeve 132 can have separate axial pieces having interiors with different fiber alignment passage configurations. By utilizing different axial pieces to form the fiber alignment sleeve 132, extrusion processing technology can be utilized to form the fiber alignment sleeve 132 (e.g., the separate axial pieces with different internal shapes can be separately extruded) while still having different fiber alignment passage configurations along the length of the fiber alignment sleeve 132 within the interior of the fiber alignment sleeve 132. It is preferred for each of the axial pieces of the fiber alignment sleeve 132 to be formed as a single, monolithic piece capable of providing optical fiber clamping.

Referring to FIGS. 19 and 20, the fiber alignment passage 134 includes a fiber positioning groove 136 that can have different shapes and sizes at the different axial sections of the fiber alignment sleeve 132. The fiber alignment sleeve 132 also includes a clamping surface 138 within the fiber alignment passage 134 that opposes the fiber positioning groove 136. It will be appreciated that the spacing between the clamping surface 138 and the fiber positioning groove 136 can be varied at the different axial pieces of the fiber alignment sleeve 132. For example, at a central section 140 of the fiber alignment sleeve 132, the fiber positioning groove 136 and the clamping surface 138 can be configured for clamping bare portions of optical fibers (see FIG. 19). In contrast at the end axial sections 142, 144, the clamping surface 138 and the fiber positioning groove 136 can be configured to clamp coated portions of optical fibers. FIG. 20 is a cross-sectional view representative of an example channel configuration for the end axial sections 142, 144, while FIG. 19 is a cross-sectional view showing a representative transverse cross-sectional profile suitable for the central section 140. The spacing between the fiber positioning groove 136 and the clamping surface is larger at the axial end sections 142, 144 as compared to at the central section 140.

It will be appreciated that the fiber alignment sleeve 132 is moveable between a relaxed state and an expanded state. The clamping surface 138 and the fiber positioning groove 136 are moveable relative to one another along a first axis 146 when the fiber alignment sleeve is moved between the relaxed state and the expanded state. The fiber alignment sleeve 132 can be moved from the relaxed state to the expanded state by applying compressive forces 148 to opposite outer sides 150, 152 of the fiber alignment sleeve 132 (see FIG. 21). In certain examples, a tool can be used to concurrently apply the compressive forces 148 to all the axial sections of the fiber alignment sleeve 132 while holding the various axial sections of the fiber alignment sleeve 132 in alignment with one another. As the fiber alignment sleeve 132 elastically deforms from the relaxed state to the expanded state, a spacing between the fiber positioning groove 136 and the clamping surface 138 increases. The compressive forces 148 are preferably applied along a second axis 154 that is perpendicular relative to the first axis 146. When the fiber alignment sleeve 132 has been deformed to the expanded state, the spacing between the fiber positioning groove 136 and the clamping surface 138 is preferably large enough that optical fibers desired to be co-axially aligned can readily be inserted into the fiber alignment passage 134 from opposite ends of the fiber alignment sleeve 132. Once the optical fibers have been inserted into the fiber alignment sleeve 132, the optical fibers are co-axially aligned by the fiber positioning groove 136. Preferably the optical fibers are pushed into the fiber alignment sleeve 132 until the ends of the optical fibers abut one another. Once the optical fibers are co-axially aligned and in an abutting relationship in respect to one another within the fiber alignment sleeve 132, the compressive force 148 can be released thereby allowing the fiber alignment sleeve 132 to return from the expanded state back toward the relaxed state via the inherent internal elasticity of the fiber alignment sleeve 132.

Once the compressive force 148 has been released and the fiber alignment sleeve 132 elastically returns back towards the relaxed state, the optical fibers are clamped within the fiber alignment sleeve 132. Additional clamping force can then be applied to the optical fibers by installing a supplemental clamping member 156 about the exterior of the fiber alignment sleeve 132 that provides additional clamping loading for forcing the clamping surface 138 and the fiber positioning groove 136 together along the first axis 146. In one example, the supplemental clamping member 156 can include a clip. Certain examples, of the clip can be made of a material having a composition that includes metal such as spring steel or other type of material having a highly elastic characteristic/material property.

Referring to FIGS. 19 and 20, the fiber alignment sleeve 132 has a transverse cross-sectional shape that is longer along the second axis 154 as compared to the first axis 146. Similarly, the fiber alignment passage 134 of the fiber alignment sleeve 132 also has a transverse cross-sectional shape that is longer along the second axis 154 as compared to the first axis 146. The elongated transverse-cross-sectional profile of the fiber alignment sleeve 132 facilitates manufacturing a construction where the fiber alignment sleeve 132 can be moved from a relaxed state to an expanded state by compressing the exterior of the fiber alignment sleeve 132. However, in other examples, the fiber alignment sleeve may have a transverse cross-sectional profile that is not elongated along a particular axis.

Referring still to FIGS. 19 and 20, the clamping surface 138 can be defined by a projection 160. In one example, the projection 160 can have a height along the first axis 146 and a length that extends axially through the length of the fiber alignment sleeve 132. The projection 160 can be continuous/uninterrupted along its axial length or can be broken into segments. In certain examples, projection arrangements having more than one fiber contact location can be used to press the optical fibers into the corresponding fiber positioning grooves 136. Additionally, it is also contemplated that the fiber contact surfaces can be flat surfaces, curved/rounded surfaces or can be generally pointed.

Figure 23:
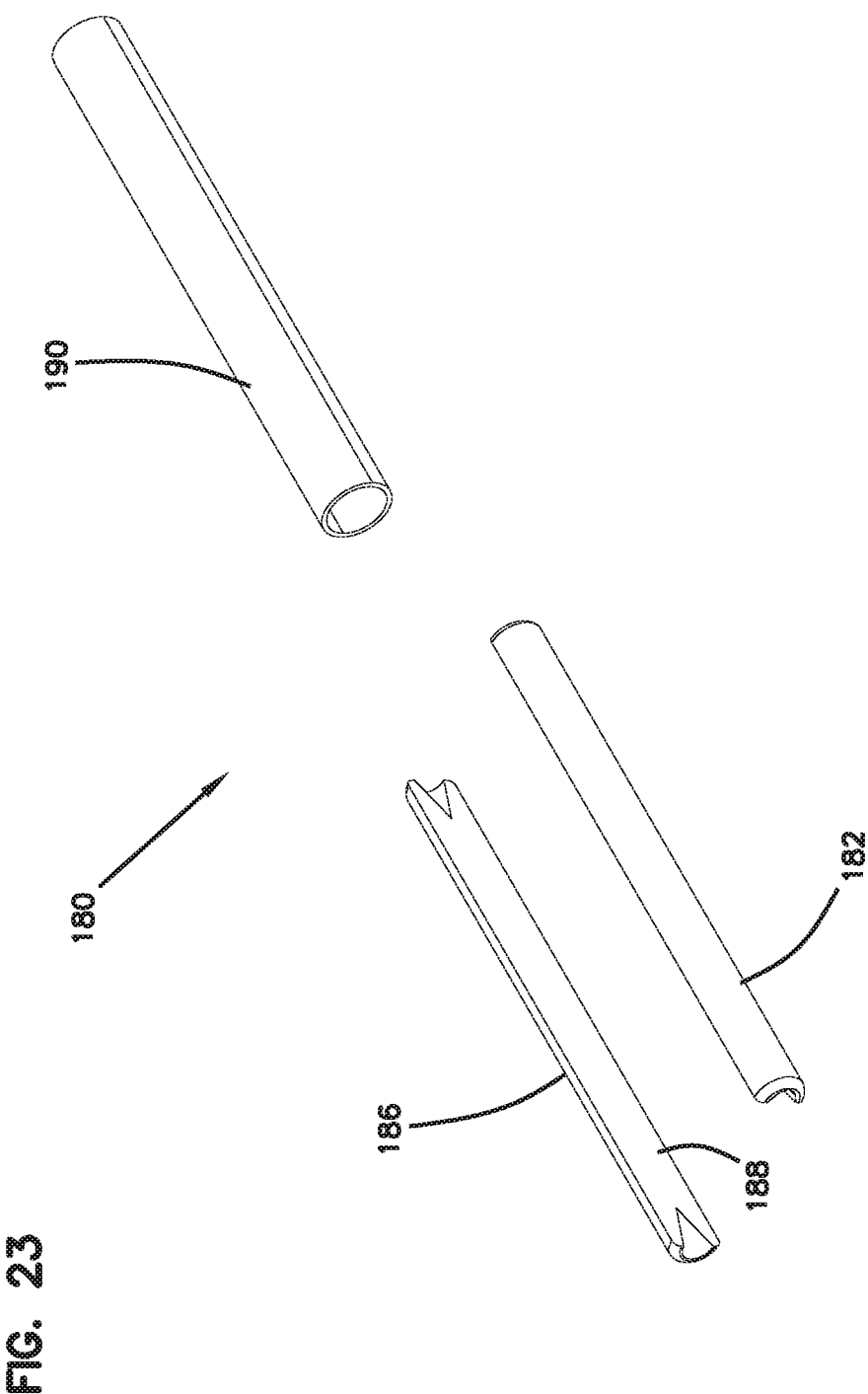
FIG. 23 is an exploded view of still another fiber alignment device in accordance with the principles of the present disclosure.
Figure 24:
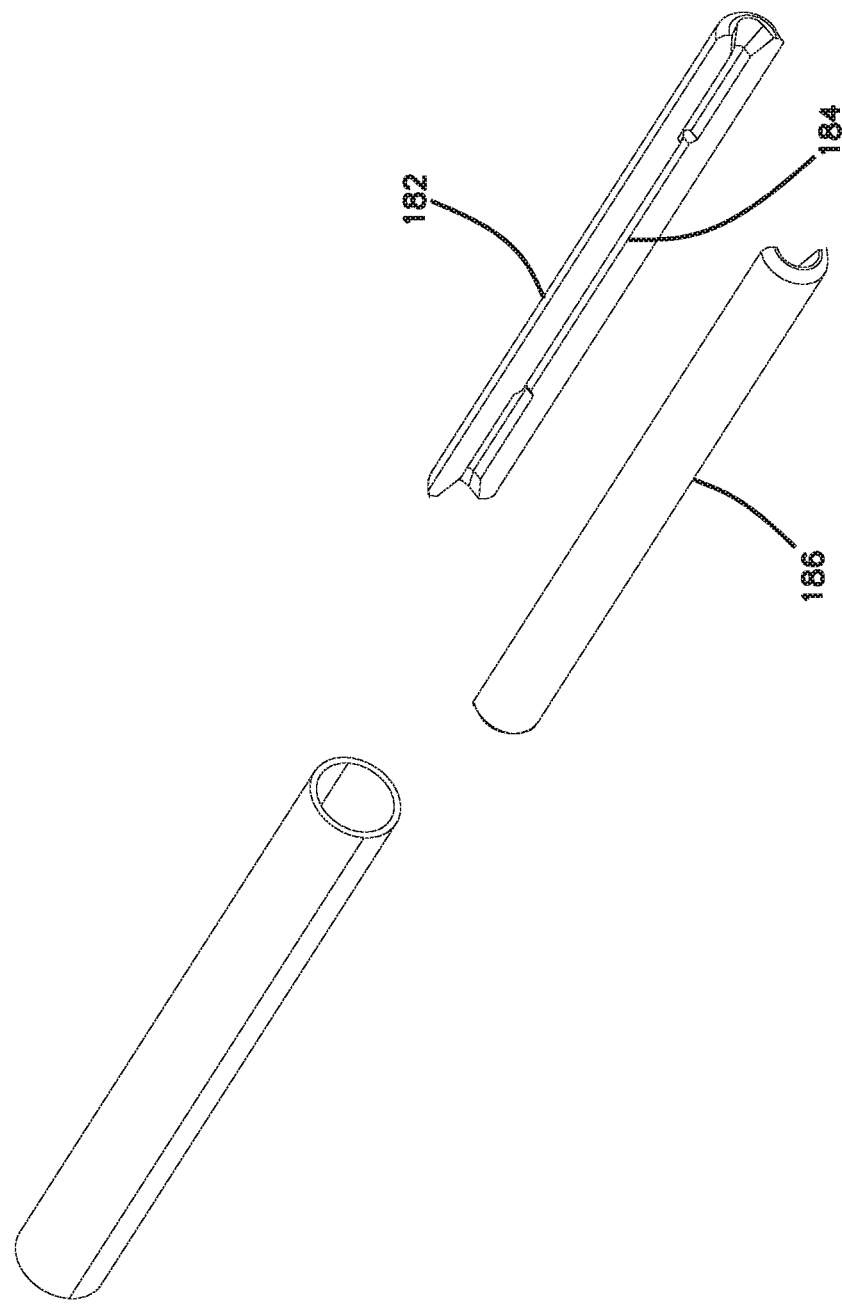
FIG. 24 is another perspective view of the fiber alignment device of FIG. 23.
Figure 25:
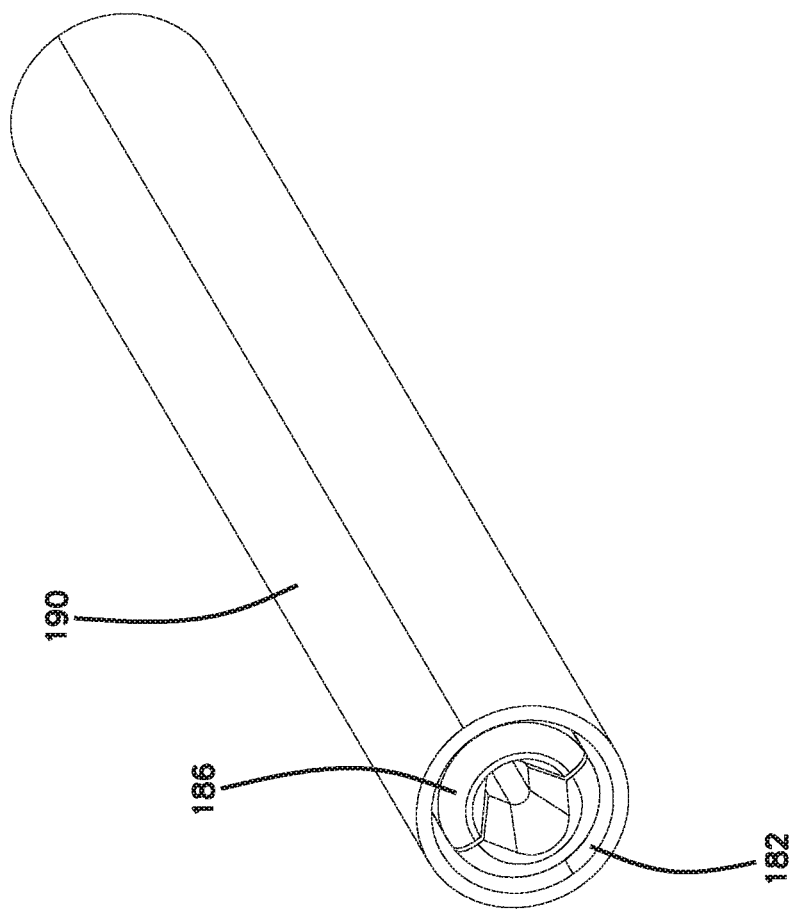
FIG. 25 is an assembled perspective view of the fiber alignment device of FIGS. 23 and 24.

FIGS. 23-25 depict a further fiber alignment device 180 in accordance with the principles of the present disclosure for use in implementing optical splices between optical fibers. The fiber alignment device 180 includes a first piece 182 defining a fiber alignment groove 184 for receiving end portions of optical fibers desired to be spliced together. The fiber alignment device 180 also includes a second piece 186 adapted to be positioned adjacent to the first piece 182. The second piece includes a fiber clamping portion 188 adapted to oppose and/or cover an open side of the fiber alignment groove 184 when the first and second pieces 182, 186 are positioned adjacent to one another. The fiber alignment device 180 further includes a third piece 190 that mounts over the first and second pieces 182, 186 to force the first and second pieces 182, 186 together such that the optical fibers positioned between the first and second pieces 182, 186 are clamped within the fiber alignment groove 184. In the depicted example, the third piece 190 is shape-memory sleeve having an expanded state and a shape-memory state which is smaller than the expanded state. In a preferred example, when the third piece 190 is in the expanded state, the third piece is sized to fit over the first and second pieces 182, 186. It will be appreciated that the shape-memory state of the third piece 190 is smaller than the outer shape of the first and second pieces 182, 186 such that when the third piece 190 is moved from the expanded state toward the shape-memory state, the third piece 190 radially compresses the first and second pieces 182, 186 contained therein causing clamping of the fibers held between the first and second pieces 182, 186. In a preferred example, the shape-memory piece is moved from the expanded shape-memory state by applying energy to the shape-memory piece. For example, the shape-memory piece can be a heat-shrink tube which reduces in size from an expanded state toward a shape-memory state when heat is applied to the piece. In other examples, other forms of energy can be applied to the shape-memory piece to reduce the size. In certain examples, adhesive can be provided within the shape memory piece. In certain examples, ends of the shape-memory piece wrap around axial ends of the first and second pieces of 182, 186 to prevent the first and second pieces 182, 186 from being axially displaced from within the third piece 190.

Figure 28:
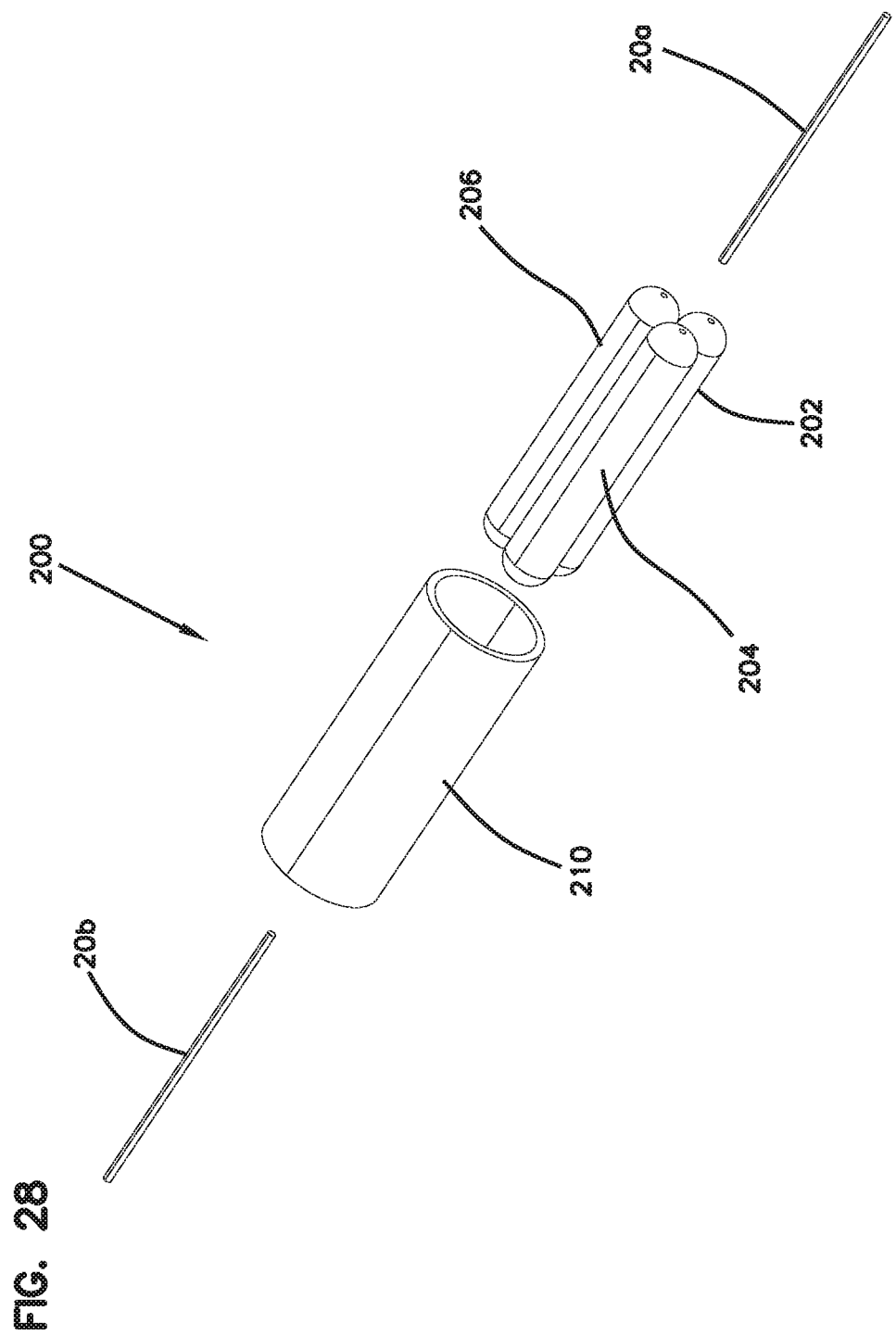
FIG. 28 is an exploded view of the fiber alignment device of FIG. 26.

FIGS. 26-28 depict still another fiber alignment device 200 in accordance with the principles of the present disclosure for implementing an optical splice between first and second optical fibers. The fiber alignment device 200 includes first, second and third rods 202, 204 and 206 that cooperate to define a fiber alignment passage 208 centered between the rods 202, 204 and 206. The fiber alignment passage 208 is adapted for receiving optical fibers 20a, 20b therein from opposite ends of the fiber alignment device 200. The fiber alignment device 200 also includes a shape-memory sleeve 210 that mounts over the first, second and third rods 202, 204 and 206. By moving the shape-memory sleeve 210 from an expanded state to a smaller shape-memory state while the sleeve 210 is mounted over the rods 202, 204 and 206, the rods can be radially compressed together thereby clamping optical fibers in place at the fiber alignment passage 208. In certain examples, the rods 202, 204 and 206 are generally cylindrical with rounded, dome-shaped ends. In certain examples, the fiber alignment passage 208 is sized to be capable of clamping bare optical fibers having diameters as small as 125 microns. Of course, as with any of the embodiments disclosed herein, the fiber alignment device can be sized to accommodate fibers of various different sizes.

Figure 29:
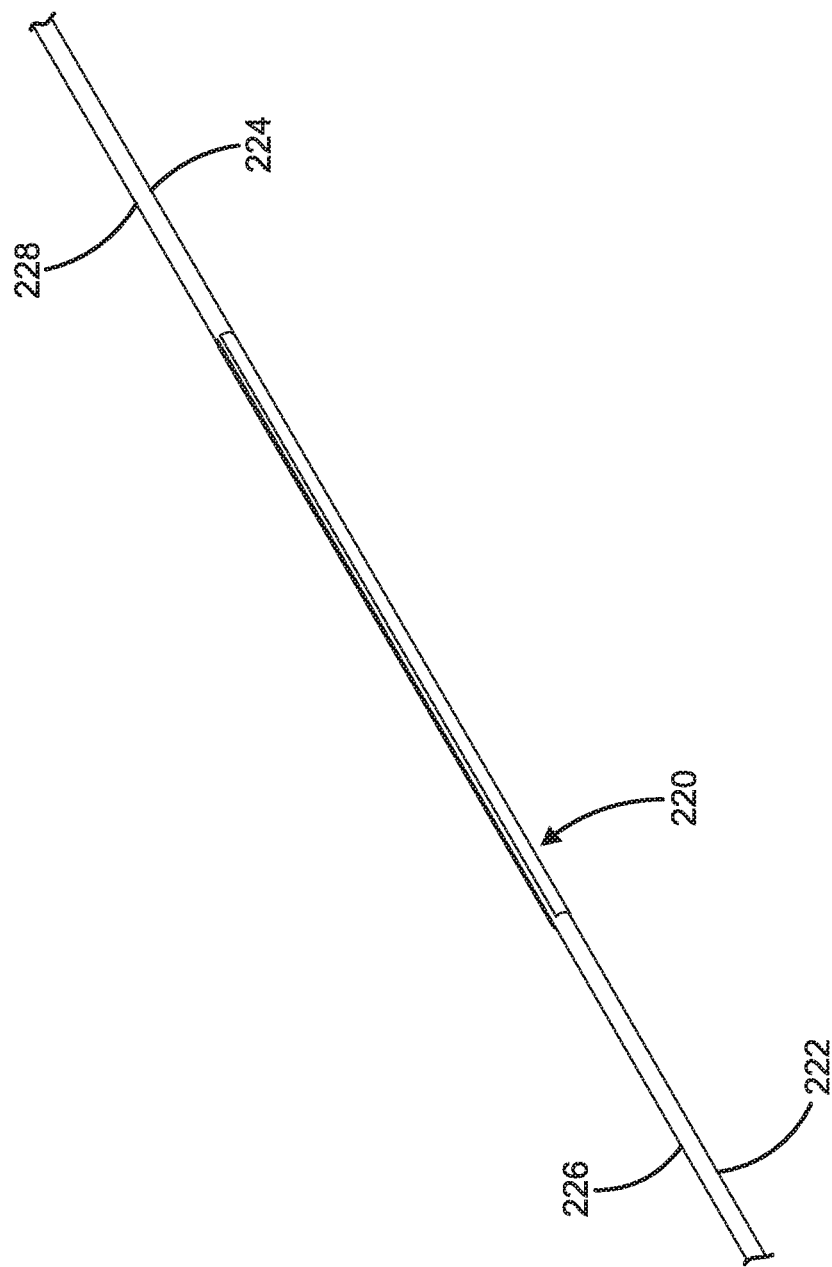
FIG. 29 is still another fiber alignment device in accordance with the principles of the present disclosure.
Figure 30:
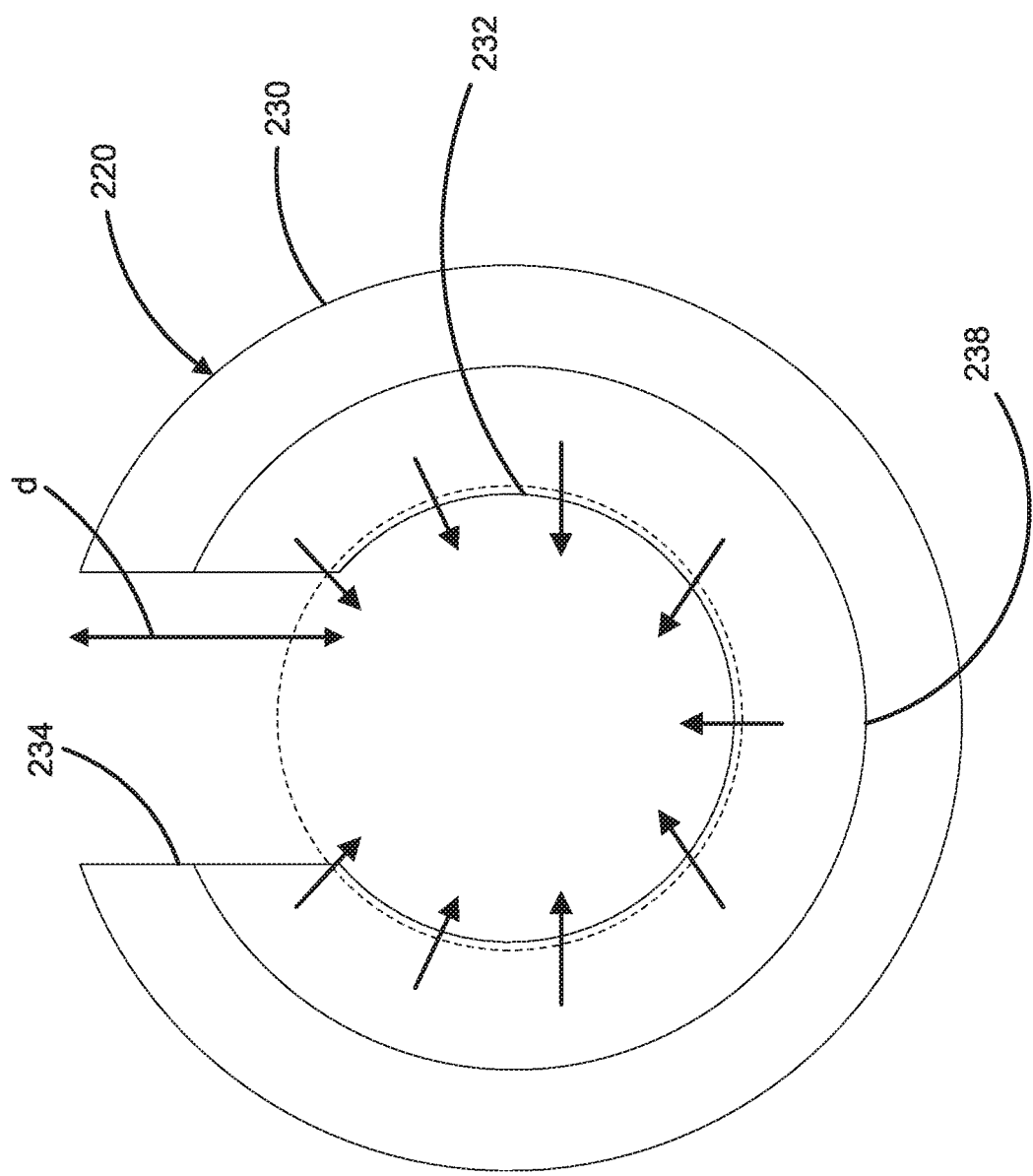
FIG. 30 is an end view of the fiber alignment device of FIG. 29.
Figure 31:
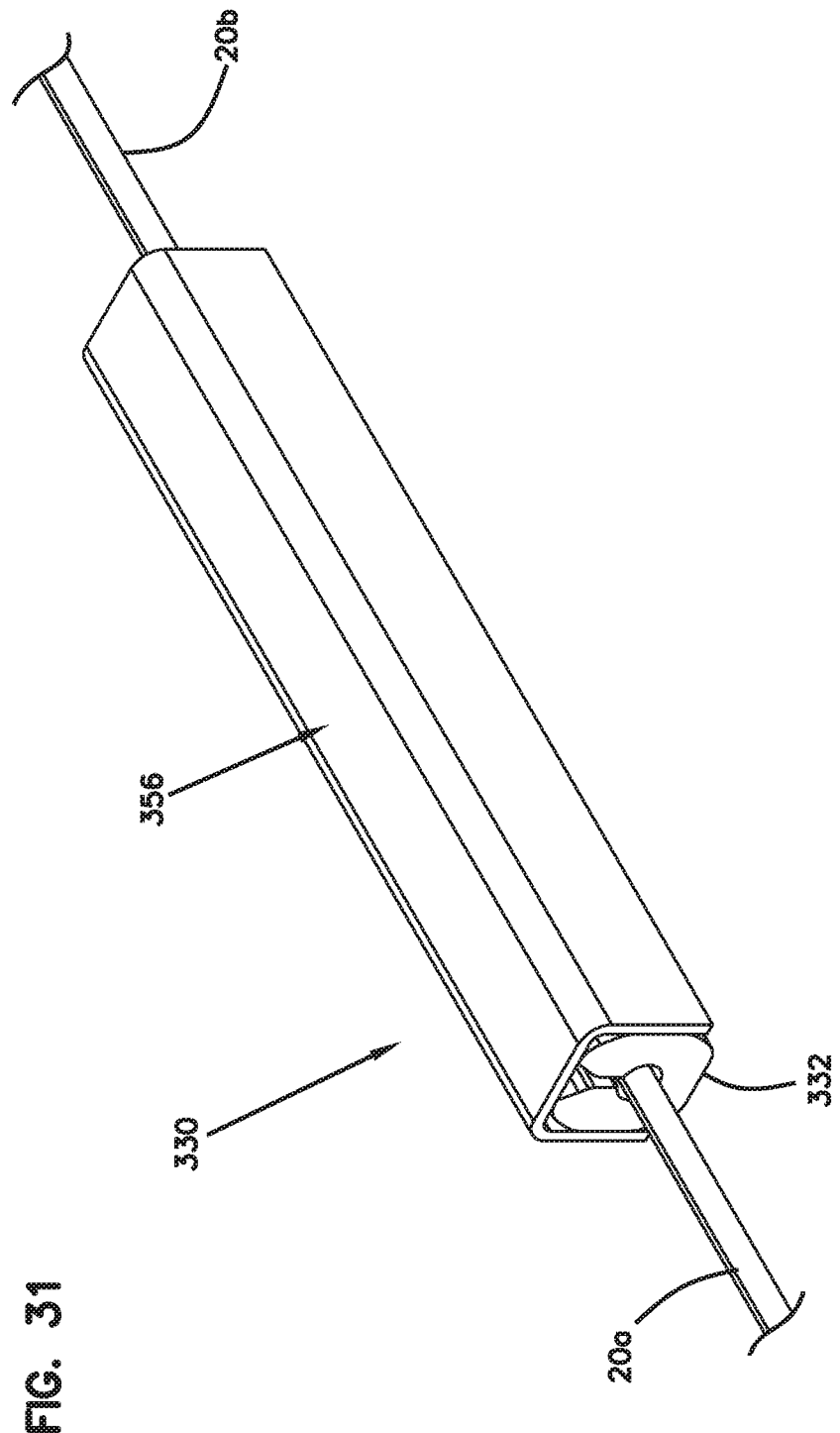
FIG. 31 is a perspective view of another example fiber alignment device surrounding an optical splice between two optical fibers in accordance with the principles of the present disclosure, the fiber alignment device including an alignment sleeve and a clamping device.
Figure 32:
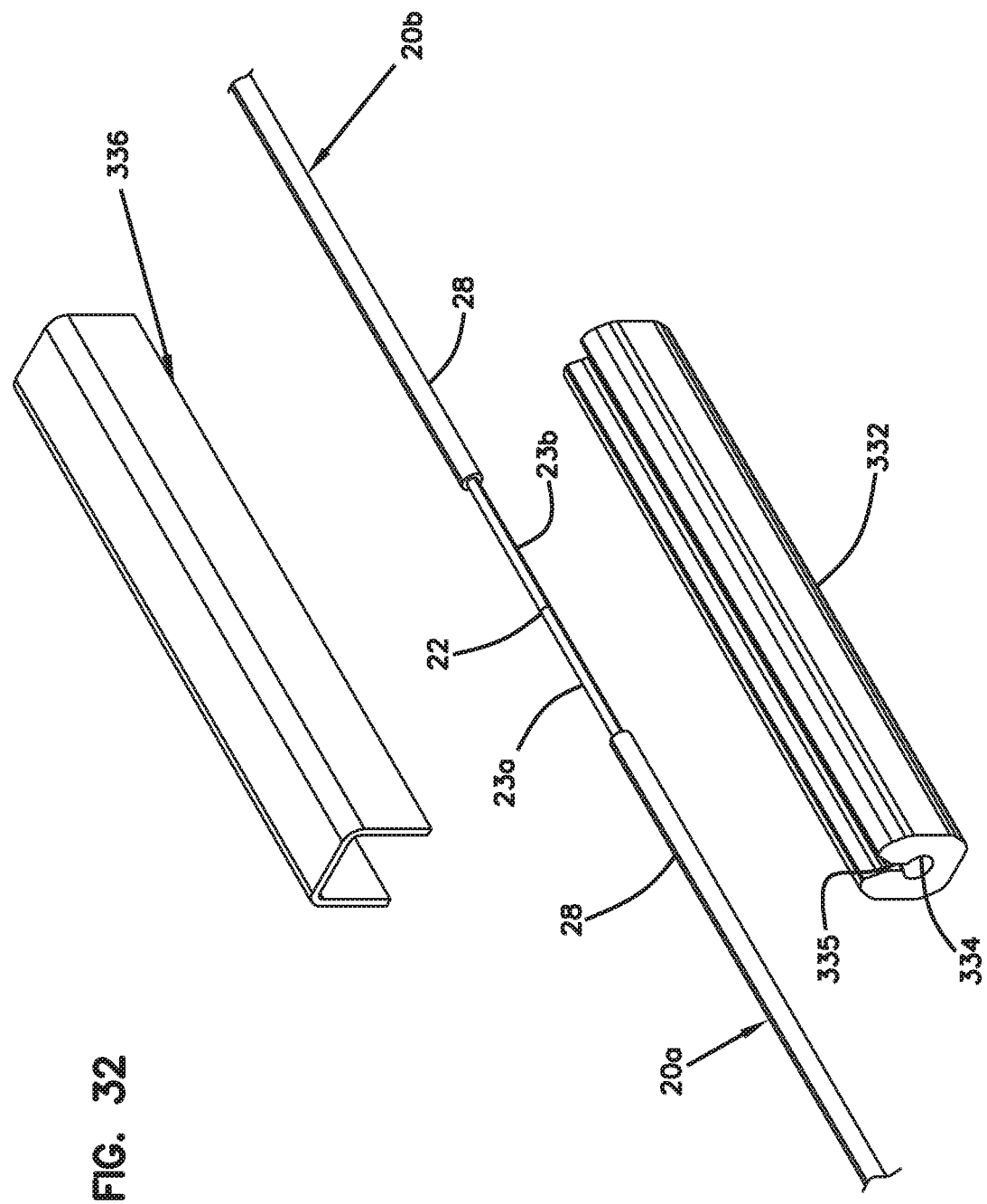
FIG. 32 is an exploded view of the fiber alignment device of FIG. 31.
Figure 33:
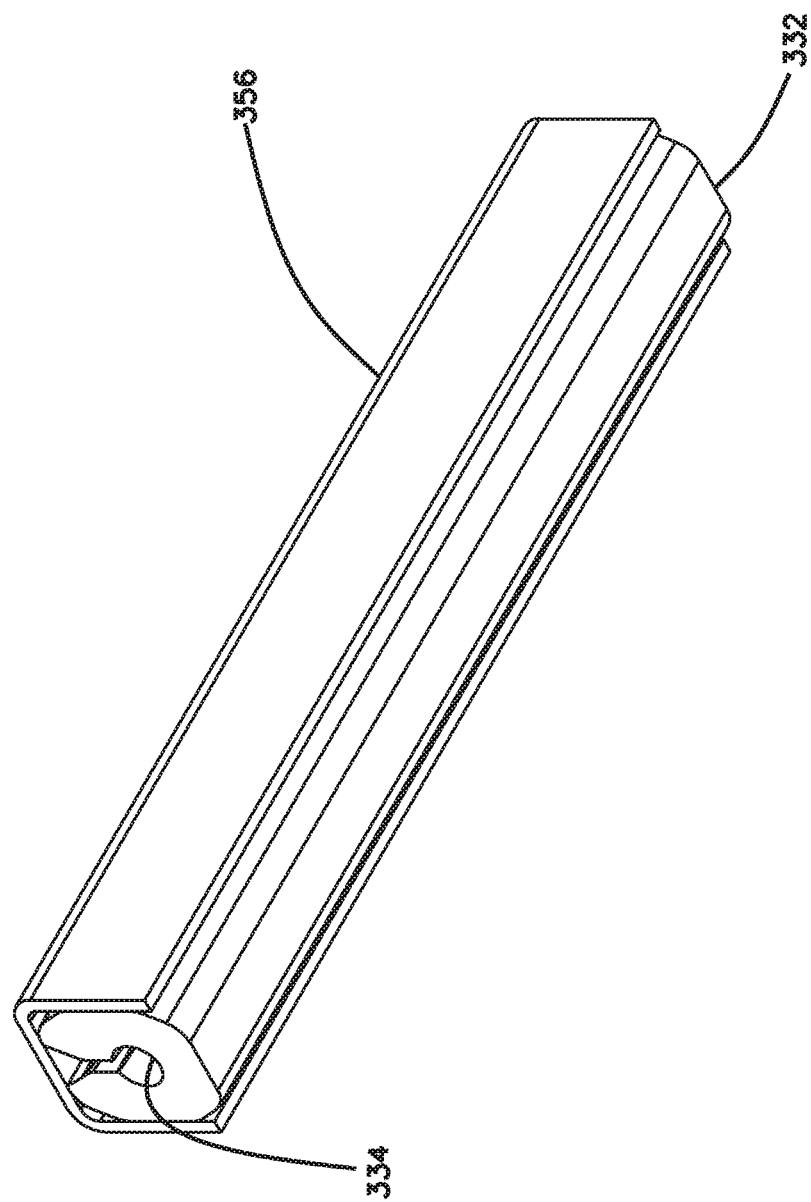
FIG. 33 is a perspective view showing the fiber alignment device of FIG. 31 with the fibers removed for ease in viewing.

FIGS. 29 and 30 depict a further fiber alignment device 220 in accordance with the principles of the present disclosure for aligning and clamping optical fibers together so as to form an optical splice between the optical fibers. In certain examples, the fiber alignment device 220 has a single-piece construction which consists of only one piece. In certain examples, the fiber alignment device 220 can have an outer shape or transverse cross sectional profile adapted to match the outer shape of a coated optical fiber. In certain examples, the fiber alignment device 220 has an outer diameter less than 300 microns, or less than 275 microns, or less than 260 microns or about 250 microns or less than 225 microns, or about 200 microns. In certain examples, the fiber alignment device 220 is configured for clamping bare fiber portions of optical fibers. In certain examples, the fiber alignment device 220 is configured for clamping optical fibers having diameters as small as a 125 microns. In certain examples, the fiber alignment device 220 has an inner diameter less than 125 microns. FIG. 29 shows the fiber alignment device 220 forming a splice location between first and second optical fibers 222, 224. Each of the optical fibers 222, 224 includes bare fiber portions that are co-axially aligned and clamped within the fiber alignment device 220. Each of the optical fibers 222, 224 also includes coated portions 226, 228 having outer shapes or profiles that generally match the outer shape or profile of the fiber alignment device 220. In one example, the fiber alignment device 220 has an outer cylindrical shape or profile having an outer diameter of about 250 microns and the coated portions 226, 228 of the optical fibers 222, 224 have outer diameters of about 250 microns.

Referring to FIG. 30, the fiber alignment device 220 includes a fiber alignment sleeve 230 defining a fiber alignment passage 232 extending axially through the fiber alignment sleeve 230. The fiber alignment sleeve defines an axial slot 234 having a length that extends axially along the length of the fiber alignment sleeve 230 and a depth d that extends radially through the fiber alignment sleeve 230 from an outer surface 236 of the fiber alignment sleeve 230 to the fiber alignment passage 232. The fiber alignment sleeve 230 is movable between a relaxed state (shown at FIG. 30) and an expanded state. The fiber alignment sleeve 230 has a construction having elastic characteristics adapted for biasing the fiber alignment sleeve 230 toward the relaxed state from the expanded state. Thus, the fiber alignment sleeve 230 is adapted to move by its own internal inherent elasticity from the expanded state toward the relaxed state. It will be appreciated that the fiber alignment passage 232 is larger in the expanded state than in the relaxed state. When the fiber alignment sleeve 230 is in the expanded state the optical fibers 222, 224 can be inserted axially into the fiber alignment passage 232. The fiber alignment sleeve 230 is sized such that when the fiber alignment sleeve 230 is in the relaxed state, the fiber alignment passage 232 is radially smaller at least in certain orientations than the portions of the optical fibers intended to be aligned and clamped within the fiber alignment sleeve 230. Thus, by expanding the fiber alignment sleeve 230, inserting the optical fibers therein and then allowing the fiber alignment sleeve 230 to move back toward the relaxed state, the optical fibers are effectively clamped within the fiber alignment passage 232. It will be appreciated that the fiber alignment sleeve 230 is configured to flex at a location 238 opposite the axial slot 234 when the fiber alignment sleeve is moved from the relaxed state toward the expanded state. It will be appreciated that a tool can be used to move the fiber alignment 230 from the relaxed state to the expanded state, and to hold the fiber alignment sleeve 230 in the expanded state while the optical fibers are inserted into the fiber alignment passage 232. In certain examples, the fiber alignment passage 232 has an inner diameter less than 125 microns, and the outer surface 236 of the fiber alignment sleeve 230 defines an outer diameter of the fiber alignment device 220 that is less than 300 microns. In another example, a shape memory tube such as a heat shrink tube can be mounted over the sleeve 230. Ends of the shape memory tube can extend past the sleeve 230 on the coated portions of the optical fibers 222, 224. The shape memory tube can overlap and reinforce the transition locations between the optical fibers 222, 224 and the ends of the sleeve 230. In certain examples, the sleeve 230 can contain index matching gel.

FIGS. 31-35 depict still another fiber alignment device 330 for facilitating making an optical splice 22 between two optical fibers 20a, 20b by co-axially aligning the optical fibers and by clamping the aligned optical fibers in place. The fiber alignment device 330 includes a fiber alignment sleeve 332 defining a fiber alignment passage 334 which extends axially through the fiber alignment sleeve 332. In the depicted example, the fiber alignment sleeve 332 has a transverse cross-sectional shape that partially surrounds the fiber alignment passage 334. A groove or slot 335 extends completely through the wall of the fiber alignment sleeve 332 from the outer surface of the alignment sleeve to the fiber alignment passage 334. The groove 335 is defined between surfaces 331, 333, which at least partially oppose each other. For example, first sections of the surfaces 331, 333 oppose each other while second sections of the surfaces 331, 333 face partially towards each other and partially towards an exterior of the sleeve 332. In certain examples, the fiber alignment sleeve 332 is manufactured using an extrusion process.

Figure 35:
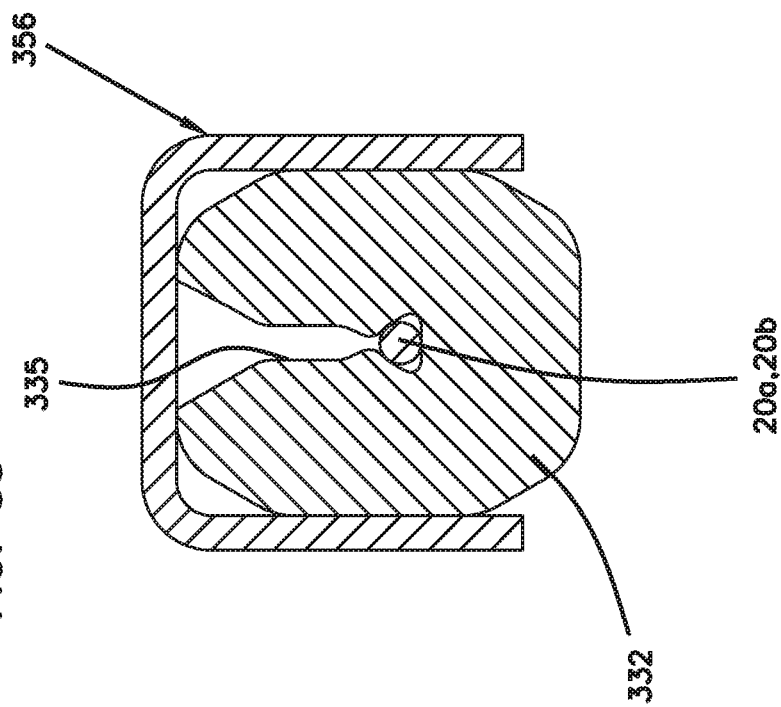
FIG. 35 is a transverse cross-sectional view of the fiber alignment device of FIG. 31.
Figure 34:
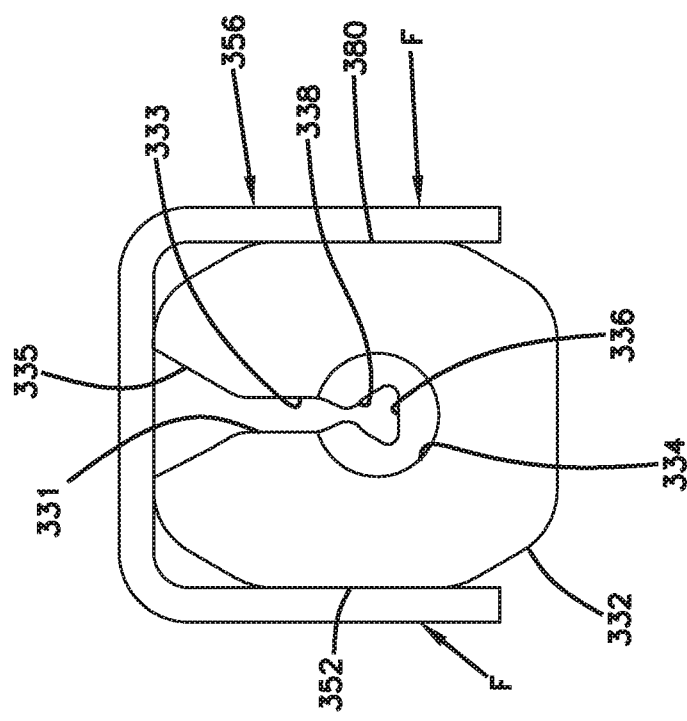
FIG. 34 is an end view of the fiber alignment device of FIG. 33.
Figure 37:
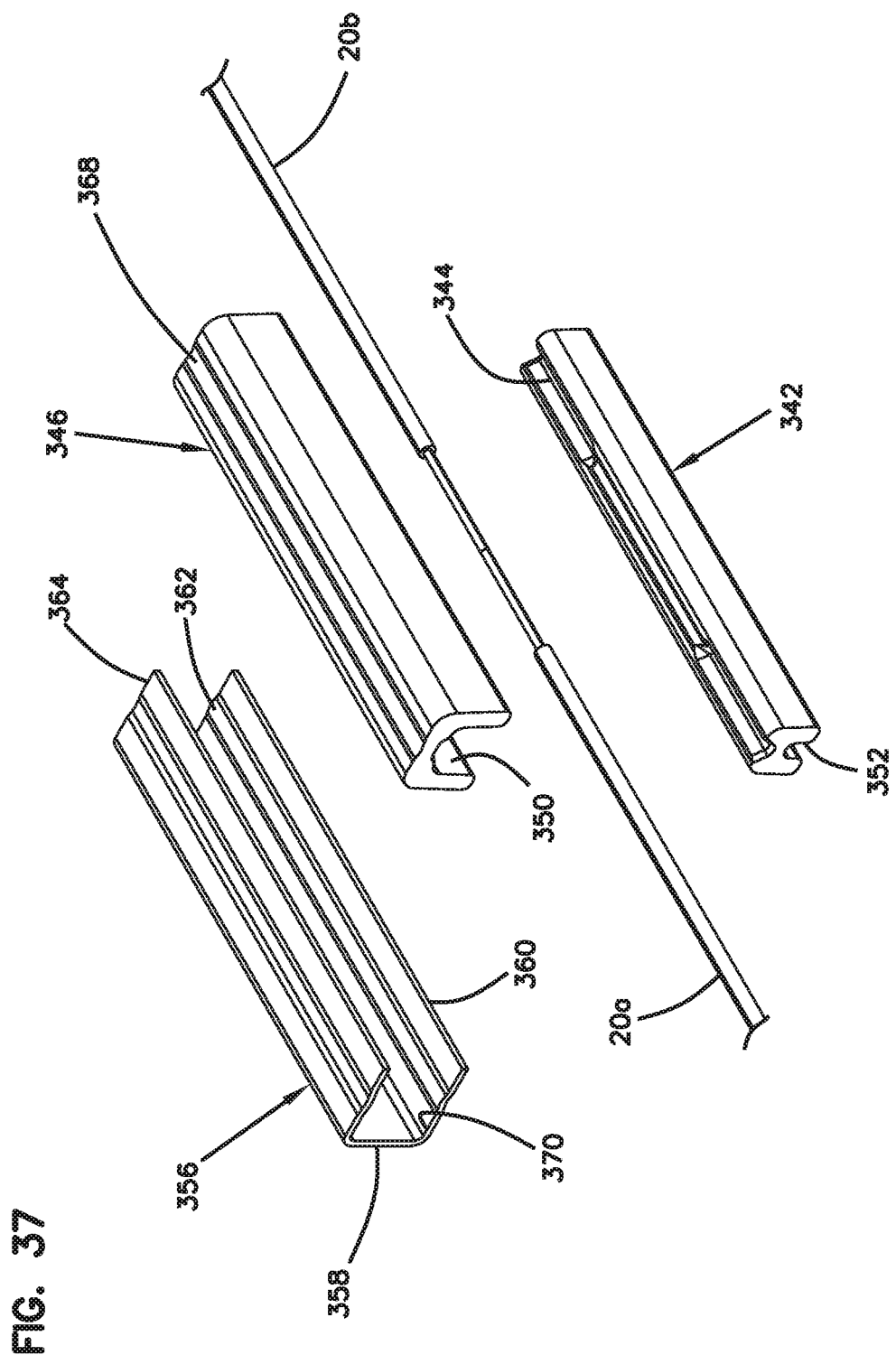
FIG. 37 is a top perspective view of the fiber alignment device of FIG. 36 exploded away from the optical fibers.
Figure 38:
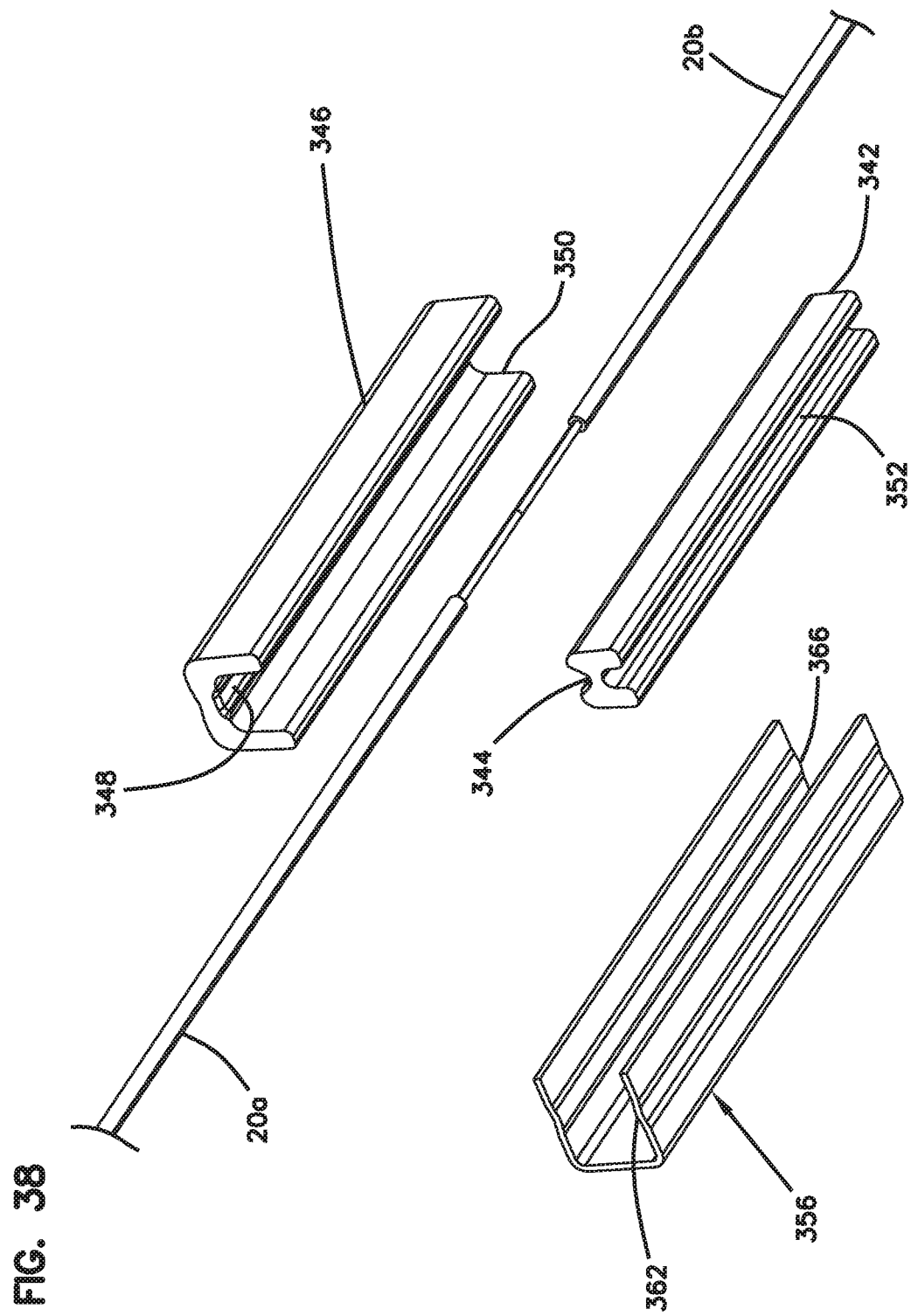
FIG. 38 is a bottom perspective view of the fiber alignment device of FIG. 36 exploded away from the optical fibers.
Figure 40:
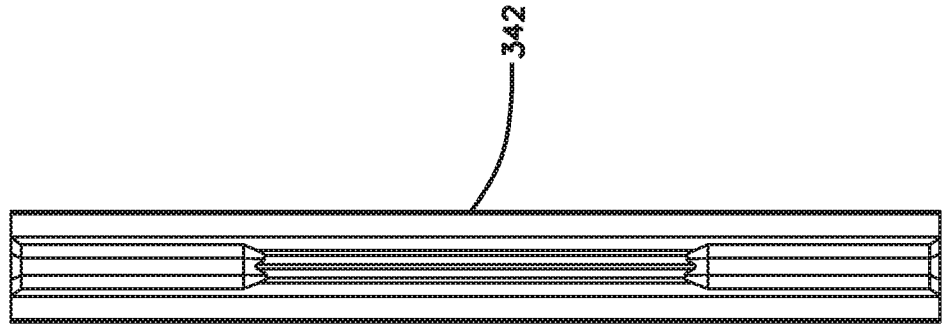
FIG. 40 is a top plan view of the first piece of FIG. 39.
Figure 39:
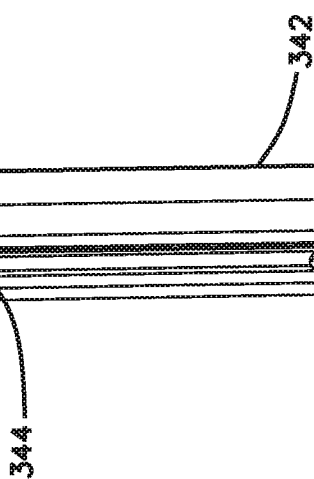
FIG. 39 is a perspective view of an example first piece of the fiber alignment device, the first piece defining a fiber alignment groove.

Referring to FIGS. 34 and 35, the fiber alignment passage 334 includes a fiber positioning groove 336 that can have different shapes and sizes at different axial sections of the fiber alignment sleeve 332. The fiber alignment sleeve 332 also includes one or more clamping surfaces 338 within the fiber alignment passage 334 at least partially facing the fiber positioning groove 336. In the example shown, two clamping surfaces 338 face the fiber positioning groove 336—one at each side of the groove 335. It will be appreciated that the spacing between the clamping surface(s) 338 and the fiber positioning groove 336 can vary along the axial length of the fiber alignment sleeve 332. For example, at a central section of the fiber alignment sleeve 332, the fiber positioning groove 336 and the clamping surface 338 can be configured for clamping bare portions of optical fibers (see FIG. 35). In contrast, at the end axial sections of the sleeve 332, the clamping surface 338 and the fiber positioning groove 336 can be configured to clamp coated portions of optical fibers (see FIG. 31). The spacing between the fiber positioning groove 336 and the clamping surface(s) 338 is larger at the axial end sections as compared to at the central section of the fiber alignment sleeve 332.

It will be appreciated that the fiber alignment sleeve 332 is moveable between a relaxed state and a compressed state. The clamping surface 338 and the fiber positioning groove 336 are moveable relative to one another when the fiber alignment sleeve 332 is moved between the relaxed state and the compressed state. The fiber alignment sleeve 332 can be moved from the relaxed state to the compressed state by applying compressive forces F to opposite outer sides 350, 352 of the fiber alignment sleeve 332 (see FIG. 34). As the fiber alignment sleeve 332 elastically deforms from the relaxed state to the compressed state, a spacing between the fiber positioning groove 336 and the clamping surface 338 decreases.

When the fiber alignment sleeve 332 is in the relaxed state, the spacing between the fiber positioning groove 336 and the clamping surface 338 is preferably large enough that optical fibers 20a, 20b desired to be co-axially aligned can readily be inserted into the fiber alignment passage 334 from opposite ends of the fiber alignment sleeve 332. In certain examples, the fibers 20a, 20b can be inserted laterally into the fiber alignment sleeve 332 through the groove 335 when the sleeve 332 is in the relaxed state. For example, the groove 335 can be enlarged by moving the opposing surfaces 331, 333 away from each other while the sleeve 332 is relaxed.

Once the optical fibers have been inserted into the fiber alignment sleeve 332, the optical fibers are co-axially aligned by the fiber positioning groove 336. Preferably the optical fibers 20a, 20b are pushed into the fiber alignment sleeve 332 until the ends of the optical fibers abut one another. Once the optical fibers are co-axially aligned and in an abutting relationship in respect to one another within the fiber alignment sleeve 332, the compressive force F can be introduced to transition the sleeve 332 to the compressed state, thereby clamping the optical fibers 20a, 20b within the fiber alignment sleeve 332.

In certain examples, the compressive force inhibits removal of the optical fibers 20a, 20b from the fiber alignment sleeve 332. In some examples, applying the compressive forces F moves the surfaces 331, 333 of the sleeve 332 closer together to shrink the groove 335. In other examples, applying the compressive forces F does not move the surfaces 331, 333, but does inhibit the surfaces 331, 333 from being moved away from each other. In other examples, applying the compressive forces F moves the clamping surfaces 338 sufficiently towards the fiber positioning groove 336 to inhibit axial movement of the fibers 20a, 20b relative to each other.

The compressive force F can be applied to the optical fibers 20a, 20b by installing a clamping member 356 about the exterior of the fiber alignment sleeve 332. The clamping member 356 provides clamping loading for forcing the clamping surfaces 338 and the fiber positioning groove 336 together. In one example, the clamping member 356 can include a clip. Certain examples of the clip 356 can be made of a material having a composition that includes metal such as spring steel or other type of material having a highly elastic characteristic/material property.

FIGS. 36-44 illustrate another fiber alignment device 340 in accordance with the principles of the present disclosure which is adapted for facilitating implementing a splice between two optical fibers by a co-axially aligning the optical fibers 20a, 20b and by clamping the optical fibers in a co-axially aligned position. The fiber alignment device 340 includes a first piece 342 defining a fiber alignment groove 344 that extends axially along the first piece 342 between first and second opposite ends of the first piece 342. It will be appreciated that the fiber alignment groove 344 can have the same basic configuration as the fiber alignment groove 74 previously described herein.

The fiber alignment device 340 also includes a second piece 346 that mounts adjacent to the first piece 342. The second piece 346 includes a fiber clamping portion 348 that opposes the side of the first piece 342 defining the fiber alignment groove 344 when the first and second pieces 342, 346 are positioned adjacent to one another to define a passage 345. It will be appreciated that the fiber clamping portion 348 is adapted to cover an open side of the fiber alignment groove 344 when the second piece 346 is positioned adjacent the first piece 342.

It will be appreciated that the fiber alignment groove 344 can have axial regions with different cross sectional profiles to facilitate accommodating bare fiber portions and the coated portions of the optical fibers being aligned by the fiber alignment device 340. It will be appreciated that the spacing between the fiber clamping portion 348 and the fiber alignment groove 340 can be varied at the different axial pieces of the device 340. For example, the fiber clamping portion 348 can be stepped, contoured, or otherwise varied to accommodate the bare fiber portions and the coated portions of the optical fibers being aligned.

As shown in FIGS. 39-44, the fiber alignment groove 344 and the clamping surface 348 can be configured at a central section of the first and second pieces 342, 346 for clamping bare portions of optical fibers (see FIG. 43). In contrast at the end axial sections, the clamping surface 348 and the fiber positioning groove 344 can be configured to clamp coated portions of optical fibers. FIG. 43 is an end view showing of an example channel configuration for the end axial sections, while FIG. 44 is a cross-sectional view showing a representative transverse cross-sectional profile suitable for the central section. The spacing between the fiber positioning groove 344 and the clamping surface 348 is larger at the axial end sections as compared to at the central section.

In a preferred example, the first and second pieces 342, 346 include mating features that mate to ensure registry between the first and second pieces 342, 346 while allowing the first and second pieces 342, 346 to be moved toward and away from one another while maintaining registry between the first and second pieces 342, 346. As depicted, the first piece 342 can be nested with the second piece 346 (e.g., inserted partially or fully into a channel 350 defined in the second piece 346). For example, the second piece 346 may have a U-shaped, C-shaped, V-shaped, or otherwise shaped channel 350 sized to accommodate the first piece 342. As depicted in FIGS. 36 and 43, the first piece 342 may fit entirely inside the channel 350 of the second piece 346.

A top of the first piece 342 defines the fiber alignment groove 344. In certain examples, a bottom of the first piece 342 may be flush with a bottom of the second piece 346 when first piece 342 is mated with the second piece 346. In certain examples, the bottom of the first piece 342 defines a second groove 352. In an example, the second groove 352 is larger than the fiber alignment groove 344. In an example, the second groove 352 enables sufficient deformation of the first piece 342 to enable the first piece 342 to fit inside the channel 350 of the second piece 346. In an example, the second groove 352 enables sufficient deformation of the first piece 342 to be clamped within the second piece 346 as will be described in more detail herein.

The fiber alignment device 340 further includes a third piece 356 that mounts over the first and second pieces 342, 346 to hold the first and second pieces together for clamping the fibers 20a, 20b desired to be spliced within the fiber alignment groove 344. In a preferred example, the third piece 356 is a clip member that snaps over the first and second pieces 342, 346. In the depicted example, the third piece 356 has a generally u-shaped transverse cross-sectional shape or profile. As indicated above, the third piece 356 can be a clip-member having a u-shaped transverse cross-section. The clip member includes a central portion or base 358 and legs 360, 364 that project from the central portion 358. The leg 360, 364 and the central portion 358 cooperate to define a channel 370 for receiving the first and second pieces 342, 346 therein.

The optical fibers 20a, 20b can be inserted along the passage 345 from opposite ends of the fiber alignment device 340 when the first and second pieces 342, 346 are held together relatively loosely (i.e., without the third piece 356). Once the optical fibers have been fully inserted into the fiber alignment device 340 and are in an abutting relation relative one another within the fiber alignment groove 334, the third piece 356 can be moved to clamp together the first and second pieces 342, 346 as shown in FIG. 36. When the third piece 356 has been moved to the clamping position (see FIG. 36), optical fibers 20a, 20b within the fiber alignment groove 344 are securely clamped in place to prevent axial movement relative to one another within the fiber alignment groove 344.

In certain examples, the third piece 356 includes a retention feature that interfaces with a retention feature on the first and/or second piece 342, 346 to hold the third piece 356 in place. In the example shown, the third piece 356 has a base 358 from which two legs 360, 364 extend at opposite sides of the base 358. Each leg 360, 364 defines a bump or otherwise contoured section 362, 366, respectively, that projects towards the other leg. When the third piece 356 is mounted over the first and second pieces 342, 346, the projection 362 of the first leg 360 extends at least partially into the second groove 352 of the first piece 342 and the projection 366 of the second leg 364 extends at least partially into a shallow groove 368 defined in the top of the second piece 346.

In some implementations, the third piece 356 may be manually installed over the first and second pieces 342, 346. In other implementations, the third piece 356 is installed using a pressing tool. For example, the third piece 356 may have sufficient spring force and the channel 350 may be sufficiently sized to inhibit manual installation by a user.

FIGS. 45-54 and 57-60 illustrate other fiber alignment devices 380, 600 in accordance with the principles of the present disclosure which is adapted for facilitating implementing a splice between two optical fibers by a co-axially aligning the optical fibers 20a, 20b and by clamping the optical fibers in a co-axially aligned position. The fiber alignment device 380, 600 includes a first piece 382, 602 defining a fiber alignment groove 384, 604 that extends axially along the first piece 382, 602 between first and second opposite ends of the first piece 382, 602. It will be appreciated that the fiber alignment groove 384, 604 can have the same basic configuration as the fiber alignment groove 74 previously described herein.

Figure 52:
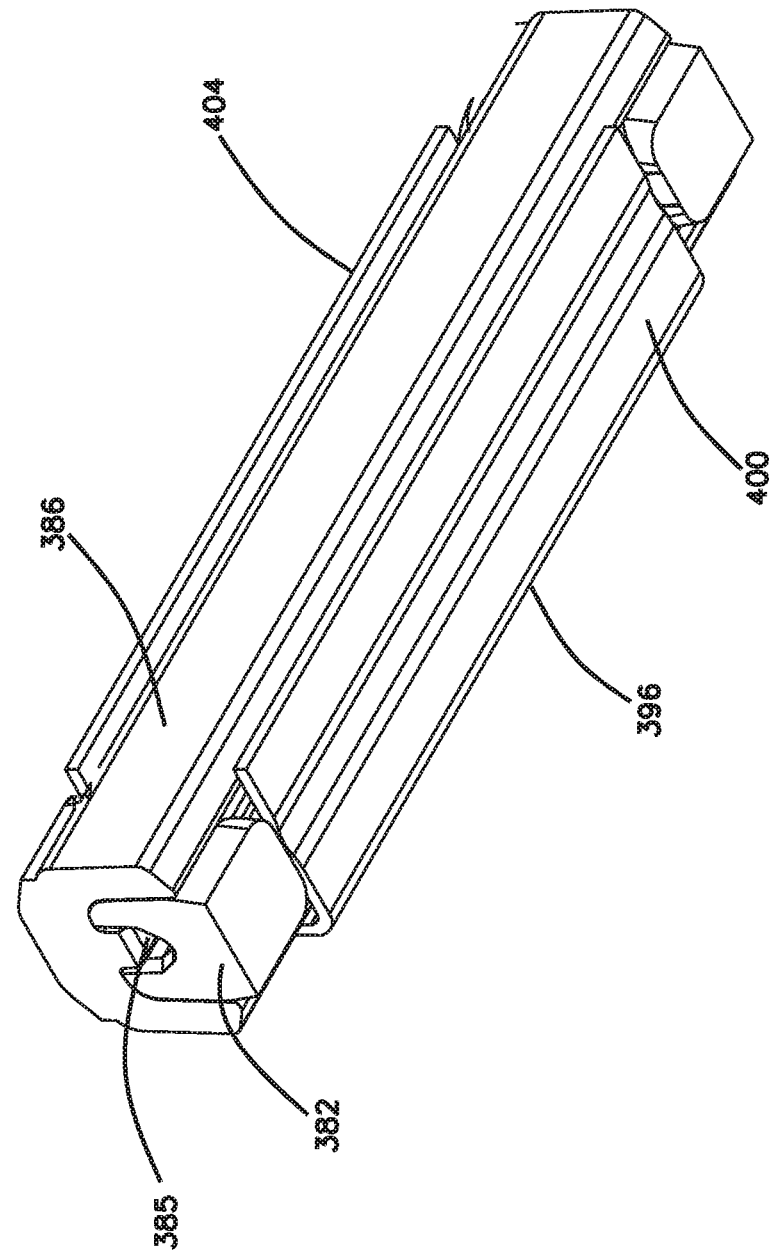
FIG. 52 shows the fiber alignment device of FIG. 46 with a spring clip clamped around the first and second pieces.
Figure 53:
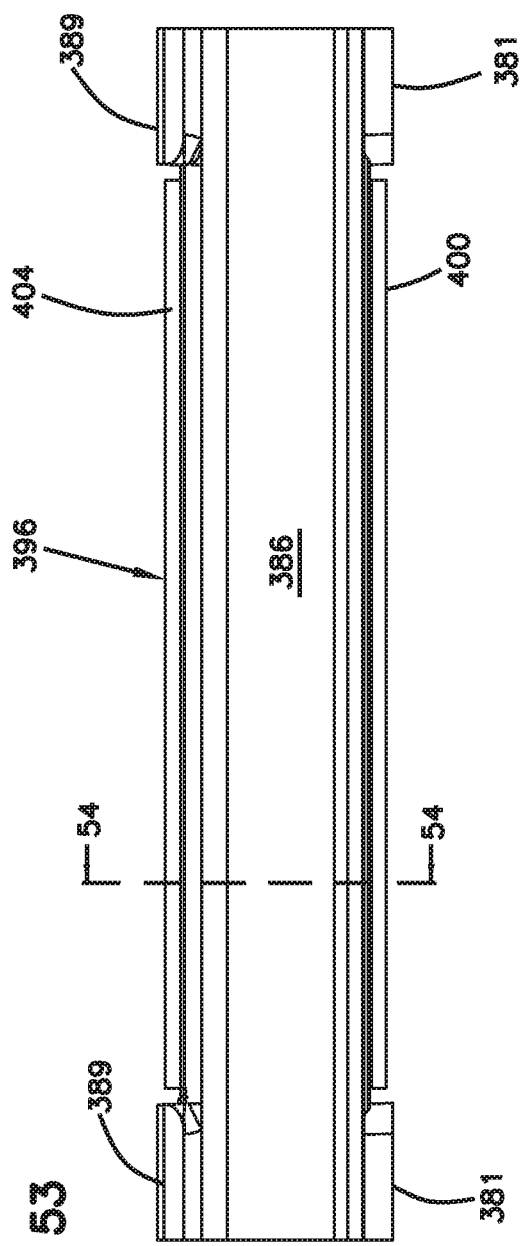
FIG. 53 illustrates a side elevational view of the fiber alignment device of FIG. 52.
Figure 60:
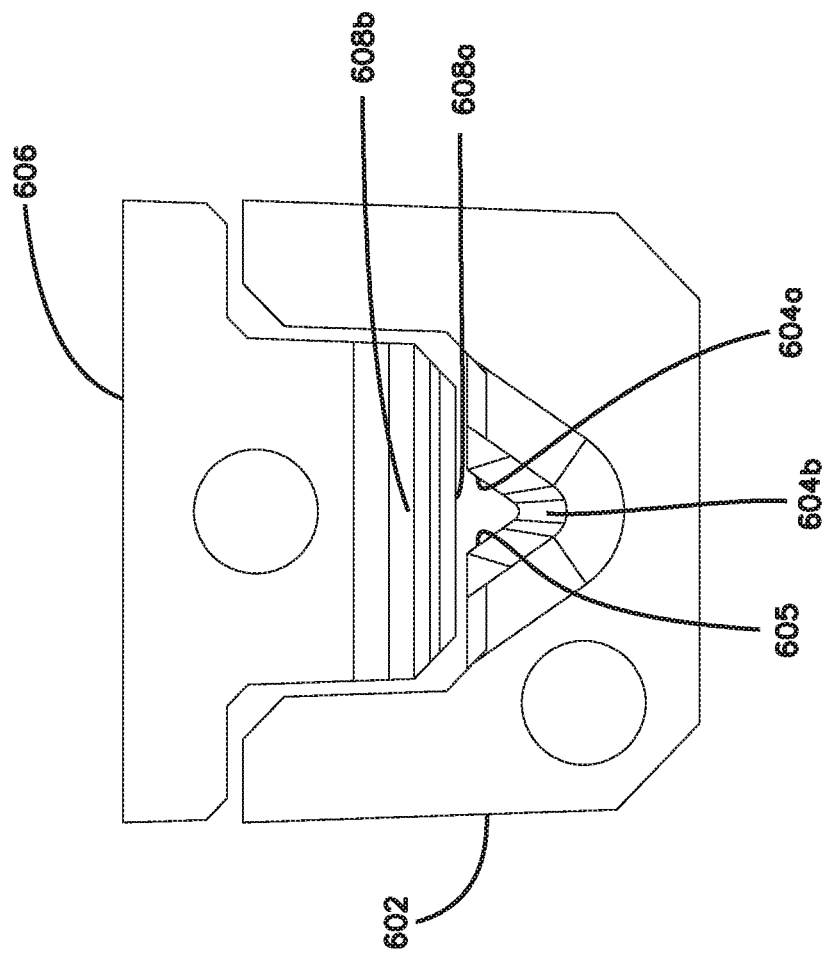
FIG. 60 is an end view of the fiber alignment device of FIG. 57 from one of the fiber insertion ends of the fiber alignment device.

The fiber alignment device 380, 600 also includes a second piece 386, 606 that mounts adjacent to the first piece 382, 602. The second piece 386, 606 includes a fiber clamping portion 388, 608 that opposes the side of the first piece 382, 602 defining the fiber alignment groove 384, 604 when the first and second pieces 382, 386, 602, 606 are positioned adjacent to one another to define a passage 385, 605 (FIGS. 52 and 60). It will be appreciated that the fiber clamping portion 388, 608 is adapted to cover an open side of the fiber alignment groove 384, 604 when the second piece 386, 606 is positioned adjacent the first piece 382, 602. In certain examples, at least a portion of the fiber clamping portion 388, 608 nests within (e.g., protrudes into) the fiber alignment groove 384, 604 (see FIGS. 54 and 60).

It will be appreciated that the fiber alignment groove 384, 604 can have axial regions with different cross sectional profiles to facilitate accommodating bare fiber portions and the coated portions of the optical fibers being aligned by the fiber alignment device 380, 600. It will also be appreciated that the fiber clamping portion 388, 608 also can have regions with different cross sectional profiles to facilitate accommodating bare fiber portions and the coated portions of the optical fibers. It will be appreciated that the spacing between the fiber clamping portion 388, 608 and the fiber positioning groove 384, 604 can be varied at the different axial pieces of the device 380. For example, the fiber clamping portion 388, 608 can be stepped, contoured, or otherwise varied to accommodate the bare fiber portions and the coated portions of the optical fibers being aligned (see FIGS. 50 and 59).

Figure 54:
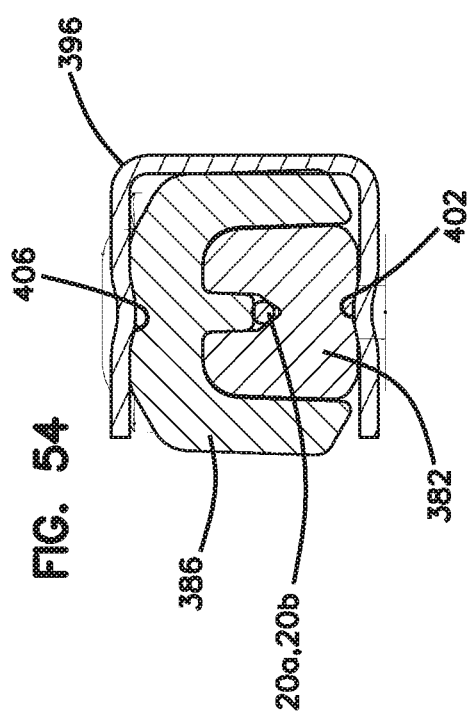
FIG. 54 is a transverse cross-sectional view of the fiber alignment device of FIG. 53 taken along the 54-54 line.

In certain implementations, the fiber alignment groove 384, 604 and the clamping surface 388, 608 can be configured at a central section 604a, 608a of the first and second pieces 382, 386, 602, 606 for clamping bare portions of optical fibers (see FIGS. 54 and 60). In contrast at the end axial sections 604b, 608b, the clamping surface 388, 608 and the fiber positioning groove 384, 604 can be configured to clamp coated portions of optical fibers. FIG. 52 shows an example channel configuration for the end axial sections of the fiber alignment device 380, while FIG. 54 is a cross-sectional view showing a representative transverse cross-sectional profile suitable for the central section. The spacing between the fiber positioning groove 384 and the clamping surface 388 is larger at the axial end sections as compared to at the central section. This profile difference between the central and end sections of the first and second pieces 602, 604 also can be seen in fiber alignment device 600 in FIG. 60. For example, compare the transverse cross-sectional distance D1 between the central portion 604a of the first piece 604 and the central portion of the second piece 606 to the transverse cross-sectional distance D2 between the end portion 604b of the first piece 604 and the end portion of the second piece 606.

The optical fibers 20a, 20b can be inserted along the passage 385, 605 from opposite ends of the fiber alignment device 380, 600 when the first and second pieces 382, 386, 602, 606 are held together relatively loosely.

In certain examples, the first and second pieces 382, 386, 602, 606 include mating features that mate to ensure registry between the first and second pieces 382, 386, 602, 606 while allowing the first and second pieces 382, 386, 602, 606 to be moved toward and away from one another while maintaining registry between the first and second pieces 382, 386, 602, 606. As depicted in FIG. 52, the first piece 382 can be nested with the second piece 386. For example, at least a portion of the first piece 382 can be inserted partially or fully into a channel 390 defined in the second piece 386 (see FIG. 47). For example, the second piece 386 may have a U-shaped, C-shaped, V-shaped, or otherwise shaped channel 390 sized to accommodate at least the fiber alignment groove 384 of the first piece 382.

In certain examples, the first and second pieces 382, 386 can be double nested—the first piece 382 can be inserted within a channel 390 of the second piece 386 while the fiber clamping portion 388 of the second piece 386 protrudes into the fiber alignment groove 384 of the first piece 382.

In certain implementations, the fiber alignment device 380 further includes a third piece 396 that mounts over the first and second pieces 382, 386 to hold the first and second pieces together for clamping the fibers 20a, 20b desired to be spliced within the fiber alignment groove 384. In a preferred example, the third piece 396 is a clip member that snaps over the first and second pieces 382, 386. In the depicted example, the third piece 396 has a generally u-shaped transverse cross-sectional shape or profile. As indicated above, the third piece 396 can be a clip-member having a u-shaped transverse cross-section. The clip member includes a central portion or base 398 and legs 400, 404 that project from the central portion 398. The leg 400, 404 and the central portion 398 cooperate to define a channel 410 for receiving the first and second pieces 382, 386 therein.

Figure 45:
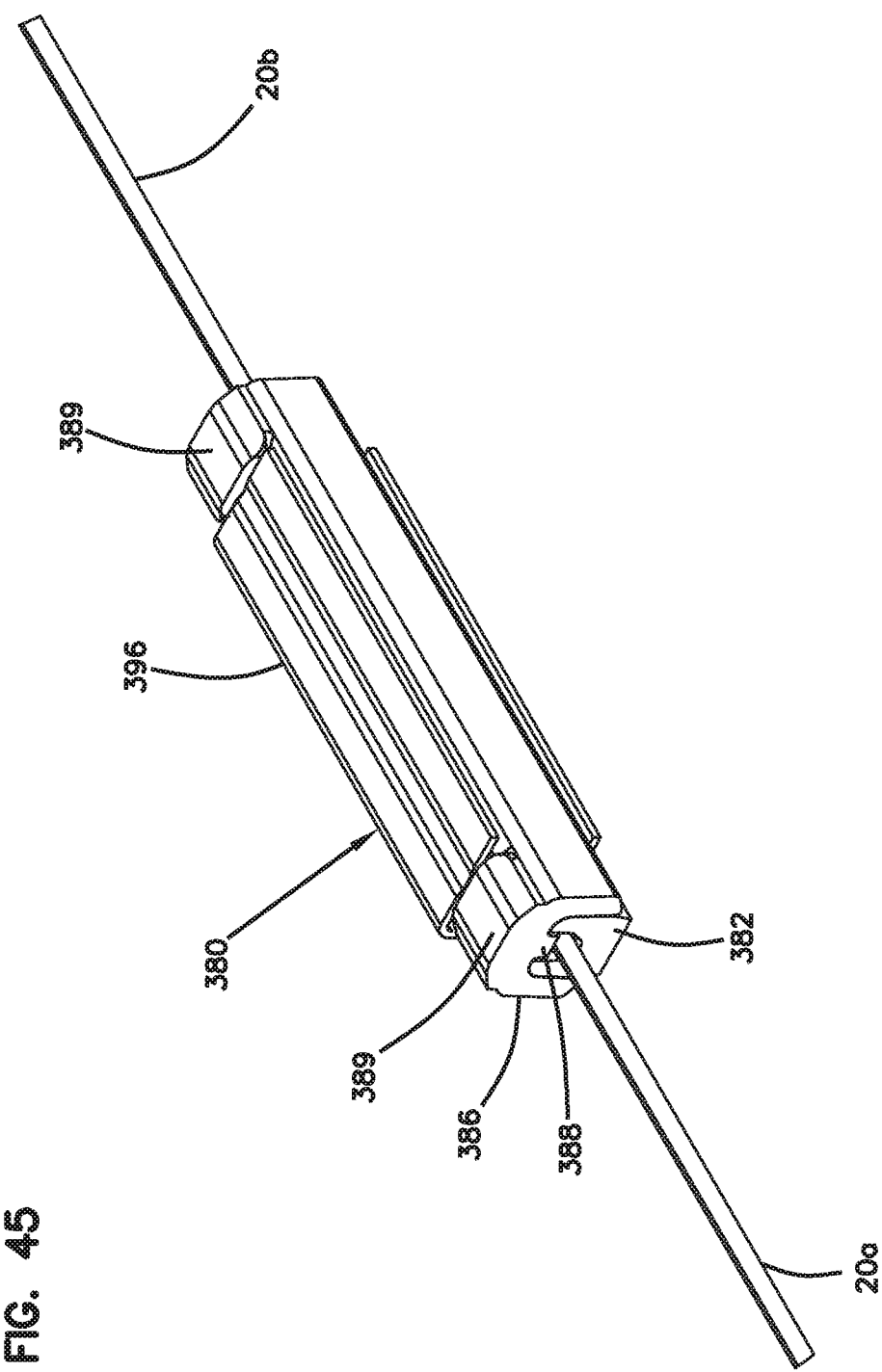
FIG. 45 is a perspective view of another fiber alignment device surrounding a splice between two optical fibers in accordance with the principles of the present disclosure, the fiber alignment device including a first piece, a second piece, and a clamping device.
Figure 46:
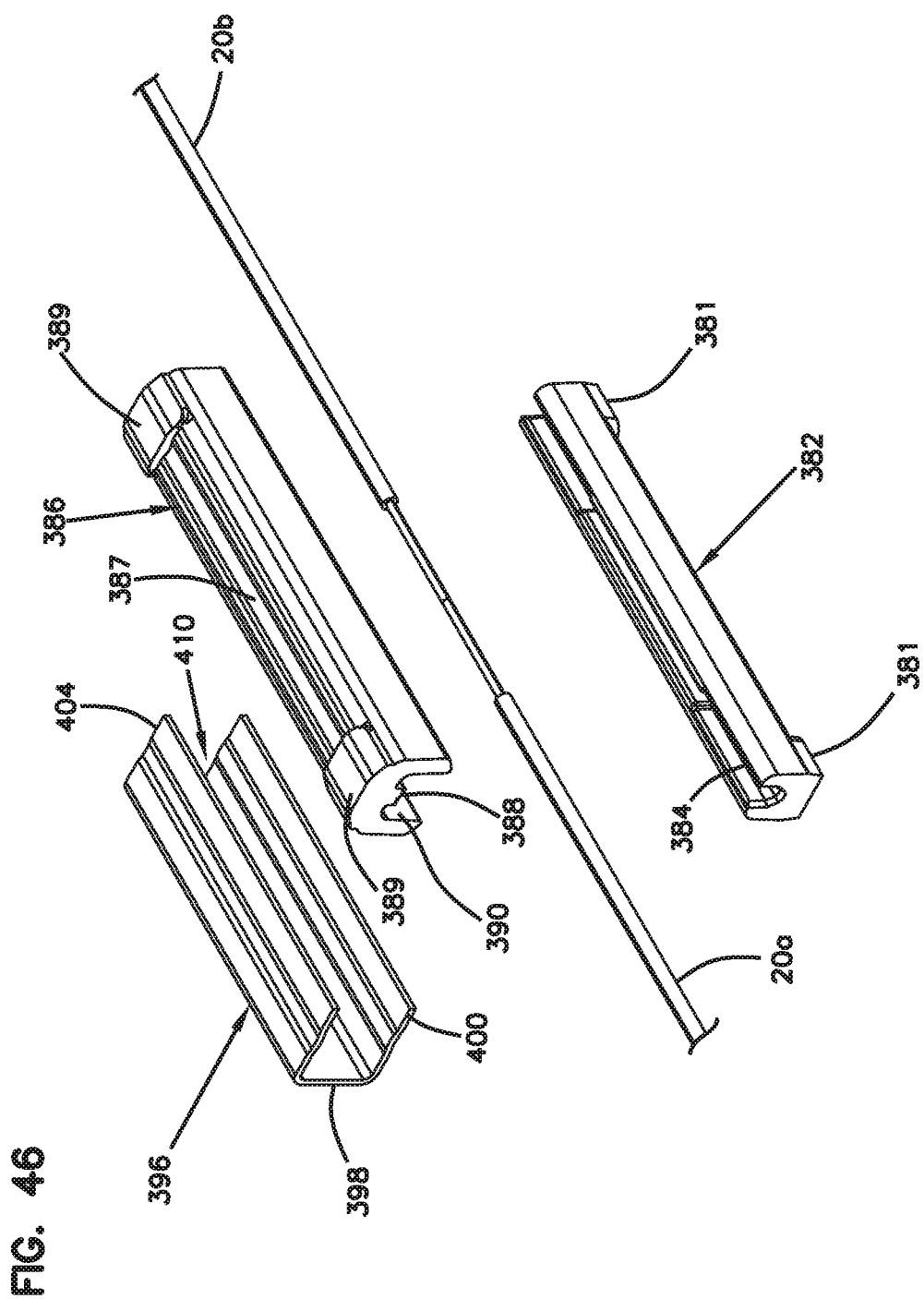
FIG. 46 is a top perspective view of the fiber alignment device of FIG. 45 exploded away from the optical fibers.
Figure 47:
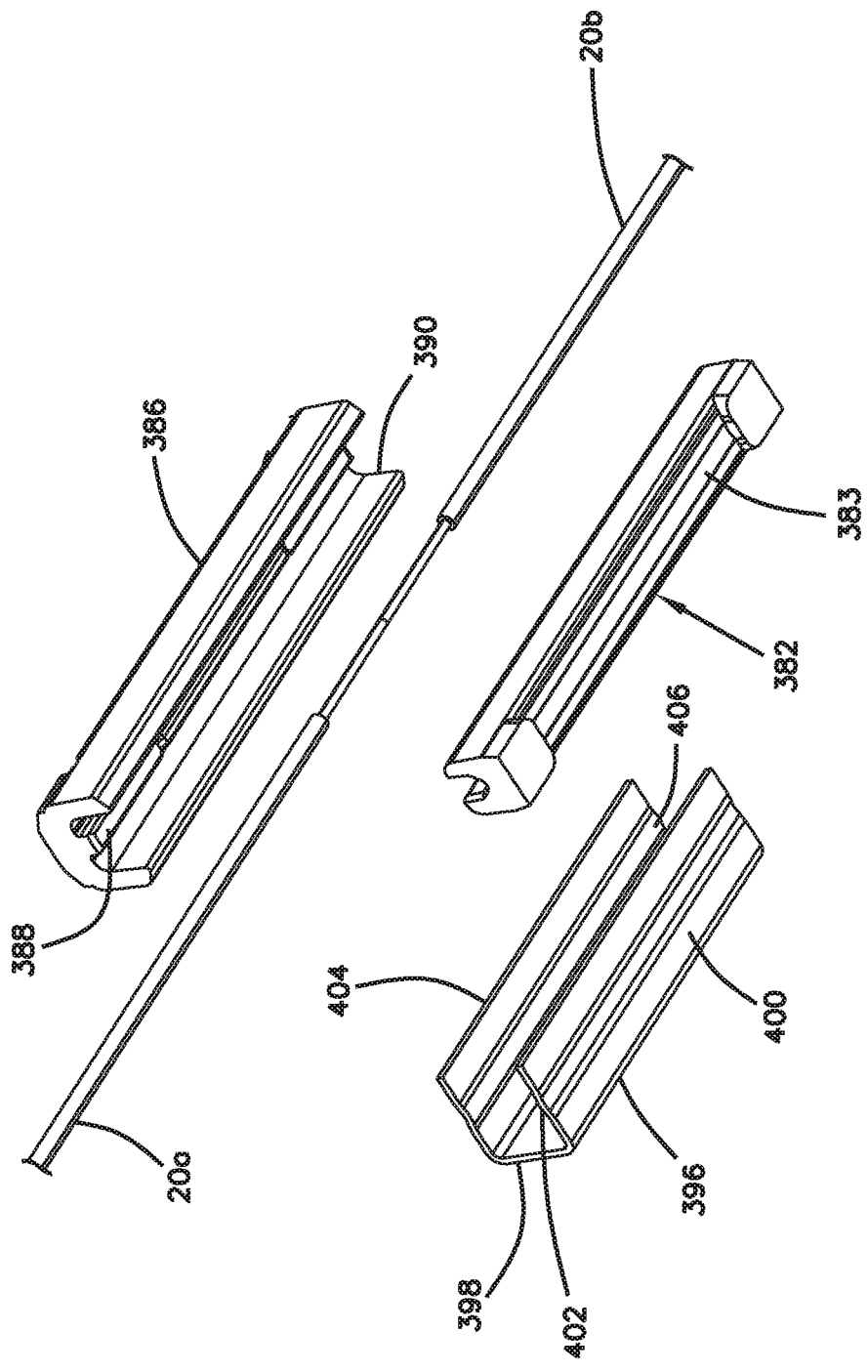
FIG. 47 is a bottom perspective view of the fiber alignment device of FIG. 45 exploded away from the optical fibers.
Figure 49:
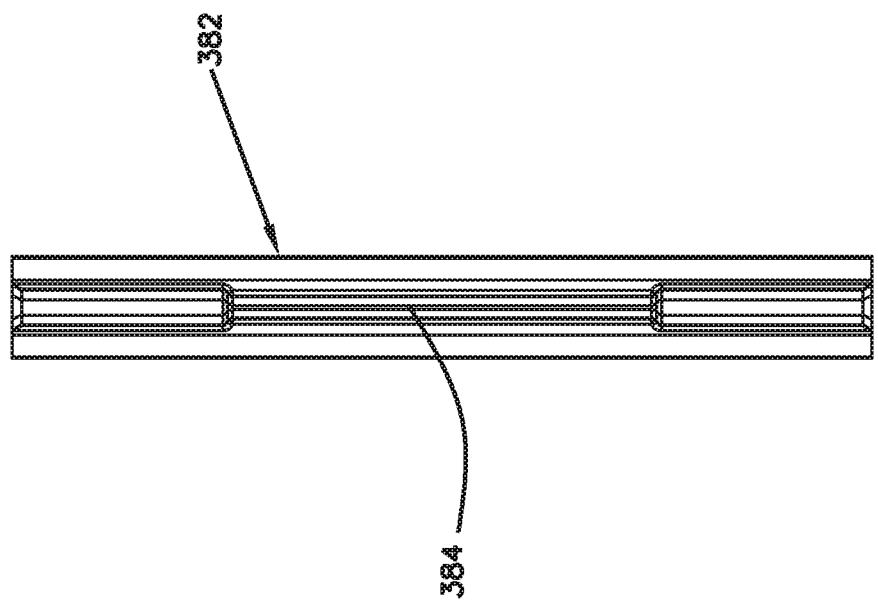
FIG. 49 is a top plan view of the first piece of FIG. 48.
Figure 48:
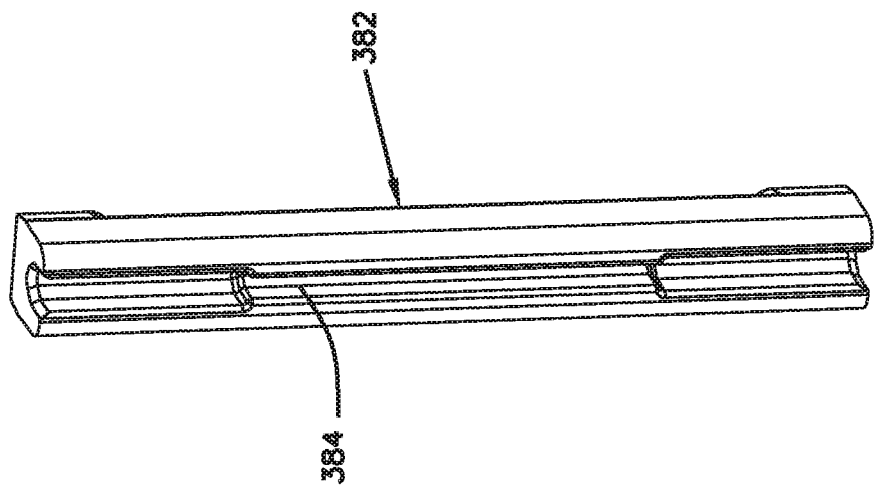
FIG. 48 is a perspective view of an example first piece of the fiber alignment device of FIG. 45, the first piece defining a fiber alignment groove.
Figure 51:
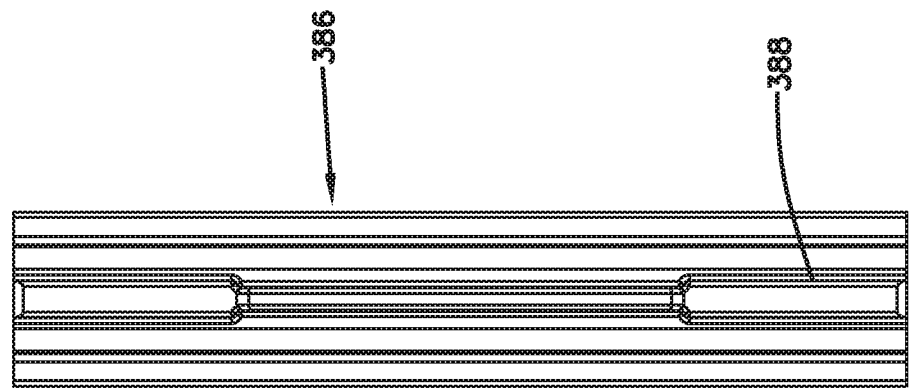
FIG. 51 is a bottom plan view of the second piece of FIG. 50.
Figure 50:
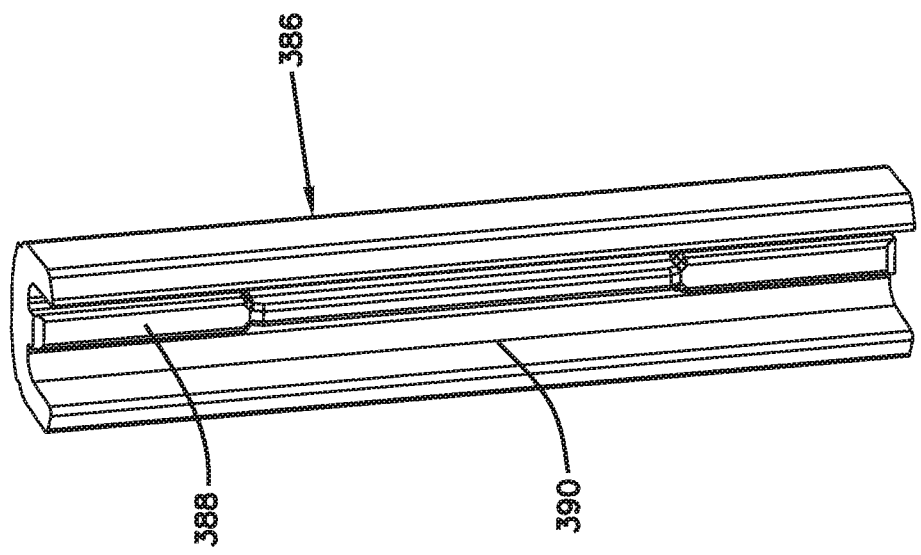
FIG. 50 is a perspective view of an example second piece of the fiber alignment device, the second piece including fiber clamping portions.

The optical fibers 20a, 20b can be inserted along the passage 385 from opposite ends of the fiber alignment device 380 when the first and second pieces 382, 386 are held together relatively loosely (i.e., without the third piece 396). Once the optical fibers have been fully inserted into the fiber alignment device 380 and are in an abutting relation relative one another within the fiber alignment groove 384, the third piece 396 can be moved to clamp together the first and second pieces 382, 386 as shown in FIG. 45. When the third piece 396 has been moved to the clamping position, optical fibers 20a, 20b within the fiber alignment groove 384 are securely clamped in place to prevent axial movement relative to one another within the fiber alignment groove 384.

In certain examples, the third piece 396 includes a retention feature that interfaces with a retention feature on the first and/or second piece 382, 386 to inhibit lateral movement of the third piece 396 relative to the first and/or second piece 382, 386. Each leg 400, 404 of the third piece 396 defines a bump or otherwise contoured section 402, 406, respectively, that projects towards the other leg. When the third piece 396 is mounted over the first and second pieces 382, 386, the projection 402 of the first leg 400 extends at least partially into a bottom groove 383 (FIG. 47) of the first piece 382 and the projection 406 of the second leg 404 extends at least partially into a shallow groove 387 (FIG. 46) defined in the top of the second piece 386 (e.g., see FIG. 54).

In certain examples, the first and/or second pieces 382, 386 include retention features to inhibit axial movement of the third piece 396 relative to the first and second pieces 382, 386. In certain implementations, the first piece 382 includes feet 381 disposed at opposite ends of the first piece 382 at the bottom of the first piece 382. The feet 381 are spaced apart from each other sufficient to accommodate the third piece 396 therebetween (see FIG. 52). The second piece 386 includes protrusions 389 at opposite ends of the second piece 386 at the top of the second piece 386. The protrusions 389 are spaced apart from each other sufficient to accommodate the third piece 396 therebetween (see FIG. 45). Alternatively, material may be cut out of the second piece 386 to define a recessed surface between stop sections 389 in which the third piece 396 may seat.

In some implementations, the third piece 396 may be manually installed over the first and second pieces 382, 386. In other implementations, the third piece 396 is installed using a pressing tool. For example, the third piece 396 may have sufficient spring force and the channel may be sufficiently sized to inhibit manual installation by a user.

Figure 55:
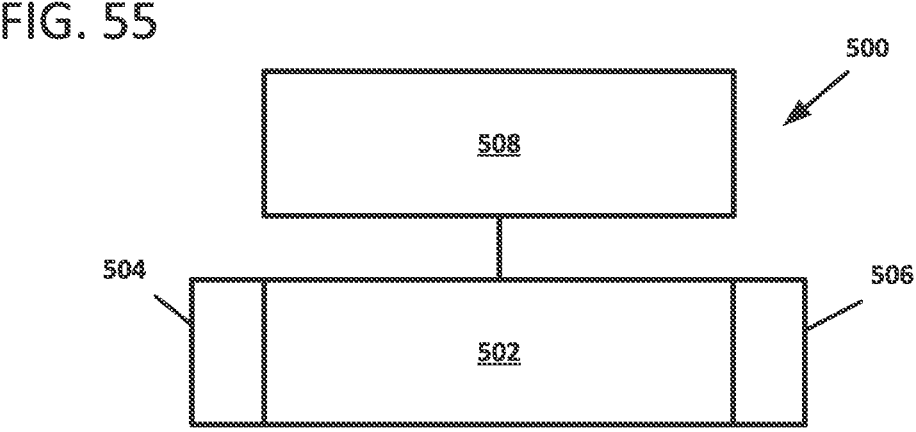
FIG. 55 is a schematic diagram of an example tool that pushes a resilient structure (e.g., metal spring) over a fiber alignment structure after fibers have been aligned within the alignment structure.
Figure 56:
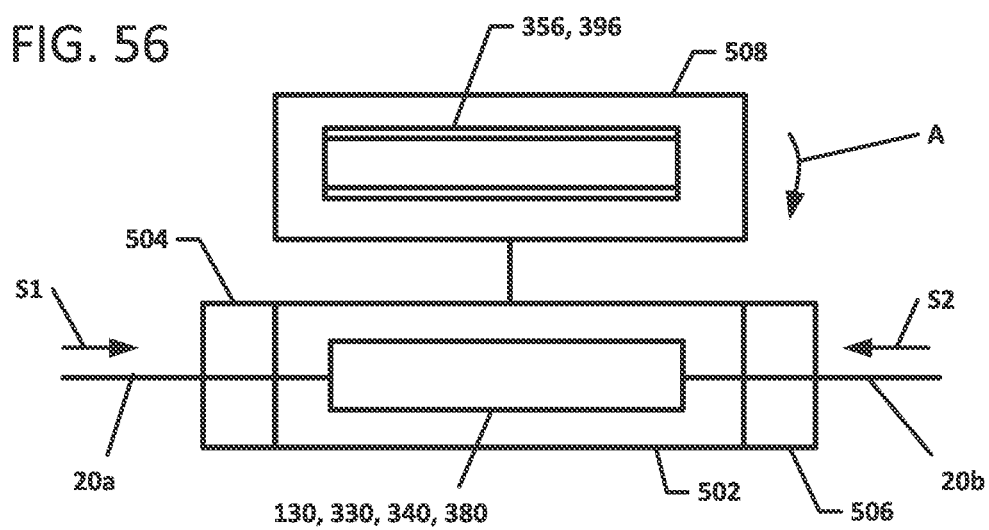
FIG. 56 is a schematic diagram showing the fiber alignment structure, the resilient structure, and the optical fibers arranged with the tool.
Figure 57:
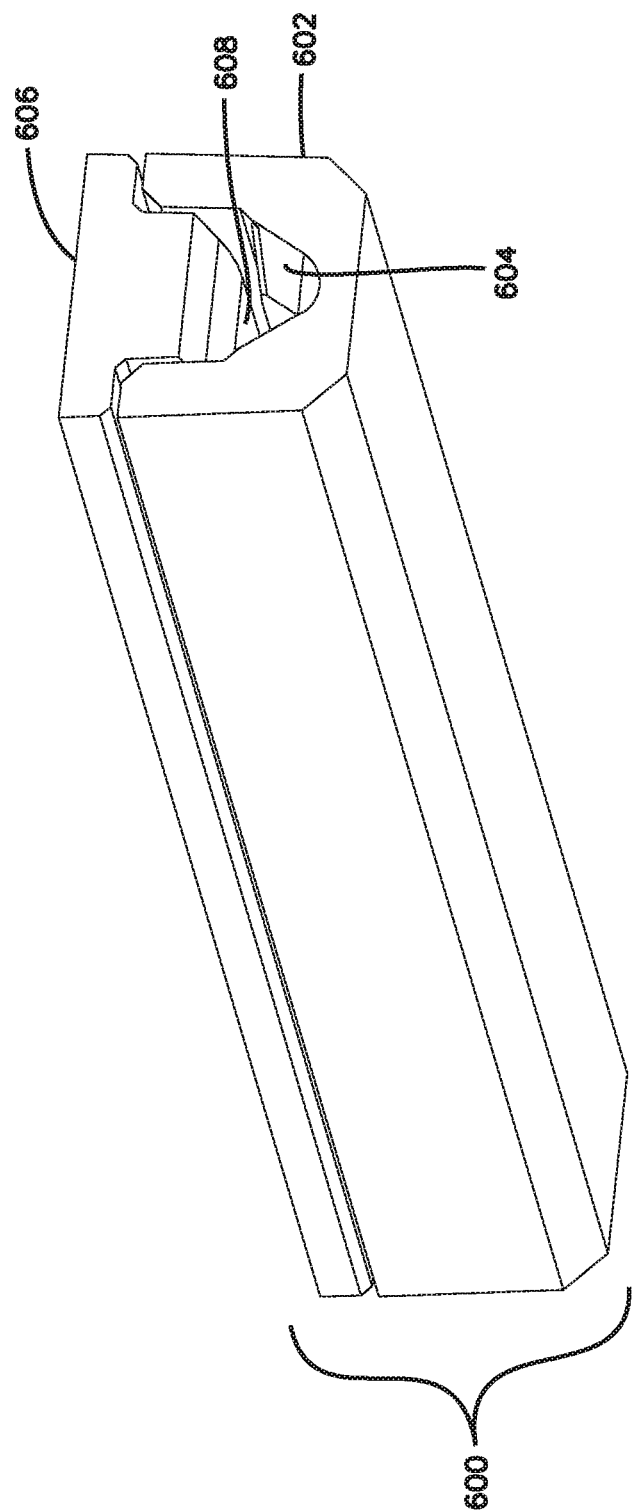
FIG. 57 is a perspective view of another example fiber alignment device suitable for surrounding a splice between two optical fibers in accordance with the principles of the present disclosure, the fiber alignment device including a first piece and a second piece.
Figure 58:
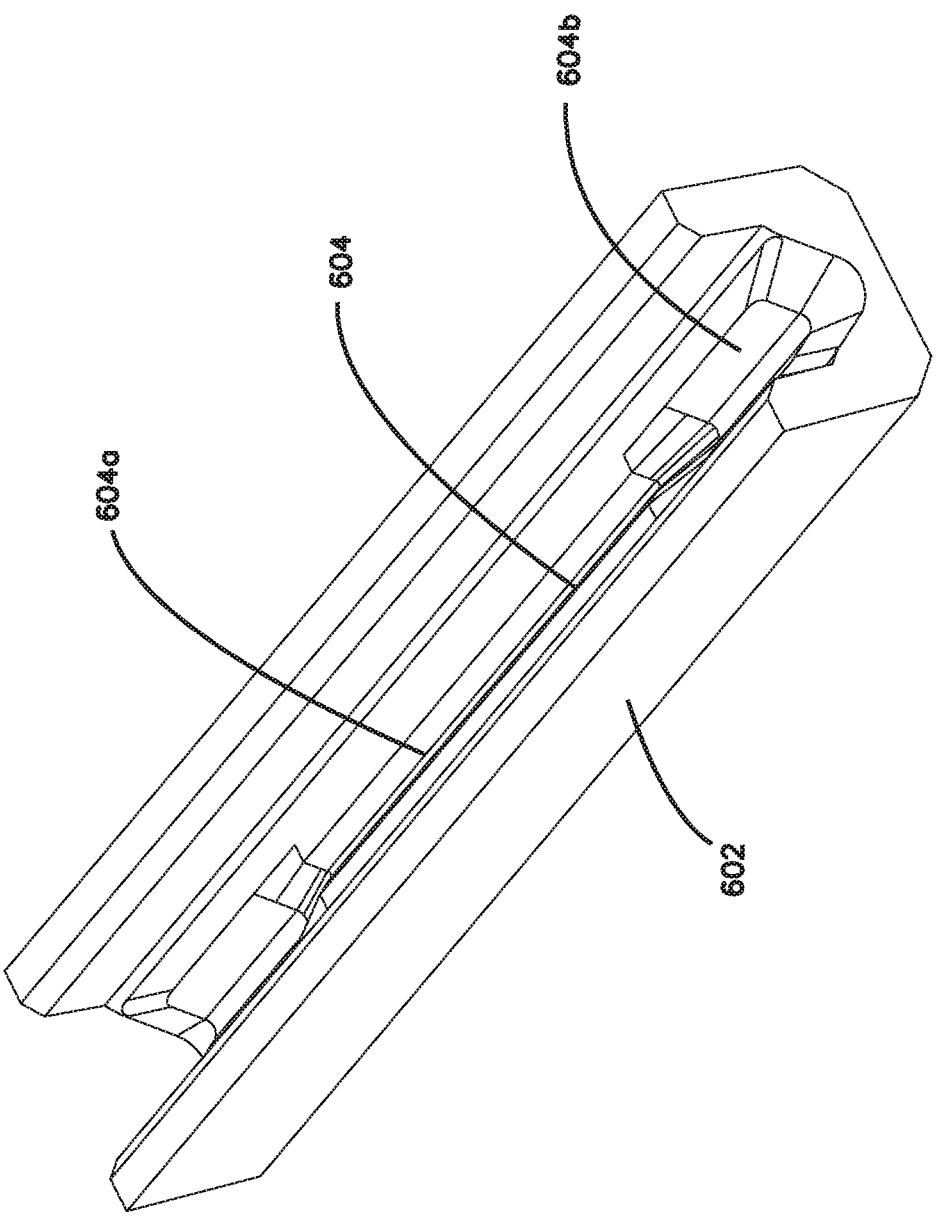
FIG. 58 is a perspective view of an example first piece suitable for use with the fiber alignment device of FIG. 57.
Figure 59:
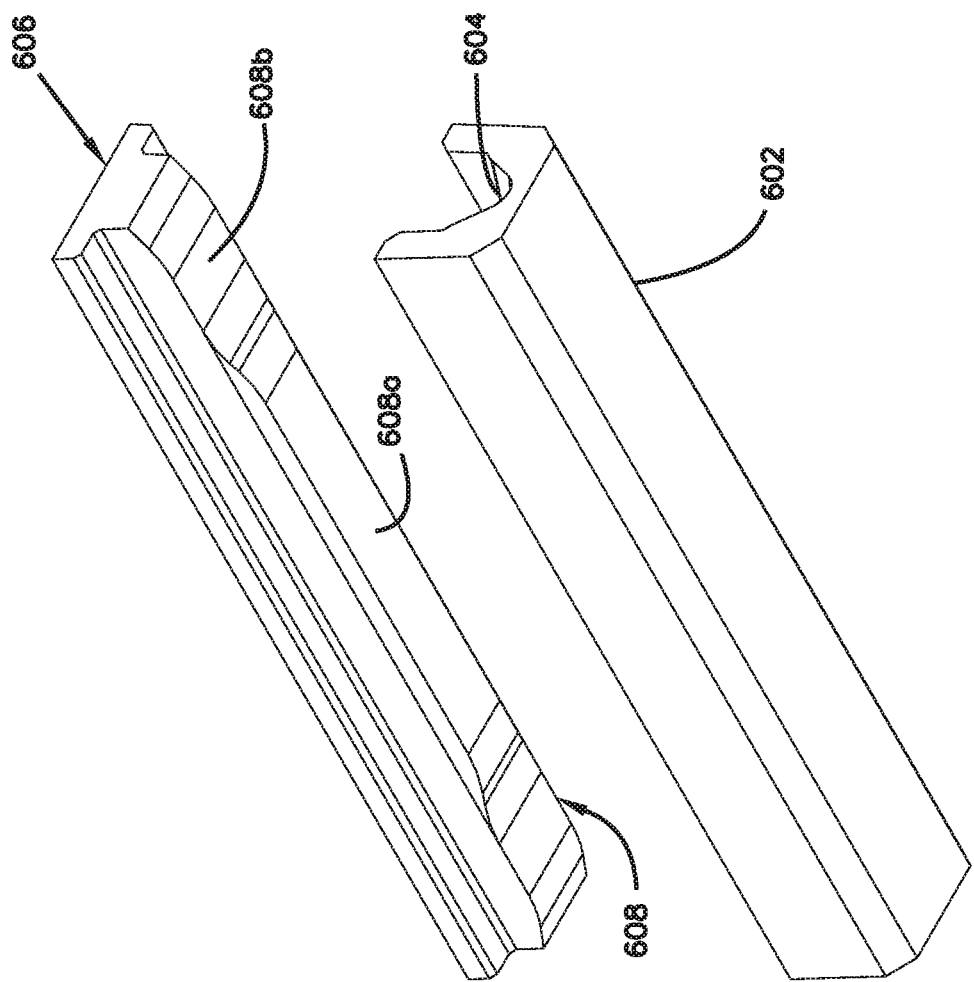
FIG. 59 is a perspective view of the fiber alignment device of FIG. 57 with the second piece exploded from the first piece.

In certain implementations, one or more of the fiber alignment devices described herein can be used in combination with a tool. Referring to FIGS. 55 and 56, the tool 500 includes a receptacle 502 for receiving and holding one of the fiber alignment devices 130, 330, 340, 380. The tool also includes clamps 504, 506 at opposite ends of the receptacle 502 for clamping the fibers 20a, 20b in place once the fibers 20a, 20b have been fully inserted into the fiber alignment device 130, 330, 340, 380. The tool 500 also includes an actuator 508 for pushing the resilient structure 156, 356, 396 (e.g., clamping device, metal spring, memory-shape sleeve, etc.) over the fiber alignment structure 130, 330, 340, 380 once the fibers 20a, 20b have been inserted into the alignment structure 130, 330, 340, 380 such that the resilient structure 156, 356, 396 causes the fibers 20a, 20b to be clamped within the alignment structure 130, 330, 340, 380.

For example, the polymeric/ceramic portion(s) of a fiber alignment device may be mounted on the tool receptacle 502. In an example, the first and second pieces 382, 386 are nested together and mounted at the receptacle 502. Ends of the fibers 20a, 20b are inserted into opposite sides of the polymeric/ceramic portion(s) until the fiber ends touch or otherwise optically couple together. Clamps 504, 506 are secured over the fibers 20a, 20b to hold the fibers in position relative to the polymeric/ceramic portion(s). Then, the actuator 508 presses the spring clip or other resilient structure over the polymeric/ceramic portion(s) to secure the fibers 20a, 20b relative to the fiber alignment device. The clamps 504, 506 are released and the fiber alignment device can be removed from the tool 500.

FIG. 61-64 illustrate another fiber alignment device 620 adapted for facilitating implementing splices between multiple pairs of optical fibers 20a, 20b in accordance with the principles of the present disclosure. In certain examples, the fiber alignment device 620 is similar to the fiber alignment device 600 except that the fiber alignment device 620 aligns a plurality of optical fiber pairs. The fiber alignment device 620 co-axially aligns the optical fibers 20a, 20b in each pair and holds the optical fibers in the co-axially aligned positions. In the example shown, the fiber alignment device 620 is configured to align twelve pairs of optical fibers 20a, 20b. In other examples, however, the fiber alignment device 620 may be configured to align a greater or lesser number of fibers (e.g., two, three, four, six, eight, ten, sixteen, twenty-four, etc.).

The fiber alignment device 620 includes a first piece 622 defining a plurality of fiber alignment grooves 624 that extends axially along the first piece 622 between first and second opposite ends of the first piece 622. It will be appreciated that each fiber alignment groove 624 can have the same basic configuration as the fiber alignment groove 74 previously described herein. In the example shown, the first piece 622 defines twelve alignment grooves 624. In other examples, however, the first piece 622 defines a greater or lesser number of alignment grooves 624 (e.g., two, three, four, six, eight, ten, sixteen, twenty-four, etc.).

Figure 61:
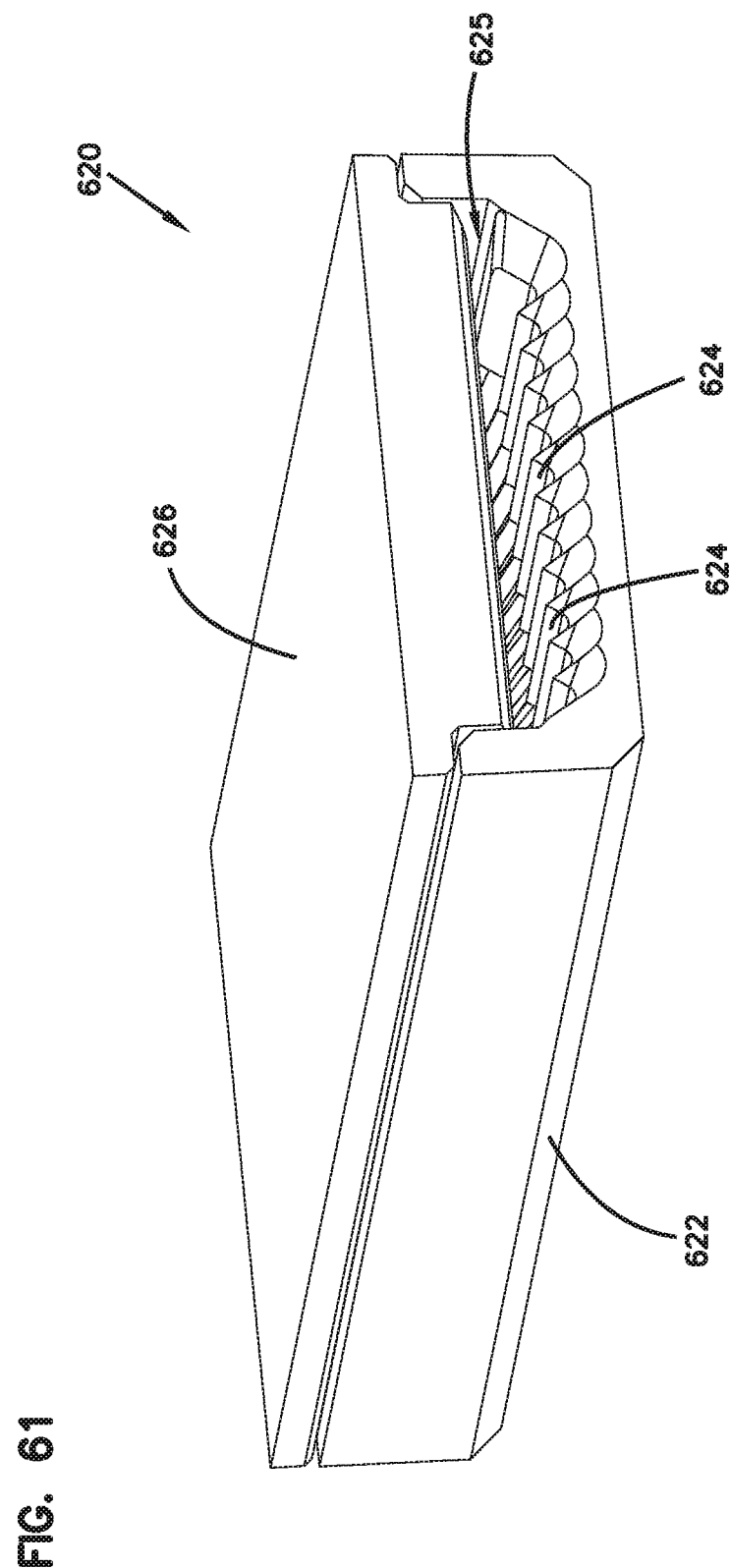
FIG. 61 is a perspective view of another example fiber alignment device suitable for surrounding a splice between multiple pairs of optical fibers in accordance with the principles of the present disclosure, the fiber alignment device including a first piece and a second piece.

The fiber alignment device 620 also includes a second piece 626 that mounts adjacent to the first piece 622. The second piece 626 includes a fiber clamping portion 628 that opposes the side of the first piece 622 defining the fiber alignment grooves 624 when the first and second pieces 626 are positioned adjacent to one another to define a passage 625 (FIG. 61). It will be appreciated that the fiber clamping portion 628 is adapted to cover an open side of the fiber alignment grooves 624 when the second piece 626 is positioned adjacent the first piece 622. In the example shown, a common fiber clamping portion 628 extends across all of the fiber alignment grooves 624. In other examples, the second piece 626 may include separate fiber clamping portions 628 configured to mate with each fiber alignment groove 624.

It will be appreciated that the fiber alignment grooves 624 can have axial regions with different cross sectional profiles to facilitate accommodating bare fiber portions and the coated portions of the optical fibers being aligned by the fiber alignment device 620. It will also be appreciated that the fiber clamping portion 628 also can have regions with different cross sectional profiles to facilitate accommodating bare fiber portions and the coated portions of the optical fibers. It will be appreciated that the spacing between the fiber clamping portion 628 and the fiber positioning grooves 624 can be varied at the different axial pieces of the device 620. For example, the fiber clamping portion 628 can be stepped, contoured, or otherwise varied to accommodate the bare fiber portions and the coated portions of the optical fibers being aligned.

Figure 62:
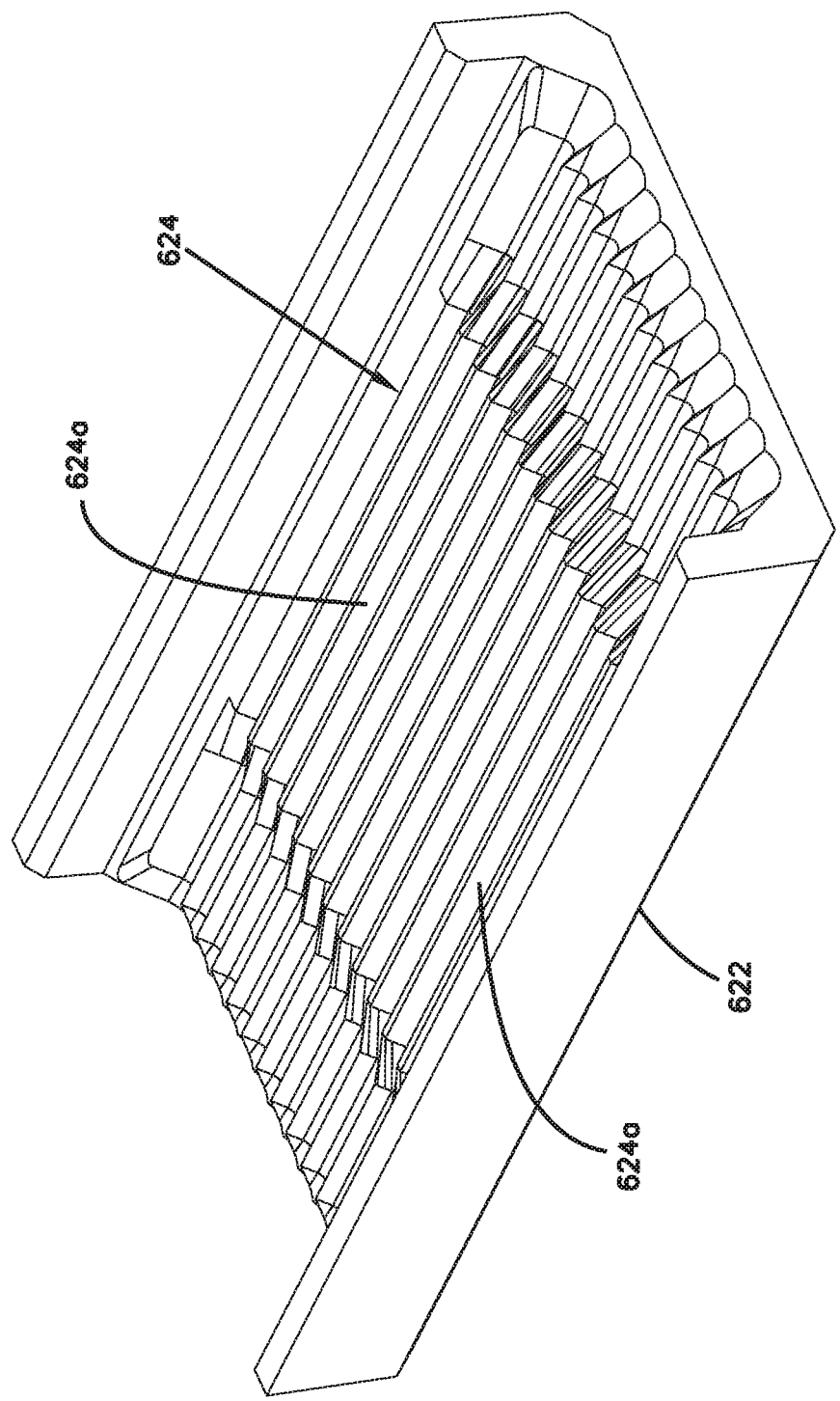
FIG. 62 is a perspective view of an example first piece suitable for use with the fiber alignment device of FIG. 61.
Figure 63:
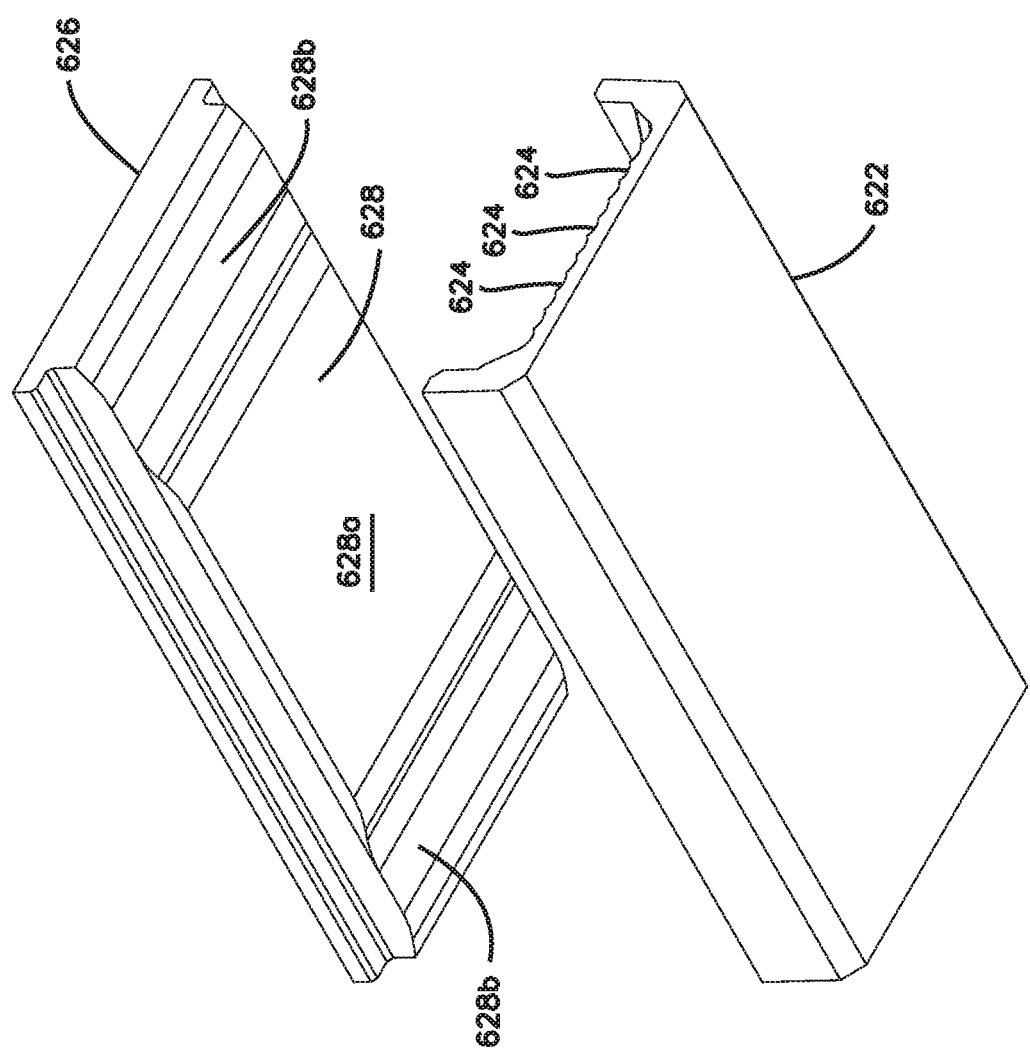
FIG. 63 is a perspective view of the fiber alignment device of FIG. 61 with the second piece exploded from the first piece.
Figure 64:
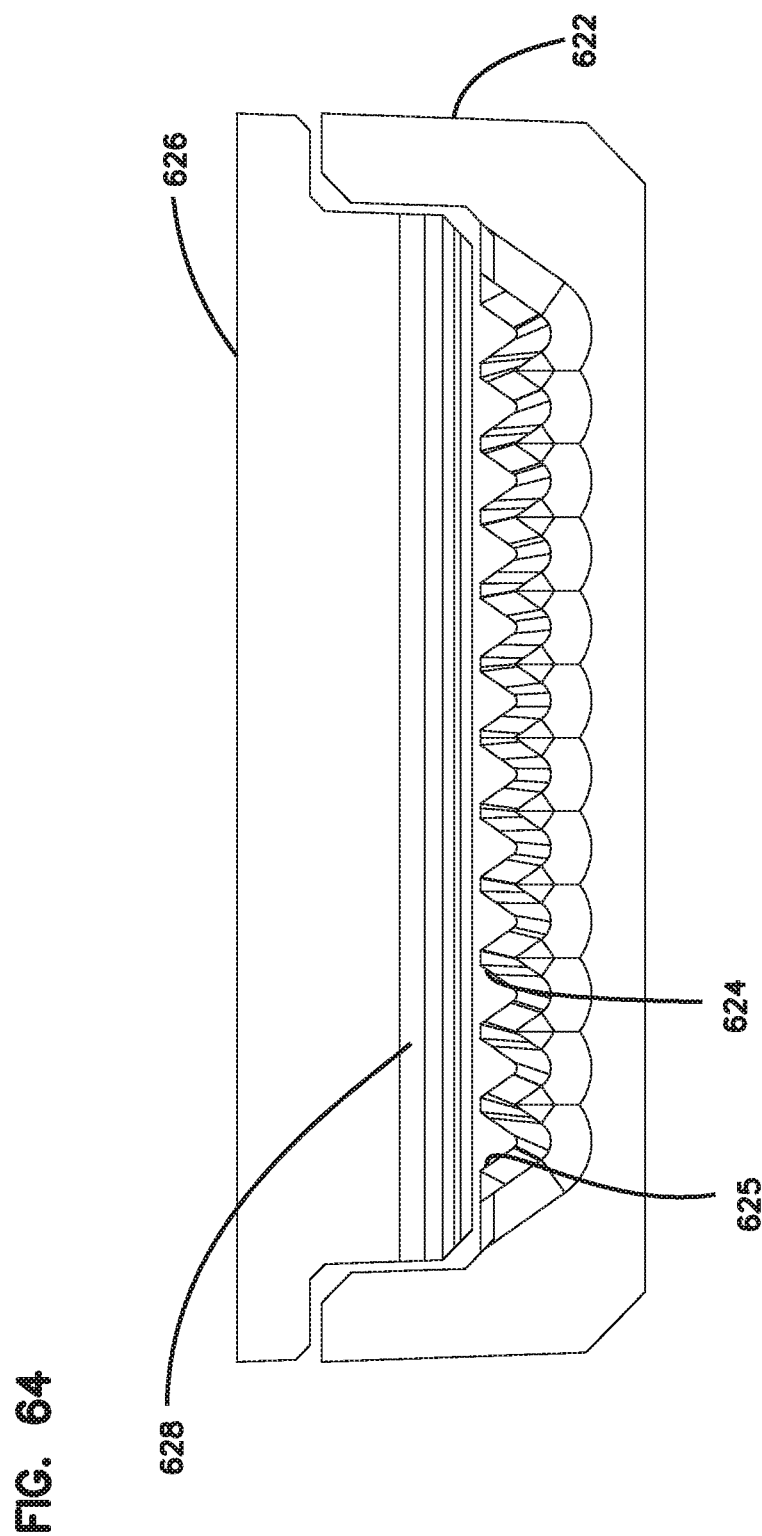
FIG. 64 is an end view of the fiber alignment device of FIG. 61 from one of the fiber insertion ends of the fiber alignment device.

In certain implementations, the fiber alignment grooves 624 and the clamping surface 628 can be configured at an axially central section 624a, 628a of the first and second pieces 622, 626 for clamping bare portions of optical fibers (see FIGS. 62 and 63). In contrast, at the end axial sections 624b, 628b, the clamping surface 628 and the fiber positioning grooves 624 can be configured to clamp coated portions of optical fibers. The spacing between the fiber positioning grooves 624 and the clamping surface 628 is larger at the axial end sections 624b, 628b as compared to at the central sections 624a, 628a.

The optical fibers 20a, 20b can be inserted along the passage 625 from opposite ends of the fiber alignment device 620 when the first and second pieces 622, 626 are held together relatively loosely.

Figure 65:
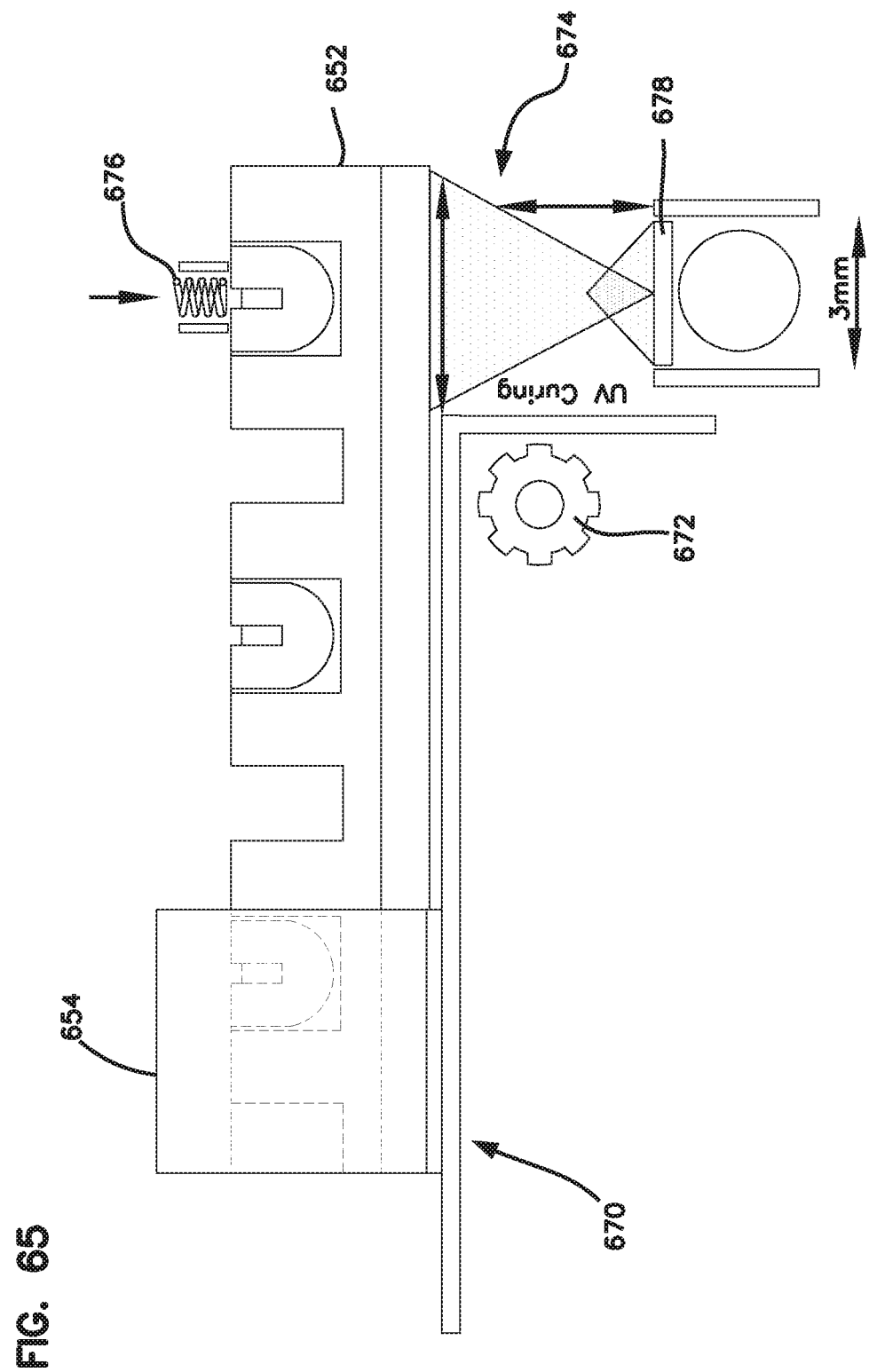
FIG. 65 is a side elevational view of an example tool and carrier for use in splicing optical fibers using the fiber alignment devices described herein, especially the fiber alignment devices of FIGS. 57-64.
Figure 66:
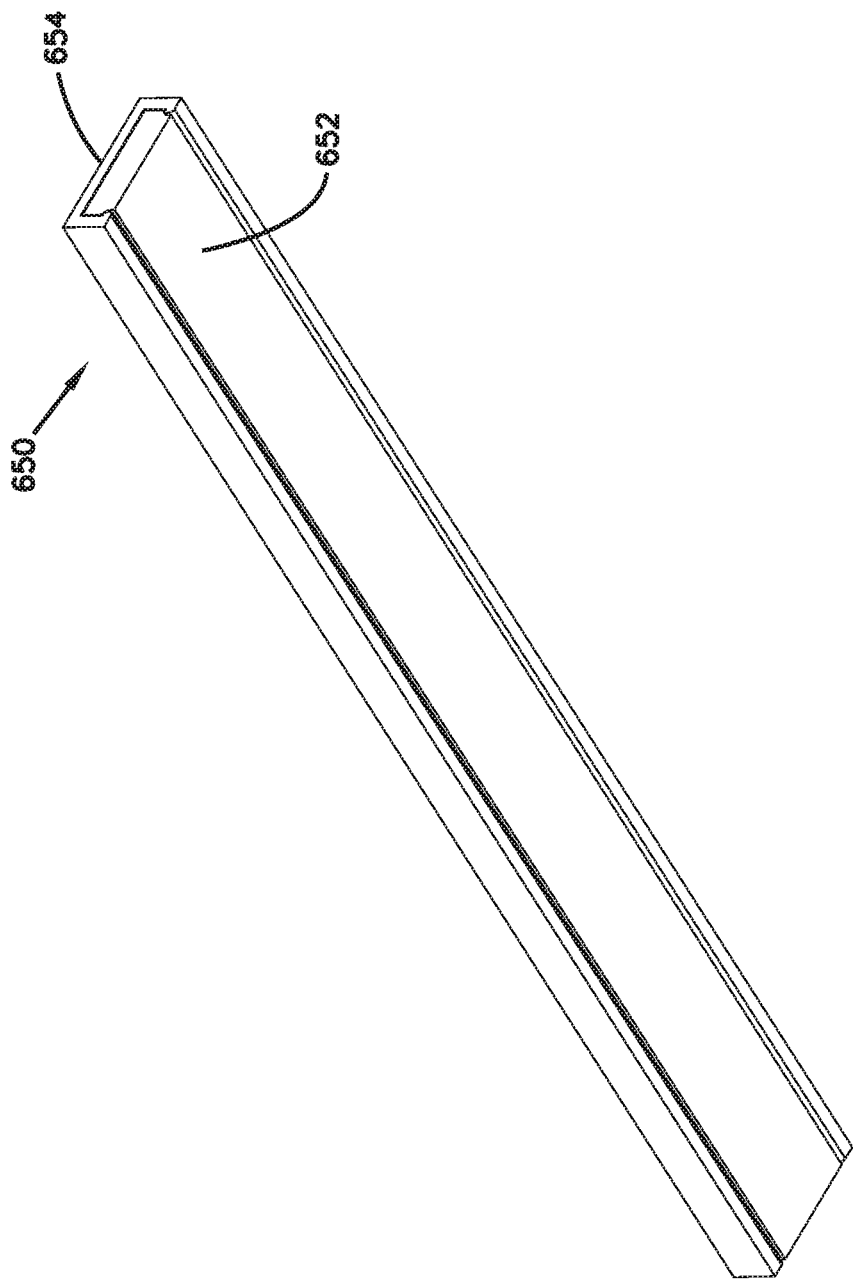
FIG. 66 is a bottom perspective view of an example carrier suitable for use in indexing the fiber alignment devices along the tool of FIG. 65.
Figure 71:
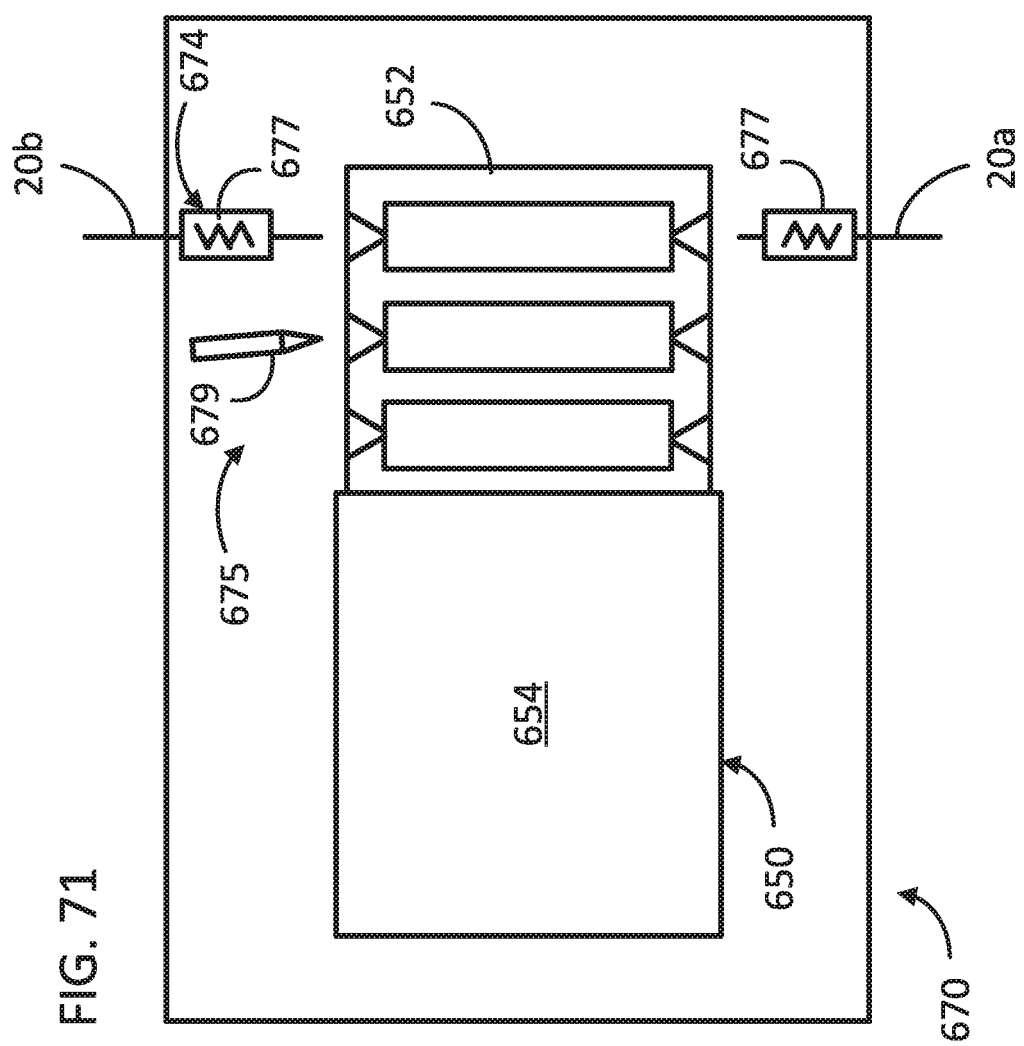
FIG. 71 is a top plan view of the carrier of FIG. 66 mounted to the example tool of FIG. 65.

As shown in FIGS. 65 and 71, the optical fibers 20a, 20b within the fiber alignment devices 600, 620 can be optically coupled using a tool 670. A fiber alignment device 600, 620 is indexed to a fiber insertion station 674 of the tool 670 at which the optical fibers 20a, 20b are inserted into the fiber alignment device 600, 620. A biasing force is applied to the alignment device 600, 620 to push the second piece 606, 626 towards the first piece 602, 622, thereby compressing the optical fibers 20a, 20b therebetween. Adhesive within the alignment device 600, 620 is set while the bias is being applied. After the adhesive is set, the bias is removed and the fiber alignment device 600, 620 is indexed away from the fiber insertion station 674 with the fibers 20a, 20b coupled together with the adhesive. In certain implementations, the tool 670 also may have a cleaving station to prepare the ends of the optical fibers 20a, 20b prior to the fiber insertion station 674.

In some implementations, each fiber alignment device 600, 620 receives adhesive (e.g., thermoset adhesive, epoxy, UV curable adhesive, etc.) prior to reaching the fiber insertion station 674. In some examples, the adhesive can be manually applied to the alignment devices before they are loaded into the carrier 650. In other examples, adhesive is automatically injected into each fiber alignment device 600, 620 by an injector 679 on the tool 670. In an example, the injector 679 is disposed at an adhesive injection station 675 on the tool 670. In other implementations, the injector 679 can be disposed at the fiber insertion station 674. In still other implementations, the adhesive can be manually injected while the alignment devices are disposed within the carrier 650 on the tool 670.

In the example shown, the adhesive is a UV curable adhesive. A UV light source 678 is disposed at the setting station 674. In such examples, the fiber alignment device 600, 620 is UV transparent. While located at the setting station 674, the fiber alignment device 600, 620 is exposed to UV light from the UV light source 678. In other implementations, heat can be directed to the alignment device 600, 620 to set the adhesive. In still other implementations, a chemical can be injected into the alignment device 600, 620 to set the adhesive.

In some implementations, a spring actuator 676 disposed at the setting station 676 to apply the biasing force to the alignment device 600, 620. In other implementations, the biasing force can be applied by a pneumatic actuator, a hydraulic actuator, an electromagnetic actuator, a mechanical actuator, or the like.

In certain implementations, the fibers 20a, 20b being inserted into the alignment device 600, 620 also are biased towards each other. For example, the tool 670 may include actuators 677 (e.g., spring actuators, pneumatic actuators, mechanical actuators, hydraulic actuators, or electromagnetic actuators) to bias the fibers 20a, 20b into the alignment devices 600, 620. In certain examples, the fibers 20a, 20b are biased into the alignment device 600, 620 by actuators 677 while the actuator 676 applies a biasing force to the fiber alignment device 600, 620. The biasing force applied to the fibers 20a, 20b by the respective actuators 677 is generally transverse to the biasing force applied to the fiber alignment device 600, 620 by actuator 676.

In certain implementations, multiple fiber alignment devices 600, 620 can be situated in a carrier 650 that indexes the fiber alignment devices 600, 620 along the one or more stations of the tool 670. FIGS. 66-70 illustrate an example carrier 650 suitable for use in holding the fiber alignment devices 600, 620. In the example shown, the carrier 650 is configured to hold twenty-four alignment devices 600, 620. In other examples, the carrier 650 can be configured to hold a greater or lesser number (e.g., two, six, eight, ten, twelve, sixteen, twenty, twenty-five, thirty-two, sixty-four, etc.) of alignment devices 600, 620.

The carrier 650 includes a base 652 and a cover 654. The base 652 defines pockets 656 in which a respective one of the alignment devices 600, 620 can be situated. In the example shown, each pocket 656 is sized to hold a fiber alignment device 600 for aligning two optical fibers 20a, 20b. In other examples, however, each pocket 656 can be sized to hold a fiber alignment device 620 for aligning more than two optical fibers 20a, 20b. In certain examples, the base 652 is UV-transparent. The cover 654 extends over the base 652 to enclose the fiber alignment devices 600, 620 within the pockets 656 when the cover 654 is mounted over the base 652. In certain examples, the cover 654 also blocks access to fiber insertion ends of the alignment devices 600, 620 when the cover 654 is mounted over the base 652 (e.g., see FIG. 70). In certain examples, the cover 654 is UV-transparent.

In certain implementations, the cover 654 only mounts over the base 652 when the fiber alignment devices 600, 620 are correctly assembled and correctly received within the pockets 656 of the base 652. If the first and second pieces 602, 622, 606, 626 of any of the alignment devices 600, 620 are mismatched (e.g., if any of the pieces are flipped 180 degrees so that the fiber clamping portion 608, 628 faces away from the fiber alignment groove 604, 624), then the mismatched alignment device 600, 620 will interfere with the fit between the cover 654 and the base 652.

Figure 67:
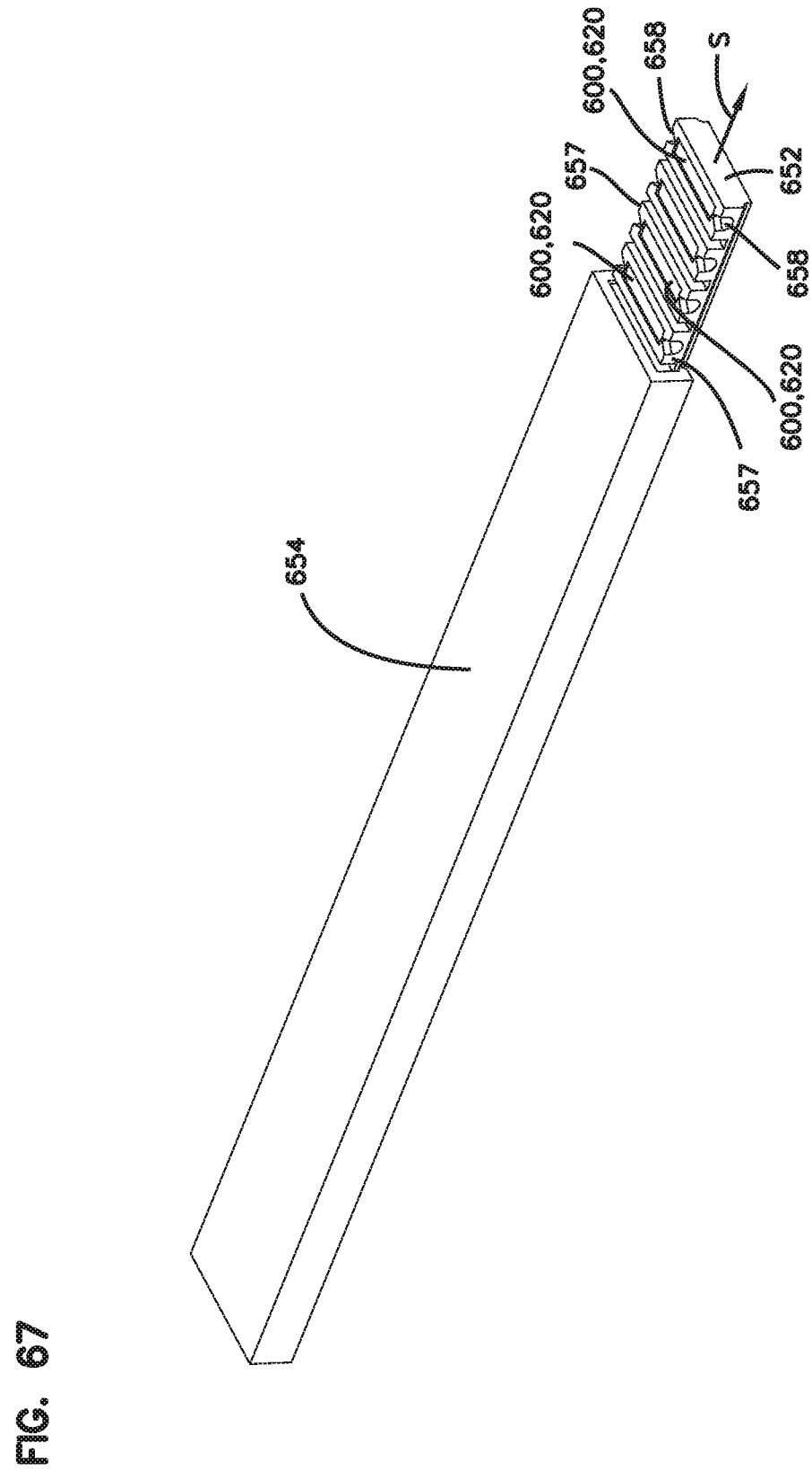
FIG. 67 shows a base of the carrier of FIG. 66 slid out from a cover in accordance with the principles of the present disclosure.

The base 652 is movable relative to the cover 654 along an axis S (see FIG. 67). For example, the cover 654 may include walls defining ribs 662 that slide along recessed channels 660 (FIG. 68) as the base 652 moves relative to the cover 654 along the axis S. In certain implementations, the carrier 650 is mounted to the tool 670. The cover 654 is held stationary relative to the tool 670 while the base 652 is indexed (e.g., represented schematically by cog 672) to the various stations. Accordingly, each alignment device 600, 620 held within the carrier 650 is systematically indexed to the fiber insertion station 674 at which the fibers 20a, 20b are inserted and optically coupled together at the fiber alignment device 600, 620.

Figure 68:
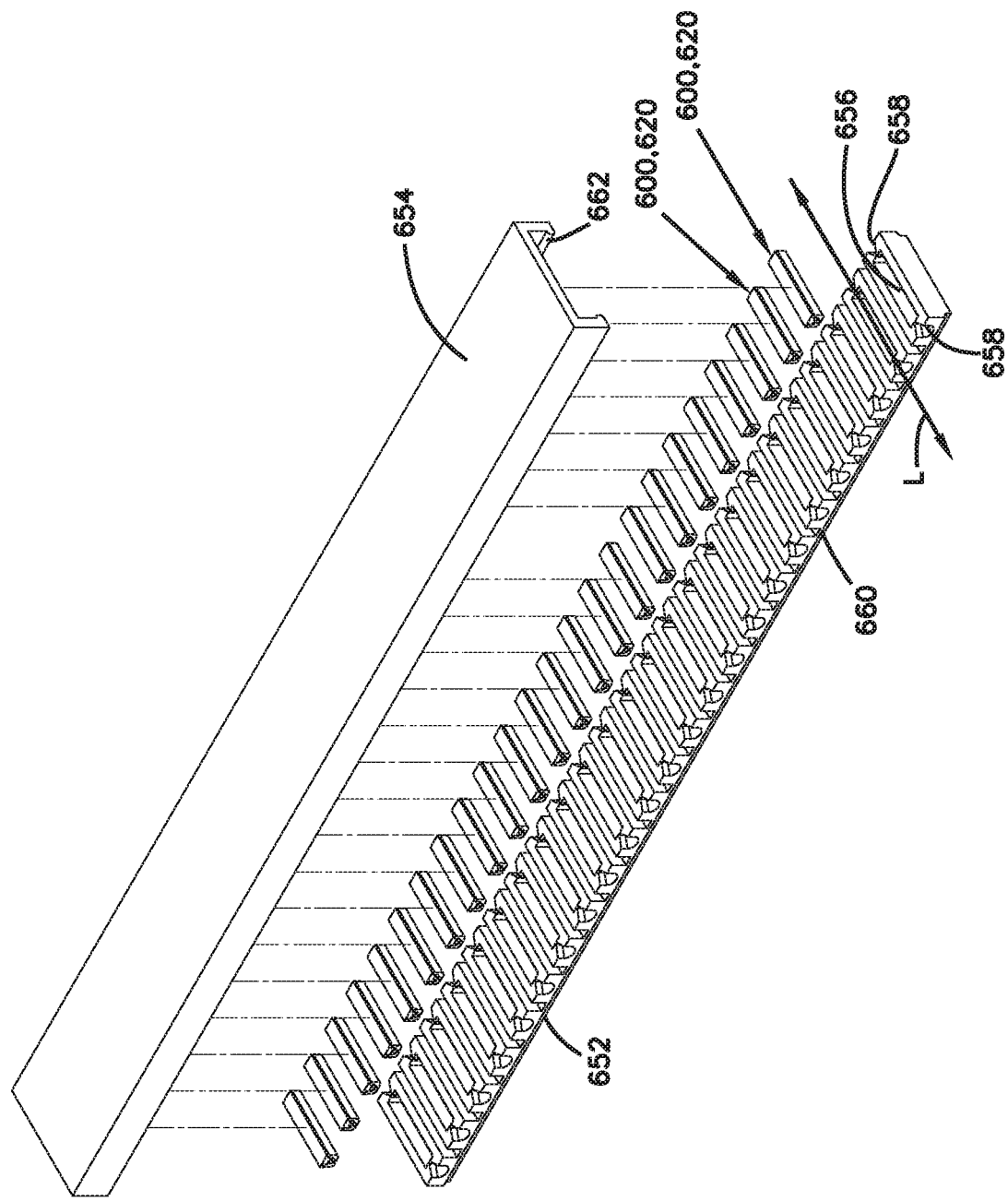
FIG. 68 is a perspective view of the carrier of FIG. 66 with the cover of the carrier shown exploded from a base of the carrier and with the fiber alignment devices shown exploded from pockets of the base.
Figure 69:
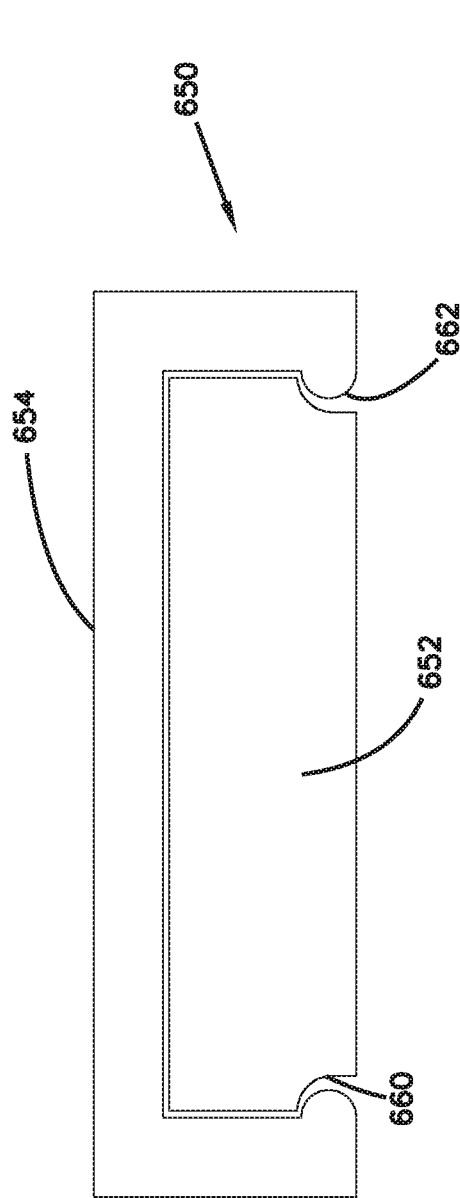
FIG. 69 is an end view of the carrier of FIG. 66.
Figure 70:
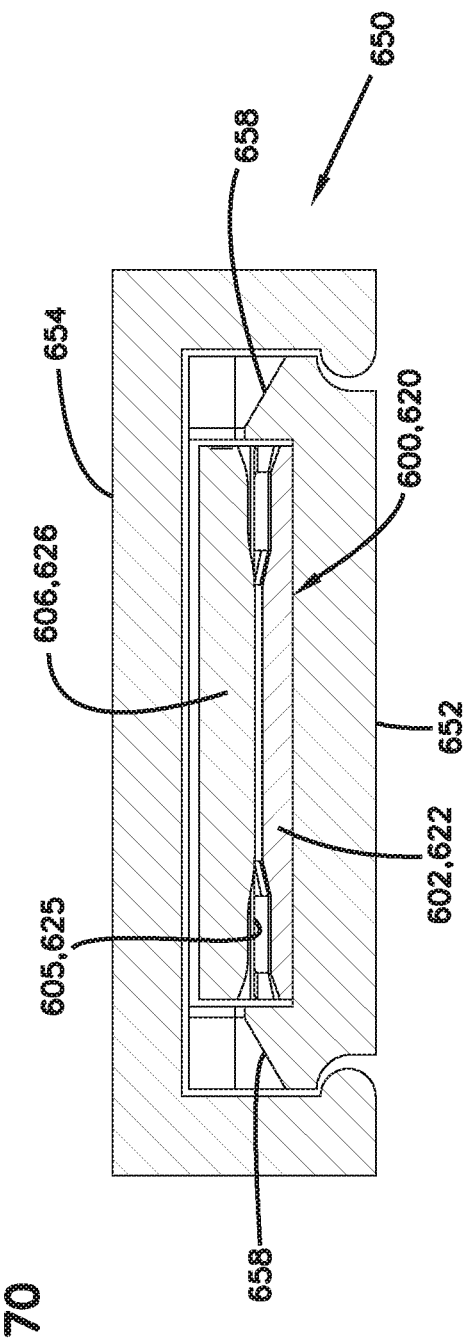
FIG. 70 is a transverse cross-sectional view of the carrier of FIG. 66.

As shown in FIG. 68, each pocket 656 is elongate along an axis L that is perpendicular to the axis S. Accordingly, the alignment devices 600, 620 situated within the pockets 656 are oriented so that the fiber insertion ends of the alignment devices 600, 620 face opposite sides 657 of the base 652. The sides 657 define guides 658 that lead to the fiber insertion ends of the alignment devices 600, 620 within the pockets 656. In the example shown, each guide 658 is funnel shaped and leads towards one of the fiber insertion ends of the alignment device 600, 620 mounted within the pocket 656. The guides 658 facilitate inserting the optical fibers 20a, 20b through the sides 657 of the base 652 and into the respective fiber alignment devices 600, 620.

Each of the above described fiber alignment devices 34, 70, 100, 130, 180, 200, 220, 330, 340, 380, 600, 620 is able to withstand an axial pulling load on the fibers of at least 1 Newton. Each of the above described fiber alignment devices 34, 70, 100, 130, 180, 200, 220, 330, 340, 380, 600, 620 is able to withstand an axial pulling load on the fibers of at least 1.5 Newtons. Each of the above described fiber alignment devices 34, 70, 100, 130, 180, 200, 220, 330, 340, 380, 600, 620 is able to withstand an axial pulling load on the fibers of at least 2 Newtons. The fiber alignment devices 34, 70, 100, 130, 180, 200, 220, 330, 340, 380, 600, 620 may clamp on the coated and/or on the bare portions of the fibers.

The fiber alignment devices 34, 70, 100, 130, 180, 200, 220, 330, 340, 380, 600, 620 disclosed herein are preferably small. For example, a length of a fiber alignment device 34, 70, 100, 130, 180, 200, 220, 330, 340, 380, 600, 620 may be no more than 10 mm, no more than 9 mm, no more than 8 mm, or no more than 7 mm. The fiber alignment device 34, 70, 100, 130, 180, 200, 220, 330, 340, 380, 600, 620 may weigh no more than 0.1 gram, no more than 0.09 grams, no more than 0.08 grams, or no more than 0.07 grams.

Various examples have been described in detail with reference to the drawings, wherein like reference numerals represent like parts and assemblies throughout the several views. Any examples set forth in this disclosure are not intended to be limiting and merely set forth some of the many possible ways for implementing the broad inventive aspects disclosed herein.

EXAMPLE ASPECTS OF THE DISCLOSURE

Aspect 1. A fiber alignment device defining a channel or passage to hold and align ends of two optical fibers.

Aspect 2. The fiber alignment device according to aspect 1, wherein the fiber alignment device mechanically aligns the ends of the two optical fibers.

Aspect 3. The fiber alignment device according to any of the above aspects, wherein the channel is a v-shaped channel.

Aspect 4. The fiber alignment device according to any of the above aspects, wherein the fiber alignment device is configured to withstand an axial pulling load on the fibers of at least 1 Newton.

Aspect 5. The fiber alignment device according to any of the above aspects, wherein the fiber alignment device is configured to withstand an axial pulling load on the fibers of at least 2 Newtons.

Aspect 6. The fiber alignment device according to any of the above aspects, wherein the fiber alignment device is configured to clamp on coated portions of the optical fibers.

Aspect 7. The fiber alignment device according to any of the above aspects, wherein the fiber alignment device is configured to clamp on bare portions of the optical fibers.

Aspect 8. The fiber alignment device according to any of the above aspects, wherein a length of a fiber alignment device is no more than 10 mm.

Aspect 9. The fiber alignment device according to any of the above aspects, wherein a length of a fiber alignment device is no more than 7 mm.

Aspect 10. The fiber alignment device according to any of the above aspects, wherein the fiber alignment device weighs no more than 0.1 gram.

Aspect 11. The fiber alignment device according to any of the above aspects, wherein the fiber alignment device weighs no more than 0.07 grams.

Aspect 12. The fiber alignment device according to any of the above aspects, wherein the fiber alignment device includes an alignment portion and a resilient portion, the alignment portion defining the channel or passage, the resilient portion fitting over at least part of the alignment portion to clamp the optical fibers relative to the alignment portion.

Aspect 13. The fiber alignment device according to aspect 12, wherein the alignment portion includes a fiber clamping portion that protrudes into the channel or passage to apply pressure to the ends of the optical fibers.

Aspect 14. The fiber alignment device according to any of aspects 12 and 13, wherein the resilient portion snaps over the alignment portion.

Aspect 15. The fiber alignment device according to any of aspects 12-14, wherein the resilient portion includes a metal spring clip.

Aspect 16. The fiber alignment device according to any of aspects 12-14, wherein the alignment portion includes a first piece and a second piece that fit together to define the passage.

Aspect 17. The fiber alignment device according to aspect 16, wherein the second piece nests with the first piece.

Aspect 18. The fiber alignment device according to any of aspects 16 and 17, wherein the second piece double nests with the first piece.

Aspect 19. The fiber alignment device according to aspect 16, wherein the first and second pieces are axially aligned.

Aspect 20. The fiber alignment device according to aspect 19, wherein the alignment portion also includes a third piece that is axially aligned with the first and second pieces.

Aspect 21. The fiber alignment device according to any of aspects 16-20, wherein the first piece defines the channel and the second piece includes a fiber clamping portion that protrudes into the channel of the first piece to apply pressure to the ends of the optical fibers.

Aspect 22. The fiber alignment device according to any of aspects 12-15, wherein the alignment portion includes a single piece.

Aspect 23. The fiber alignment device according to any of aspects 12-22, wherein the resilient portion is fitted over the alignment portion manually.

Aspect 24. The fiber alignment device according to any of aspects 12-22, wherein the resilient portion is fitted over the alignment portion using a tool.

Aspect 25. The fiber alignment device according to aspect 24, wherein the tool includes a receptacle, a clamping portion, and an actuator.

Aspect 26. The fiber alignment device according to aspect 25, wherein the clamping portion holds the optical fibers relative to the fiber alignment device outside of the fiber alignment device.

Aspect 27. The fiber alignment device according to any of aspects 25 and 26, wherein the actuator pushes the resilient portion over the alignment portion.

Aspect 28. The fiber alignment device according to any of aspects 24-27, wherein the optical fibers are inserted into the passage after the first and second pieces are nested or double-nested together and before the resilient portion is pushed onto the alignment portion.

Aspect 29. The fiber alignment device according to any of aspects 1-11, wherein the device includes:
- a fiber support structure defining a fiber alignment groove for receiving end portions of the first and second optical fibers desired to be spliced together;
- a clamping surface that extends along at least a majority of a length of the fiber alignment groove, the clamping surface being movable relative to the fiber alignment groove between a clamping position and a releasing position, the clamping surface opposing the fiber alignment groove when in the clamping position, the first and second optical fibers being axially movable within the fiber alignment groove when the clamping surface is disposed in the releasing position, the clamping surface inhibiting movement of the first and second optical fibers within the fiber alignment groove when in the releasing position; and
- a resilient structure that holds the clamping surface in the clamping position.

Aspect 30. The fiber alignment device of aspect 29, wherein the clamping surface and the resilient structure are monolithically formed.

Aspect 31. The fiber alignment device of aspect 29, wherein the clamping surface and the resilient structure are monolithically formed by a second piece that mounts to the fiber support structure.

Aspect 32. The fiber alignment device of aspect 29, wherein the fiber support structure is defined by a first piece, the clamping surface is defined by a separate second piece that engages the first piece, and the resilient structure is defined by a separate third piece that selectively engages the first and second pieces.

Aspect 33. A device for implementing a fiber optic splice between first and second optical fibers, the device comprising:
- a fiber support structure defining a fiber alignment groove for receiving end portions of the first and second optical fibers desired to be spliced together;
- a clamping surface that extends along at least a majority of a length of the fiber alignment groove, the clamping surface being movable relative to the fiber alignment groove between a clamping position and a releasing position, the clamping surface opposing the fiber alignment groove when in the clamping position, the first and second optical fibers being axially movable within the fiber alignment groove when the clamping surface is disposed in the releasing position, the clamping surface inhibiting movement of the first and second optical fibers within the fiber alignment groove when in the releasing position; and
- a resilient structure that holds the clamping surface in the clamping position.

Aspect 34. The device of aspect 33, wherein each of the first and second optical fibers includes a coated section and a bare fiber section, wherein the bare fiber sections define end faces of the first and second optical fibers, wherein the clamping surface extends along at least the bare fiber sections of the optical fibers.

Aspect 35. The device of aspect 34, wherein the clamping surface extends along at least a portion of the coated section of each optical fiber.

Aspect 36. The device of any of aspects 32-35, wherein the fiber support structure and the clamping surface are monolithically formed by a fiber alignment piece that flexes between the clamping and releasing positions.

Aspect 37. The device of aspect 36, wherein the fiber alignment piece is one of a plurality of axially aligned fiber alignment pieces that are each clamped by the resilient structure.

Aspect 38. The device of aspect 36, wherein the fiber alignment groove is accessible through a slot defined through the fiber alignment piece, and wherein the resilient structure opposes the slot.

Aspect 39. The device of any of aspects 32-38, wherein the resilient structure includes a spring clip that latches around an exterior of the fiber alignment piece.

Aspect 40. The device of aspect 36, wherein the clamping surface and the resilient structure are monolithically formed by a second piece that mounts to the fiber support structure, the resilient structure including legs that extend away from the clamping surface and define locking tabs at distal ends thereof.

Aspect 41. The device of any of aspects 32-35, wherein the fiber support structure is defined by a first piece and the clamping surface is defined by a separate second piece that engages the first piece.

Aspect 42. The device of aspect 41, wherein the first and second pieces nest together.

Aspect 43. The device of aspect 42, wherein the first and second pieces double nest together.

Aspect 44. The device of any of aspects 41-43, wherein the resilient structure includes a spring clip that latches around the first and second pieces.

Aspect 45. The device of aspect 44, wherein the spring clip extends fully along a length of the first and second pieces.

Aspect 46. The device of aspect 44, wherein the spring clip extends along less than a full length of the first and second pieces, and wherein the first and second pieces define abutment surfaces that inhibit axial movement of the spring clip relative to the first and second pieces.

Aspect 47. The device of any of the above aspects, wherein a length of the device is no more than 7 mm.

Aspect 48. The device of any of the above aspects, wherein the device weighs no more than 0.07 grams.

Aspect 49. The device of any of the above aspects, wherein the device is configured to withstand an axial pulling load on the first and second optical fibers of at least 2 Newtons.

Aspect 50. A tool for assembling the device of any of aspects 32-49, wherein the tool includes a device receptacle, a clamping structure, and an actuator, the device receptacle being configured to hold the fiber support structure, the clamping structure being configured to clamp to the first and second optical fibers at sections external of the fiber support structure and clamping surface, and the actuator being configured to actuate the resilient structure to move the clamping surface relative to the fiber alignment groove to the clamping position.

Aspect 51. The tool of aspect 51, wherein the device receptacle receives both the fiber support structure and the clamping surface, and wherein the clamping surface is disposed in the releasing position before the resilient structure is actuated.

Aspect 52. The tool of any of aspects 50 and 51, wherein the resilient structure includes a spring clip, and wherein the actuator pushes the spring clip around the fiber support structure and the clamping surface to move the clamping surface to the clamping position.

Aspect 53. A device for implementing a fiber optic splice between first and second optical fibers, the device comprising:
- a first piece defining a fiber alignment groove for receiving end portions of the first and second optical fibers desired to be spliced together;
- a second piece that snaps onto the first piece such that the end portions of the first and second optical fibers are clamped in the fiber alignment groove between the first and second pieces, the second piece including a fiber clamping portion adapted to cover an open side of the fiber alignment groove when the second piece is snapped onto the first piece.

Aspect 54. The device of aspect 53, wherein the fiber alignment groove is a v-groove that extends along a length of the first piece between first and second ends of the first piece.

Aspect 55. The device of aspect 54, wherein the v-groove has a central portion positioned axially between first and second end portions, and wherein the central portion of the v-groove has a shorter depth and a smaller transverse cross-sectional profile than the first and second end portions of the v-groove.

Aspect 56. The device of aspect 55, wherein the first and second end portions of the v-groove have tapered lead-in sections respectively at the first and second ends of the first piece, and wherein the first and second end portions of the v-groove also include non-tapered sections positioned between the tapered lead-in sections and the central portion of the v-groove.

Aspect 57. The device of aspect 56, wherein steps are defined at transitions between the central portion of the v-groove and the non-tapered sections of the first and second end portions of the v-groove.

Aspect 58. The device of aspect 53, wherein the second piece is a molded plastic part and the first piece is a molded plastic part or an etched ceramic or glass part.

Aspect 59. The device of aspect 53, wherein at least one of the first and second pieces is made of material having a composition that includes polyetherimide, polyetheretherketone, thermoplastic polyimide, glass or ceramic.

Aspect 60. The device of aspect 55, wherein the central portion of the v-groove is adapted to receive bare fiber portions of the first and second optical fibers and the first and second end portions of the v-groove are adapted to receive coated fiber portions of the first and second optical fibers.

Aspect 61. A device for implementing a fiber optic splice between first and second optical fibers, the device comprising:
 a first piece defining a fiber alignment groove for receiving end portions of the first and second optical fibers desired to be spliced together;
 a second piece that mounts adjacent to the first piece, the second piece including a fiber clamping portion adapted to cover an open side of the fiber alignment groove when the second piece is mounted adjacent to the first piece; and
 a third piece that mounts over the first and second pieces to force the first and second pieces together to clamp the first and second optical fibers in the fiber alignment groove, the third piece being either a shape-memory sleeve or a clip member that snaps over the first and second pieces.

Aspect 62. The device of aspect 61, wherein the fiber alignment groove is a v-groove that extends along a length of the first piece between first and second ends of the first piece.

Aspect 63. The device of aspect 62, wherein the v-groove has a central portion positioned axially between first and second end portions, and wherein the central portion of the v-groove has a shorter depth and smaller transverse cross-sectional profile than the first and second portions of the v-groove.

Aspect 64. The device of aspect 63, wherein the first and second end portions of the v-groove have tapered lead-in sections respectively at the first and second ends of the first piece, and wherein the first and second end portions of the v-groove also include non-tapered sections positioned between the tapered lead-in sections and the central portion of the v-groove.

Aspect 65. The device of aspect 64, wherein steps are defined at transitions between the central portion of the v-groove and the non-tapered sections of the first and second end portions of the v-groove.

Aspect 66. The device of aspect 61, wherein the third piece is a molded plastic part.

Aspect 67. The device of aspect 61, wherein at least one of the first and second pieces is a molded plastic part or an etched part made from a composition that includes ceramic or glass.

Aspect 68. The device of aspect 63, wherein the central portion of the v-groove is adapted to receive bare fiber portions of the first and second optical fibers, and the first and second end portions of the v-groove are adapted to receive coated fiber portions of the first and second optical fibers.

Aspect 69. The device of aspect 61, wherein the first and second pieces include mating features that mate to ensure registry between the first and second pieces, and wherein the mating features allow the first and second pieces to be moved toward and away from one another while maintaining registry between the first and second pieces.

Aspect 70. The device of aspect 69, wherein the third piece is the clip member, and wherein the clip member mounts in first and second positions on the first and second piece, wherein when the clip member is in the first position, the first and second optical fibers can be axially inserted between the first and second pieces into the fiber alignment groove, and wherein when the clip member is in the second position, the first and second pieces are adapted to clamp the first and second optical fibers within the fiber alignment groove.

Aspect 71. The device of aspect 70, wherein the clip member has a generally U-shaped transverse cross-sectional shape.

Aspect 72. The device of aspect 61, wherein the first and/or second pieces include retention features that inhibit axial movement of the third piece relative to the first and second pieces.

Aspect 73. The device of aspect 61, wherein the first piece is inserted into a channel defined in the second piece.

Aspect 74. The device of aspect 61, wherein the fiber clamping portion of the second piece protrudes into the fiber alignment groove of the first piece.

Aspect 75. The device of aspect 61, wherein the third piece is installed using a pressing tool.

Aspect 76. A device for implementing a fiber optic splice between first and second optical fibers, the device comprising:
 a fiber alignment sleeve defining a fiber alignment passage extending axially through the fiber alignment sleeve, the fiber alignment passage including a fiber positioning groove, the fiber alignment sleeve including a clamping surface within the fiber alignment passage that opposes the fiber positioning groove, the clamping surface and the fiber positioning groove being movable relative to one another along a first axis when the fiber alignment sleeve is moved between a relaxed state and an expanded state, the clamping surface being positioned further from the fiber positioning groove when the fiber alignment sleeve is in the expanded state as compared to when the fiber alignment sleeve is in the relaxed state, the first and second optical fibers being capable of being inserted in the fiber alignment passage when the fiber alignment sleeve is in the expanded state, the fiber alignment sleeve having a construction that biases the fiber alignment sleeve toward the relaxed state, and the fiber alignment sleeve being movable from the relaxed state toward the expanded state by compressing the fiber alignment sleeve along a second axis perpendicular with respect to the first axis.

Aspect 77. The device of aspect 76, further comprising a spring member that mounts over the fiber alignment sleeve to compress the fiber alignment sleeve along the first axis.

Aspect 78. The device of aspect 76, wherein the fiber alignment sleeve has a transverse cross-sectional shape that is longer along the second axis as compared to the first axis.

Aspect 79. The device of aspect 76, wherein the fiber alignment passage has a transverse cross-sectional shape that is longer along the second axis as compared to the first axis.

Aspect 80. The device of aspect 76, wherein the clamping surface is defined by a projection having a height along the first axis and a length that extends axially through the fiber alignment sleeve.

Aspect 81. The device of aspect 76, wherein the fiber alignment sleeve includes a central section positioned axially between first and second end sections, and wherein when the fiber alignment sleeve is in the relaxed state, the central section has a first spacing between the clamping surface and the fiber positioning groove and the first and second end sections have a second spacing between the clamping surface and the fiber positioning groove, the second spacing being larger than the first spacing.

Aspect 82. The device of aspect 49, wherein the central section, the first end section, and the second end section are formed by separate pieces.

Aspect 83. A device for implementing a fiber optic splice between first and second optical fibers, the device comprising:
- a fiber alignment sleeve defining a fiber alignment passage extending axially through the fiber alignment sleeve, the fiber alignment sleeve defining an axial slot having a length that extends axially along the fiber alignment sleeve and a depth that extends radially through the fiber alignment sleeve from an outer surface of the fiber alignment sleeve to the fiber alignment passage, the fiber alignment sleeve being movable between a relaxed state and an expanded state, the fiber alignment sleeve having a construction that biases the fiber alignment sleeve toward the relaxed state, the fiber alignment sleeve being configured to flex at a location opposite the axial slot when the fiber alignment sleeve is moved from the relaxed state toward the expanded state, and the fiber alignment passage being sized to be capable of clamping a fiber having a diameter as small as 125 microns.

Aspect 84. The device of aspect 83, wherein the fiber alignment sleeve has a generally cylindrical outer shape within a diameter less than 300 microns.

Aspect 85. A system for implementing a fiber optic splice between first and second optical fibers, the system comprising:
- a sleeve structure defining a fiber alignment passage for receiving end portions of the first and second optical fibers desired to be spliced together, the sleeve structure being movable between an expanded position and a clamping position, and the sleeve structure being resiliently biased toward the clamping position; and
- a handling tool including an expansion portion that fits into the sleeve structure to retain the sleeve structure in the expanded position, wherein the fiber optic splice is implemented by inserting the first and second optical fibers into the fiber alignment passage of the sleeve structure while the sleeve structure is held in the expanded position by the expansion portion of the handling tool, and wherein the expansion portion is removed from the sleeve structure once the first and second fibers have been inserted into the fiber alignment passage such that the sleeve structure moves to the clamping position and clamps the first and second optical fibers within the fiber alignment passage.

Aspect 86. The system of aspect 85, wherein the expansion portion of the handling tool is factory installed within the sleeve structure, and the sleeve structure includes a split sleeve body.

Aspect 87. The system of aspect 85, wherein the fiber alignment passage extends along a central axis of the sleeve structure between first and second ends of the sleeve structure.

Aspect 88. The system of aspect 87, wherein the sleeve structure includes a sleeve body and three radial projections that project inwardly from the sleeve body toward the central axis of the sleeve member, and wherein the radial projections include tips that cooperate to define the fiber alignment passage.

Aspect 89. The system of aspect 88, wherein the radial projections extend axially along the central axis of the sleeve structure between the first and second ends of the sleeve structure.

Aspect 90. The system of aspect 89, wherein the sleeve body is a split sleeve body having at least one slot that extends radially from an outer surface of the sleeve body to the fiber alignment passage, and that extends axially along the central axis of the sleeve structure.

Aspect 91. The system of aspect 90, wherein the split sleeve body includes a central section positioned axially between first and second end sections of the split sleeve body, wherein the fiber alignment passage has a smaller cross-dimension at the central section of the split sleeve body as compared to the first and second end sections of the split sleeve body.

Aspect 92. The system of aspect 91, wherein the central section of the split sleeve body is configured for clamping bare fiber portions of the first and second optical fibers, and the first and second end sections of the split sleeve body are configured for clamping coated portions of the first and second optical fibers.

Aspect 93. The system of aspect 91, wherein the sleeve structure includes a spring sleeve that mounts over the split sleeve body for biasing the split sleeve body toward the clamped position.

Aspect 94. The system of aspect 93, wherein the central section and the first and second end sections of the split sleeve body are separate plastic pieces manufactured by an extrusion process.

Aspect 95. A device for implementing a fiber optic splice between first and second optical fibers, the device comprising:
- first, second, and third rods that cooperate to define a fiber alignment passage; and
- a shape memory sleeve that mounts over the first, second, and third rods.

Aspect 96. The device of aspect 95, wherein the fiber alignment passage is sized to be capable of clamping an optical fiber having a diameter as small as 125 microns.

Aspect 97. The device of aspect 95, wherein the shape memory sleeve is a heat-shrink sleeve.

Aspect 98. The device of aspect 95, wherein the shape-memory sleeve has ends that overlap ends of the first, second, and third rods.

What is claimed is:

1. A system for optically coupling a first plurality of optical fibers to a second plurality of optical fibers, the system comprising:
- a tool including an actuator disposed at a fiber insertion station;
- a plurality of fiber alignment devices, each fiber alignment device of the plurality of fiber alignment devices defining a respective fiber passage extending between a first fiber insertion end and an opposite second fiber insertion end; and a carrier configured to mount to the tool, the carrier holding the plurality of fiber alignment devices, at least a portion of the carrier configured to slide relative to the tool to automatically, sequentially index each of the fiber alignment devices along the tool to the fiber insertion station;

wherein the actuator compresses the fiber passage of each alignment device when the alignment device is disposed at the fiber insertion station.

2. The system of claim 1, further comprising a biasing mechanism configured to bias at least a first optical fiber into the alignment device at the fiber insertion station through the first fiber alignment end and to bias at least a second optical fiber into the alignment device at the fiber insertion station through the second fiber alignment end.

3. The system of claim 1, further comprising a UV light source configured to shine UV light at the alignment device at the fiber insertion station.

4. The system of claim 3, further comprising an injector configured to inject UV-curable adhesive into the alignment device.

5. The system of claim 3, wherein UV-curable adhesive is disposed within each alignment device prior to the alignment device reaching the fiber insertion station.

6. The system of claim 1, wherein the tool includes an injector configured to inject adhesive into the fiber alignment device.

7. The system of claim 1, wherein the carrier includes a base and a cover, the base defining a plurality of pockets, each pocket sized and shaped to hold one of the fiber alignment devices.

8. The system of claim 7, wherein the base is movable relative to the cover to index the fiber alignment devices to the fiber insertion station.

9. The system of claim 7, wherein the base is UV-transparent.

10. The system of claim 1, wherein each fiber alignment device is configured to receive only one optical fiber at each of the first and second fiber insertion ends.

11. The system of claim 1, wherein each fiber alignment device is configured to receive a plurality of optical fibers at each of the first and second fiber insertion ends.

12. The system of claim 1, wherein the carrier defines guides in alignment with the first and second fiber insertion ends of each of the fiber alignment devices.

13. The system of claim 1, wherein the base of the carrier is configured to slide relative to the cover.

14. The system of claim 1, wherein the base of the carrier slides along a slide axis that is transverse to fiber passages extending through the fiber alignment devices.

15. The system of claim 7, wherein the base of the carrier is configured to slide relative to the cover along a first axis.

16. The system of claim 15, wherein the plurality of pockets extend along second axes generally orthogonal to the first axis.

17. The system of claim 16, wherein the cover selectively blocks access to the first and second fiber insertion ends of at least one of the plurality of fiber alignment devices when the cover is mounted over the base.

18. The system of claim 13, wherein the cover is held stationary relative to the tool and the base is sequentially indexed along the tool to the fiber insertion station.

19. The system of claim 13, wherein the cover defines at least one rib configured to slide along a recessed channel as the base slides relative to the cover.

* * * * *